United States Patent
Nozaki et al.

(10) Patent No.: US 11,438,558 B2
(45) Date of Patent: *Sep. 6, 2022

(54) PROJECTION DEVICE

(71) Applicant: Nikon Corporation, Tokyo (JP)

(72) Inventors: Hirotake Nozaki, Tokyo (JP); Nobuhiro Fujinawa, Tokyo (JP)

(73) Assignee: Nikon Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/100,794

(22) Filed: Nov. 20, 2020

(65) Prior Publication Data

US 2021/0076012 A1 Mar. 11, 2021

Related U.S. Application Data

(60) Division of application No. 15/893,484, filed on Feb. 9, 2018, now Pat. No. 10,855,961, which is a division
(Continued)

(30) Foreign Application Priority Data

Mar. 31, 2006 (JP) .................... 2006-097340

(51) Int. Cl.
*H04N 9/31* (2006.01)
*G03B 17/54* (2021.01)
(Continued)

(52) U.S. Cl.
CPC ......... *H04N 9/3176* (2013.01); *G02B 27/283* (2013.01); *G03B 17/54* (2013.01);
(Continued)

(58) Field of Classification Search
CPC .... H04N 9/3176; H04N 5/225; H04N 9/3102; H04N 9/3108; H04N 9/3141;
(Continued)

(56) References Cited

U.S. PATENT DOCUMENTS 6,667,834 B2 12/2003 Itoh
6,979,085 B2 12/2005 Lurkens
(Continued)

FOREIGN PATENT DOCUMENTS

EP     1 508 740 A1    2/2005
JP     07-234406 A    9/1995
(Continued)

OTHER PUBLICATIONS

Notice of Allowance dated Oct. 26, 2017 in U.S. Appl. No. 14/977,515.
(Continued)

*Primary Examiner* — Andrew J Coughlin
*Assistant Examiner* — Jessica M Apenteng
(74) *Attorney, Agent, or Firm* — SGPatents PLLC

(57) ABSTRACT

An electronic device comprises a projector that is configured to project an image and a control unit. The control unit is configured to control an orientation of the image to be projected to a first orientation when the electronic device is in a first attitude, and to control the orientation of the image to be projected to a second orientation different from the first orientation when the electronic device is in a second attitude different from the first attitude.

5 Claims, 39 Drawing Sheets

Related U.S. Application Data of application No. 14/977,515, filed on Dec. 21, 2015, now Pat. No. 9,918,056, which is a continuation of application No. 12/224,364, filed as application No. PCT/JP2007/057170 on Mar. 30, 2007, now Pat. No. 9,219,895.

(51) Int. Cl.
*G02B 27/28* (2006.01)
*G03B 21/16* (2006.01)
*H04N 5/225* (2006.01)

(52) U.S. Cl.
CPC .............. *G03B 21/16* (2013.01); *H04N 5/225* (2013.01); *H04N 9/3102* (2013.01); *H04N 9/315* (2013.01); *H04N 9/3108* (2013.01); *H04N 9/3141* (2013.01); *H04N 9/3144* (2013.01); *H04N 9/3197* (2013.01)

(58) Field of Classification Search
CPC .... H04N 9/315; H04N 9/3197; G02B 27/283; G02B 17/54; G03B 21/16
See application file for complete search history.

(56) References Cited

U.S. PATENT DOCUMENTS

| | | | |
|---|---|---|---|
| 7,192,147 B2 | 3/2007 | Sakata et al. | |
| 7,375,758 B2 | 5/2008 | Muramatsu | |
| 7,616,881 B2 | 11/2009 | Liang et al. | |
| 7,729,607 B2 | 6/2010 | Karim | |
| 2004/0017547 A1 | 1/2004 | Kamm et al. | |
| 2004/0156212 A1 | 8/2004 | Kamijima | |
| 2006/0050515 A1 | 3/2006 | Fujinawa et al. | |
| 2006/0291851 A1 | 12/2006 | Nozaki | |
| 2007/0242229 A1 | 10/2007 | Kim | |
| 2008/0001916 A1 | 1/2008 | Nozaki | |
| 2008/0013053 A1* | 1/2008 | Anson | H04N 9/3147 353/69 |
| 2008/0212957 A1 | 9/2008 | Goto | |
| 2014/0016107 A1 | 1/2014 | Coulson | |

FOREIGN PATENT DOCUMENTS

| | | |
|---|---|---|
| JP | 10-288812 A | 10/1998 |
| JP | 2000-089361 A | 3/2000 |
| JP | 2000-258640 A | 9/2000 |
| JP | 2001-154268 A | 6/2001 |
| JP | 2003-084368 A | 3/2003 |
| JP | 2003-207849 A | 7/2003 |
| JP | 2004-286965 A | 10/2004 |
| JP | 2004-287189 A | 10/2004 |
| JP | 2005-062373 A | 3/2005 |
| JP | 2005-106974 A | 4/2005 |
| JP | 2005-250392 A | 9/2005 |
| JP | 2005-309286 A | 11/2005 |
| JP | 2005-316441 A | 11/2005 |
| JP | 2006-053566 A | 2/2006 |
| JP | 2006-064734 A | 3/2006 |
| JP | 2006-072216 A | 3/2006 |
| JP | 2006-527392 A | 11/2006 |
| WO | WO 99/049358 | 9/1999 |

OTHER PUBLICATIONS

Final Office Action dated May 18, 2017 in U.S. Appl. No. 14/977,515.
Non-Final Office Action dated Aug. 25, 2016 in U.S. Appl. No. 14/977,515.
Office Action (Notification of Reasons for Refusal) dated Jul. 30, 2013 in Japanese Patent Application No. 2011-149807.
Office Action (Notification of Reason(s) for Refusal) dated Oct. 30, 2012, in Japanese Patent Application No. 2011-149807 (with English translation).
European Search Report dated Nov. 2, 2009, in European Patent Application No. 07740606.4.
Notice of Allowance dated Jul. 22, 2020 in U.S. Appl. No. 15/893,484.
Non-Final Office Action dated Feb. 28, 2020 in U.S. Appl. No. 15/893,484.
Final Office Action dated Oct. 7, 2019 in U.S. Appl. No. 15/893,484.
Non-Final Office Action dated Jan. 23, 2019 in U.S. Appl. No. 15/893,484.

\* cited by examiner (PROJECTED LIGHT)

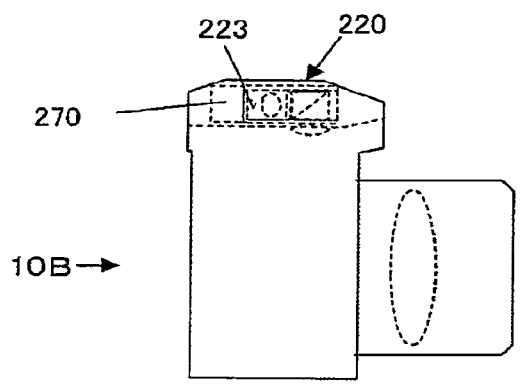 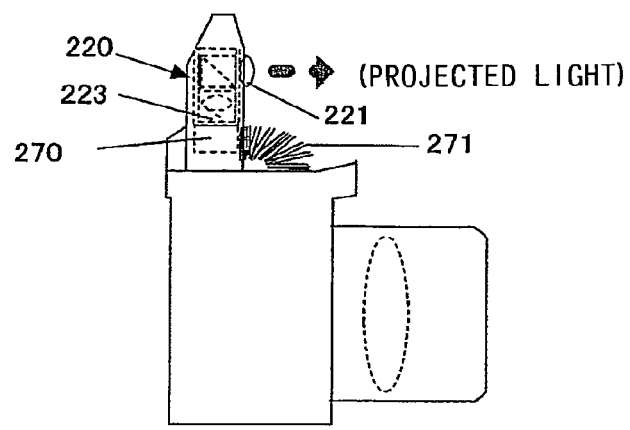
FIG. 12 (a)  FIG. 12 (b)

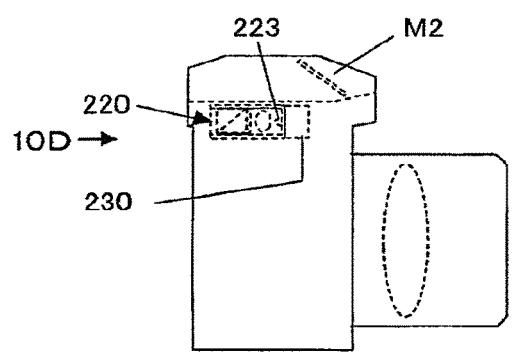 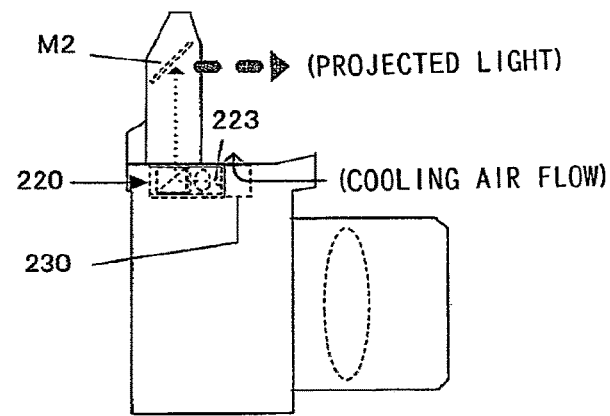
FIG. 14 (a)  FIG. 14 (b)

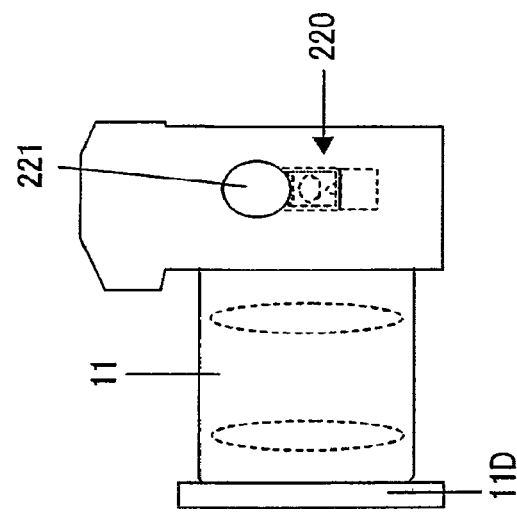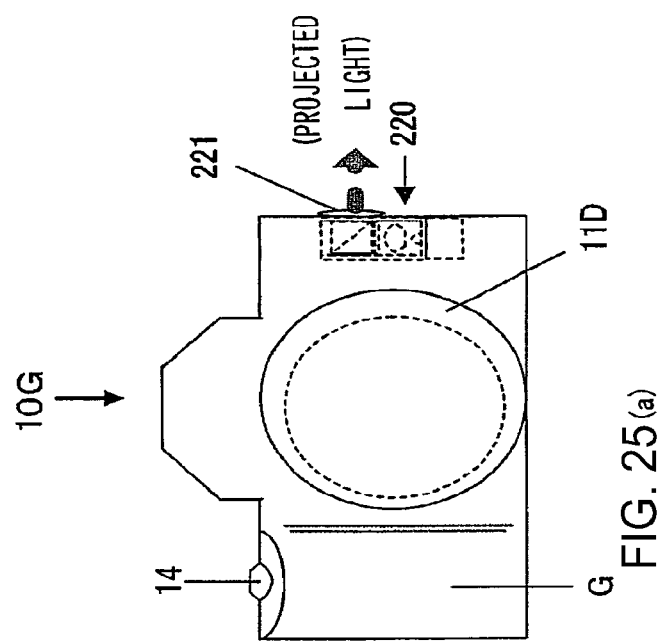
FIG. 25 (a)
FIG. 25 (b)

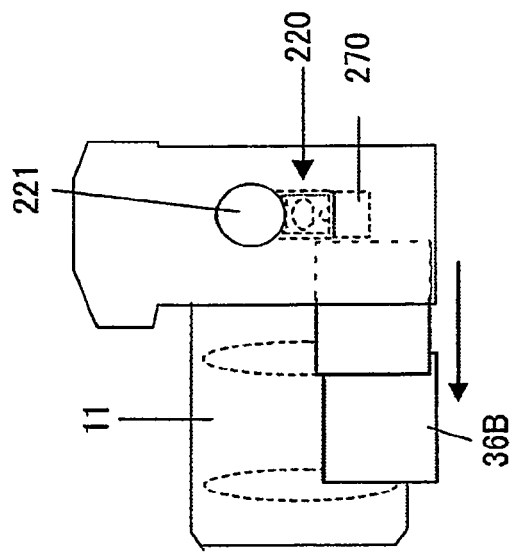
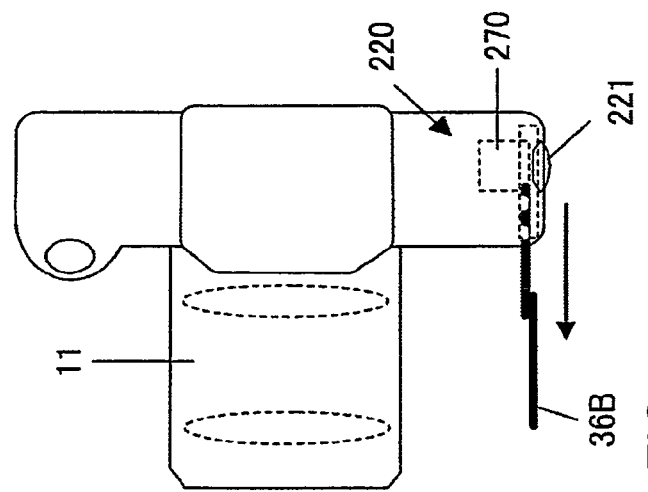
FIG. 29 (b)
FIG. 29 (a)

(AUXILIARY PHOTOGRAPHIC LIGHT)

(PROJECTED LIGHT)

PROJECTION DEVICE

TECHNICAL FIELD

The present invention relates to a projection device.

BACKGROUND ART

An electronic device endowed with a projection function is known (for example, refer to Patent Reference #1).

Patent Reference #1: Japanese Laid-Open Patent Publication 2005-250392.

DISCLOSURE OF THE INVENTION

Problems to be Solved by the Invention

With this type of compact projection device, the structure of the light source and the projection unit becomes complicated.

Means for Solving the Problems

According to the 1st aspect of the invention, a projection device comprises: a plate shaped member that is thermally conductive; a light emitting element that is disposed upon the plate shaped member and emits light; a bending member that bends light from the light emitting element into an orientation parallel to the plate shaped member; a modulation element that modulates light bent by the bending member; and a polarized light separation element that bends light modulated by the modulation element into an orientation going away from the plate shaped member.

According to the 2nd aspect of the invention, in the projection device according to the 1st aspect, it is preferred that at least the light emitting element, the modulation element, and the polarized light separation element are integrated with the plate shaped member, and the polarized light separation element and the modulation element are joined to each other directly.

According to the 3rd aspect of the invention, in the projection device according to the 2nd aspect, it is preferred that: the modulation element is a reflective type liquid crystal element; in the polarized light separation element, a predetermined surface upon which non-reflective processing has been performed is joined to a surface of the plate shaped member on which the light emitting element is disposed; and the polarized light separation element passes a first polarized light component of the light that is bent by the bending member to be parallel with the plate shaped member, to be conducted to the reflective type liquid crystal element, bends a second polarized light component of the light that is bent by the bending member to be parallel with the plate shaped member, that is different from the first polarized light component, to be conducted to the predetermined surface, and also bends light modulated by the reflective type liquid crystal element into an orientation going away from the plate shaped member.

According to the 4th aspect of the invention, in the projection device according to the 2nd aspect, it is preferred that: the projection device further comprises an illumination optical system that projects light emitted by the light emitting element in an orientation going away from the plate shaped member, and a projection optical system that projects the modulated light that has been bent by the polarized light separation element into an orientation going away from the plate shaped member; the bending member is configured so as to be shiftable onto an optical path of light emitted by the light emitting element and away from the optical path; and when the bending member is shifted onto the optical path, the modulated light is emitted from the projection optical system, whereas, when the bending member is shifted away from the optical path, the projected light is emitted from the illumination optical system.

According to the 5th aspect of the invention, in the projection device according to anyone of the 1st through 4th aspects, it is preferred that the projection device further comprises a cooling unit that cools the plate shaped member from a surface on which the light emitting element is disposed, or from a rear surface of the surface.

According to the 6th aspect of the invention, a projection device comprises: a member that is thermally conductive, and that has two surfaces that mutually intersect; a light emitting element that is provided upon one of the surfaces of the member, and that emits light in an orientation parallel to the other surface of the member; a modulation element that modulates light from the light emitting element; and a polarized light separation element that bends light modulated by the modulation element into an orientation going away from the other surface of the member.

According to the 7th aspect of the invention, in the projection device according to the 6th aspect, it is preferred that at least the light emitting element, the modulation element, and the polarized light separation element are integrated with the member, and the polarized light separation element and the modulation element are joined to each other directly.

According to the 8th aspect of the invention, in the projection device according to the 7th aspect, it is preferred that: the modulation element is a reflective type liquid crystal element; in the polarized light separation element, a predetermined surface upon which non-reflective processed has been performed is joined to the other surface of the member; and the polarized light separation element passes a first polarized light component of light parallel to the other surface to be conducted to the reflective type liquid crystal element, bends a second polarized light component of the light that is parallel to the other surface, that is different from the first polarized light component, to be conducted to the predetermined surface, and also bends light modulated by the reflective type liquid crystal element into an orientation going away from the member.

According to the 9th aspect of the invention, in the projection device according to the 7th aspect, it is preferred that: the projection device further comprises an optical member that has a non-reflective processed region and a reflective processing region; the modulation element is a reflective type liquid crystal element; the optical member is configured so as to be shiftable along a predetermined surface of the polarized light separation element; (1) when the non-reflective processed region of the optical member is shifted so as to oppose the predetermined surface, the polarized light separation element passes through a first polarized light component of the light parallel to the other surface to be conducted to the reflective type liquid crystal element, bends a second polarized light component of the light parallel to the other surface, that is different from the first polarized light component, to be conducted to the non-reflective processed region, and also bends light modulated by the reflective type liquid crystal element into an orientation going away from the member; and (2) when the reflective processing region of the optical member is shifted so as to oppose the predetermined surface, the polarized light separation element passes through a first polarized light component of the light parallel to the other surface to be conducted to the reflective type liquid crystal element, bends a second polarized light component of the light parallel to the other surface, that is different from the first polarized light component, to be conducted to the reflective processed region, passes through light of a polarized light component reflected by the reflective processing region to be conducted in an orientation going away from the member, and bends light modulated by the reflective type liquid crystal element into an orientation going away from the member.

According to the 10th aspect of the invention, in the projection device according to any one of the 6th through 9th aspects, it is preferred that the projection device further comprises an optical system that emits light in an orientation going away from the other surface of the member.

According to the 11th aspect of the invention, in the projection device according to any one of the 6th through 10th aspects, it is preferred that the projection device further comprises a cooling unit that cools a rear surface of the member on which the light emitting element is disposed.

According to the 12th aspect of the invention, a projection device comprises: a light emitting element that emits light; a modulation element that modulates light from the light emitting element; and a polarized light separation element that bends light modulated by the modulation element, and the modulation element and the polarized light separation element are directly joined together.

According to the 13th aspect of the invention, in the projection device according to the 12th aspect, it is preferred that the modulation element comprises a cover glass upon a surface that is joined to the polarized light separation element.

According to the 14th aspect of the invention, in the projection device according to the 12th aspect, it is preferred that the modulation element comprises a color filter.

Advantageous Effect of the Invention

According to the present invention, it is possible to build the light source and the projection unit of the projection device in a simple manner.

BRIEF DESCRIPTION OF THE DRAWINGS

FIGS. 12 (a) and 12 (b) are side views of this electronic camera with incorporated projector: FIG. 12(a) is a figure showing a state in which the projection unit is shifted to a housed position, while FIG. 12 (b) is a figure showing a state in which the projection unit is shifted to a usage position;

FIG. 13(a) is a figure showing a state in which a projection unit thereof is shifted to a housed position, while FIG. 13(b) is a figure showing a state in which the projection unit is shifted to a usage position;

FIGS. 14(a) and 14(b) are side views of an electronic camera with incorporated projector according to a variant embodiment #10: FIG. 14(a) is a figure showing a state in which a projection unit thereof is shifted to a housed position, while FIG. 14(b) is a figure showing a state in which the projection unit is shifted to a usage position;

FIG. 16(a) is a plan view, FIG. 16(b) is an elevation view, and FIG. 16(c) is a bottom view;

FIG. 18(a) is a plan view, FIG. 18(b) is an elevation view, and FIG. 18(c) is a bottom view;

FIG. 23(a) and FIG. 23 (b) show an example of an electronic camera with incorporated projector according to a fifth embodiment: FIG. 23(a) is an elevation view, and FIG. 23(b) is a side view;

FIG. 25(a) and FIG. 25 (b) show an example of an electronic camera with incorporated projector according to a variant embodiment #17 to which a lens cap and a photographic lens are installed: FIG. 25(a) is an elevation view, while FIG. 25(b) is a side view;

FIG. 26(a) is an overall view, while FIG. 26(b) is a side view;

FIG. 29(a) and FIG. 29(b) are side views showing an example of a vertical stabilization plate of an electronic camera with incorporated projector;

FIG. 30(a) is a figure showing it in its folded away state, while FIG. 30(b) is a figure showing it in its rotated out state;

FIG. 32 (a) is an elevation view, while FIG. 32 (b) is a side view;

FIG. 37(a) is a figure showing this optical system when it is emitting auxiliary light for photography, while FIG. 37 (b) is a figure showing this optical system when it is emitting projected light;

FIG. 39(a) is a figure showing them when a cover glass is omitted, while FIG. 39 (b) is a figure showing them when the cover glass is present.

BEST MODE FOR CARRYING OUT THE INVENTION

In the following, preferred embodiments for implementation of the present invention will be explained with reference to the drawings.

Embodiment One

Figure 1:
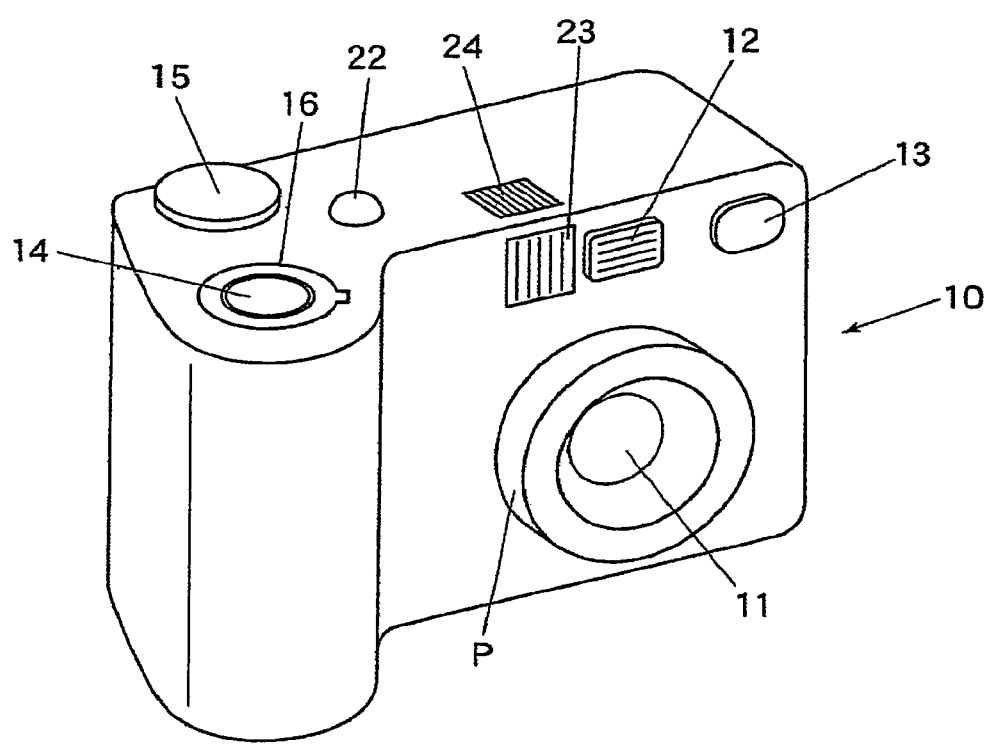
FIG. 1 is a view showing an electronic camera with incorporated projector according to a first embodiment of the present invention, as seen slantingly from the front.

FIG. 1 is a view showing an electronic camera to which a projector is affixed (hereinafter termed an electronic camera with incorporated projector) according to a first embodiment of the present invention, as seen slantingly from the front. In FIG. 1, at the front of the electronic camera with incorporated projector 10, there are provided a photographic lens 11, an illumination light window 12, and a projector projection window 13. And, on the upper surface of this electronic camera with incorporated projector 10, there are provided a release button 14, a zoom switch 16, a mode changeover dial 15, and a main switch 22.

Figure 2:
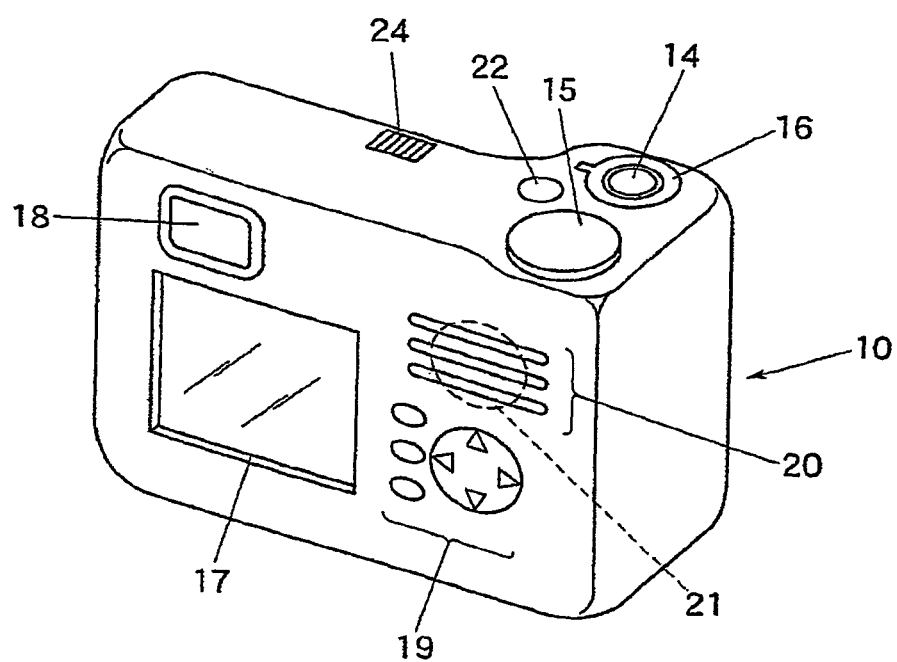
FIG. 2 is a view showing this electronic camera with incorporated projector as seen slantingly from the back.

FIG. 2 is a view showing this electronic camera with incorporated projector 10 of FIG. 1 as seen slantingly from the back. In FIG. 2, on the rear surface of this electronic camera with incorporated projector 10, there are provided a liquid crystal display unit 17, an electronic viewfinder 18, actuation members 19, and a speaker aperture 20.

With this electronic camera with incorporated projector 10 being in a state of being mounted upon a desk or the like, projection information such as an image or the like is projected from the projector projection window 13 by an internally housed projection unit (i.e. by a projector) towards a screen that is placed in front of the electronic camera with incorporated projector 10. The electronic camera with incorporated projector 10 internally houses a speaker 21 behind the speaker aperture 20, and this replays information such as audio or the like towards the rear of the electronic camera 10.

The mode changeover dial 15 is a mode changeover actuation member for changing over the operational mode of the electronic camera with incorporated projector between a photographic mode, a projection mode, and so on. The photographic mode is a mode in which an image of a photographic subject is photographed, and the image data that has been photographed is stored as an image file upon a recording medium that consists of a memory card or the like. In the case of still image photography, a still image file is created, while in the case of moving image photography, a moving image (movie) file is created. A photography start command corresponds to an actuation signal that is outputted in response to depression actuation of the release button 14. This electronic camera with incorporated projector 10 internally houses an illumination device that illuminates the photographic subject during photography. The auxiliary photographic light from the illumination device is emitted from the illumination light window 12. In the photographic mode, it is arranged for it to be possible for audio to be captured by a mike that is housed within the rear of the speaker aperture 20 along with the speaker 21, and also for this audio data to be stored upon the recording medium.

The projection mode is an operational mode in which image data that has been previously photographed is read out or the like from the recording medium (for example, a memory card 150 or an internal memory that will be described hereinafter), and a replay image according to this image data is projected from the projector projection window 13 by the projection unit. If audio data is recorded, then audio replay is also performed from the speaker 21. Apart from data that is recorded upon the recording medium, as the projection source, it is also possible to select data that is recorded in the internal memory, or data that is supplied from the exterior of the electronic camera with incorporated projector 10, or the like. The projection unit projects a replay image according to the data that has been selected from among the projection sources.

The electronic camera with incorporated projector 10 is provided with a retraction mechanism that retracts a lens barrel P of the photographic lens 11 into the camera chassis (body), so that the light that is projected from the projector projection window 13 is not interfered with by the lens barrel P.

Figure 3:
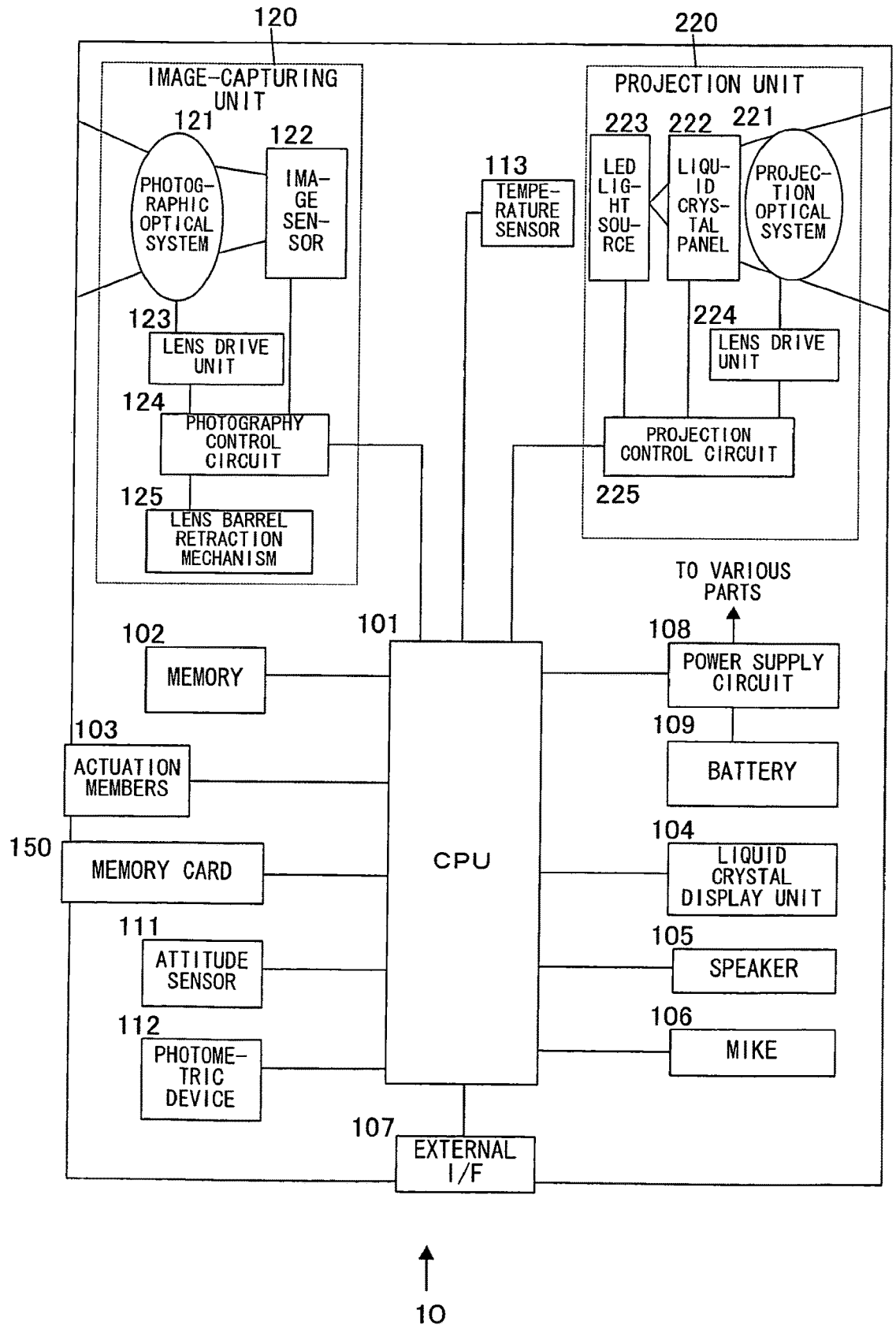
FIG. 3 is a block diagram for explanation of the circuit structure of this electronic camera with incorporated projector.

FIG. 3 is a block diagram for explanation of the circuit structure of this electronic camera with incorporated projector 10. The electronic camera with incorporated projector 10 of FIG. 3 includes a projection unit 220, a image-capturing unit 120, a CPU 101, a memory 102, actuation members 103, a liquid crystal display unit 104, a speaker 105, a mike 106, an external interface (I/F) 107, and a power supply circuit 108. A memory card 150 is fitted into a slot not shown in the figures. This memory card 150 can be removed and loaded. Moreover, a battery 109 is fitted into a battery holder not shown in the figures.

Based upon a control program, the CPU 101 performs predetermined calculations using signals that are inputted from various sections that make up the electronic camera with incorporated projector 10, and controls photographic operation and projection operations by outputting control signals to various sections of the electronic camera with incorporated projector 10. It should be understood that this control program is stored in a non-volatile memory within the CPU 101, not shown in the figures.

The memory 102 is used as a working memory for the CPU 101. The actuation members 103 correspond to the main switch 22, the release button 14, the zoom switch 16, and the mode changeover dial 15 of FIG. 1 and the actuation members 19 of FIG. 2, and included a half press switch and a full press switch (not shown in the figures) that are turned ON and OFF together with depression actuation of the release button 14. The half press switch is turned ON when the amount of depression of the release button 14 reaches a half press actuation amount, while the full press switch is turned ON when the amount of depression of the release button 14 reaches a full press actuation amount that is greater than its half press actuation amount. Each of the actuation members 103 sends an actuation signal to the CPU 101 corresponding to the details of its actuation.

The memory card 150 is built from non-volatile memory such as flash memory or the like, and, upon a command from the CPU 101, writing and storage thereupon, and reading out therefrom of data for images that have been photographed by the image-capturing unit 120, can be performed.

An attitude sensor 111 detects the attitude of the electronic camera with incorporated projector 10, and outputs its detection signal to the CPU 101. Based upon this attitude detection signal, the CPU 101 decides during the photographic mode whether photography is being performed in the horizontal position or in the vertical position, and decides during the projection mode whether the setting attitude of the electronic camera with incorporated projector 10 is within a predetermined range of inclination.

The photometric device 112 calculates the luminance of the photographic subject using the detection signal from a photometric sensor, and sends luminance information to the CPU 101. Based upon this luminance information, during the photographic mode, the CPU 101 performs exposure calculation and determines a control exposure. Furthermore, during the projection mode, based upon this luminance information, the CPU 101 decides whether or not projecting is appropriate.

The power supply circuit 108 is turned ON and OFF according to commands from the CPU 101, and, when it is on, it converts the voltage from the battery 109 to the voltages needed by the various circuits, and thus supplies electrical power to various sections of the electronic camera with incorporated projector 10. It should be understood that, irrespective of the ON or OFF state of the power supply circuit 108, it is arranged for the CPU 101 always to be supplied with electrical power when the battery 109 is loaded.

The liquid crystal display unit 104 (that corresponds to the reference symbol 17 in FIG. 2) displays information such as images and text and the like, according to commands from the CPU 101. Text information may give the operational state of the electronic camera with incorporated projector 10, or may be an actuation menu or the like. And the speaker 105 (that corresponds to the reference symbol 21 in FIG. 2) replays audio from audio data that is outputted from the CPU 101.

The mike 106 converts audio that it has captured to an electrical signal, that it sends to the CPU 101. During the photographic mode, the data in this audio signal is recorded upon the memory card 150.

In order to display a replay image based upon a video signal that is transmitted from an external device such as a video camera or the like upon the liquid crystal display unit 104, or in order to project it with the projection unit 220, the external interface (I/F) 107 converts this video signal into image data, and outputs the resulting image data after conversion to the CPU 101. Moreover, in order to replay an audio signal that is transmitted from an external device through the speaker 105, this external interface (I/F) 107 converts this audio signal into audio data, and outputs the resulting audio data after conversion to the CPU 101.

A temperature sensor 113 is disposed in the neighborhood of the projection unit 220, and outputs a temperature detection signal to the CPU 101. Based upon this temperature detection signal, the CPU 101 calculates the internal temperature in the neighborhood of the projection unit 220.

<The Image-Capturing Unit>

The image-capturing unit 120 includes a photographic optical system 121 (that corresponds to the reference numeral 11 in FIG. 1), an image sensor 122, a lens drive unit 123, a photography control circuit 124, and a lens barrel retraction mechanism 125. A CCD or a CMOS image sensor or the like may be used as the image sensor 122. The photography control circuit 124, along with performing drive control of the image sensor 122 and the lens drive unit 123 according to commands from the CPU 101, also performs predetermined image processing upon image capture signals (accumulated electric charge signals) that are outputted from the image sensor 122. This image processing may be color adjustment processing, edge accentuation processing, gamma correction processing, or the like.

The photographic optical system 121 images an image of the photographic subject upon the imaging surface of the image sensor 122. The photography control circuit 124 starts the capturing of an image by the image sensor 122 upon a photographic start command, and, after the image capture has ended, reads out the accumulated electric charge signal from the image sensor 122 and sends the image data to the CPU 101, after it has been subjected to the image processing described above.

Based upon a focus adjustment signal that is outputted from the photography control circuit 124, the lens drive unit 123 drives a focusing lens (not shown in the figures) that is included within the photographic optical system 121 forwards and backwards along the direction of the optical axis. Moreover, based upon a zoom adjustment signal that is outputted from the photography control circuit 124, this lens drive unit 123 drives a zoom lens (not shown in the figures) that is included within the photographic optical system 121 forwards and backwards along the direction of the optical axis (i.e. to the tele side or the wide side. The focus adjustment amount and the zoom adjustment amount are commanded from the CPU 101 to the photography control circuit 124.

<Focus Adjustment of the Camera>

By shifting the focusing lens of the photographic optical system 121 in the direction of the optical axis, the image capturing unit 120 performs focus adjustment for the photographic optical system 121. If auto focus adjustment is to be performed, then the CPU 101 commands the photography control circuit 124 to perform focus adjustment so that the integrated value of the high frequency component (the so called focus evaluated value) in part of the image signal captured by the image sensor 122 that corresponds to a focus detection area (for example the center of the photographic scene) becomes a maximum. The position of the focusing lens that makes the focus evaluated value become a maximum is the focusing position that makes the contrast of the image become a maximum, without the edges of the image of the photographic subject that is captured by the image sensor 122 becoming blurred.

<Zoom Adjustment of the Camera>

The image-capturing unit 120 performs optical zoom adjustment for the photographic optical system 121 by shifting the zoom lens of the photographic optical system 121 in the direction of the optical axis. The CPU 101 sends a zoom adjustment signal that corresponds to the actuation signal from the zoom switch 16 to the photography control circuit 124. For example, if a right turn actuation signal has been inputted from the zoom switch 16, then the CPU 101 sends a zoom adjustment signal for zooming up, while if a left turn actuation signal has been inputted from the zoom switch 16, then it sends a zoom adjustment signal for zooming down. The zoom switch 16 is built so as, alternatively, to output one of these two different actuation signals.

Furthermore, according to commands from the CPU 101, the photography control circuit 124 sends a command to the lens barrel retraction mechanism 125 either to retract the lens barrel P (see FIG. 1) of the photographic optical system 121 to within the chassis of the electronic camera with incorporated projector 10, or to extend the lens barrel P, that is retracted within the chassis, out to its state during photography (see FIG. 1).

<The Projection Unit>

The projection unit 220 includes a projection optical system 221, a liquid crystal panel 222, a LED (light emitting diode) light source 223, a lens drive unit 224, and a projection control circuit 225. The projection control circuit 225 supplies drive electrical current to the LED light source 223 upon a projection command being outputted from the CPU 101. And the LED light source 223 illuminates the liquid crystal panel 222 at a brightness that corresponds to this supplied electrical current.

Furthermore, the projection control circuit 225 generates a liquid crystal panel drive signal that corresponds to the image data that is sent from the CPU 101, and drives the liquid crystal panel 222 with this generated drive signal. In concrete terms, to the liquid crystal layer of each of the pixels, it applies a voltage corresponding to the image signal. Upon application of this voltage, the arrangement of the liquid crystal molecules in the liquid crystal layer changes, so that the optical transmittivity of that liquid crystal layer changes. The liquid crystal panel 222 creates an optical image by modulating the light from the LED light source in this manner according to the image signal.

The projection optical system 221 projects the optical image that is emitted from the liquid crystal panel 222 towards a screen or the like. And, based upon an offset adjustment signal that is outputted from the projection control circuit 225, the lens drive unit 224 drives the projection optical system 221 forwards and backwards in a direction that is orthogonal to the optical axis. Moreover, based upon a focus adjustment signal that is outputted from the projection control circuit 225, the lens drive unit 224 drives a focusing lens (not shown in the figures) that is included in the projection optical system 221 forwards and backwards along the direction of the optical axis. Furthermore, based upon a zoom adjustment signal that is outputted from the projection control circuit 225, the lens drive unit 224 drives a zoom lens (not shown in the figures) that is included in the projection optical system 221 forwards and backwards along the direction of the optical axis. The offset adjustment amount, the focus adjustment amount, and the zoom adjustment amount are commanded from the CPU 101 to the projection control circuit 225.

<Offsetting the Projected Image>

By the projection optical system 221 being shifted in a direction orthogonal to the optical axis, the emission direction of the ray bundle (light flux) that is emitted from the projector projection window 13 (see FIG. 1) is changed, and the projected image is offset adjusted. It would also be acceptable to provide a structure in which offsetting of the projected image is performed, not by performing shifting of the projection optical system 221, but rather by performing shifting of the liquid crystal panel 222 and the LED light source 223 in a direction that is perpendicular to the optical axis. In other words, it is possible to implement offsetting of the projected image by changing the relative positional relationship of the projection optical system 221 and the liquid crystal panel 222 in a direction perpendicular to the optical axis.

<Keystone Correction of the Projected Image>

Since the projected image would be changed into a trapezoidal shape by simply imparting the above described offset to the projected image, accordingly the CPU 101 implements electronic keystone correction by performing image processing in order to correct the projected image from such a trapezoidal shape to a rectangular shape. An initial correction value for compensating the projected image in advance to a rectangular shape is stored in the memory within the CPU 101. The CPU 101 reads out the initial correction value that corresponds to the offset adjustment amount, performs keystone correction processing in the memory 102 upon the data for the image that is to be projected based upon this initial correction value that has been read out, and outputs the image data after this keystone correction processing to the projection control circuit 225.

<Focus Adjustment of the Projected Image>

The projection unit 220 performs focus adjustment for the projection optical system 221 by shifting the focusing lens of the projection optical system 221 in the direction of the optical axis. In the case that manual focus adjustment is to be performed, the CPU 101 sends a focus adjustment signal that corresponds to an actuation signal from an actuation member 103 to the projection control circuit 225.

Auto focusing of the projection unit 220 is performed by a projected image being captured by the image-capturing unit 120. If auto focus adjustment is to be performed, then the CPU 101 sends a focus adjustment signal to the projection control circuit 225, so that the integrated value of the high frequency component (the so called focus evaluated value) for the image signal, in the image signal captured by the image-capturing unit 120, that corresponds to a focus detection area (for example the center of the photographic scene) becomes a maximum. The position of the focusing lens that makes the focus evaluated value become a maximum is the focusing position that makes the contrast of the projected image become a maximum, without the edges of the image of the projected image, that is the photographic subject of the image-capturing unit 120, becoming blurred.

<Zoom Adjustment of the Projected Image>

The projection unit 220 performs zoom adjustment with the projection optical system 221 by shifting the zoom lens of the projection optical system 221 in the direction of the optical axis. The CPU 101 sends a zoom adjustment signal to the projection control circuit 225 that corresponds to the actuation signal from an actuation member 103.

<Projection Source: The Source>

According to a command from the CPU 101, the projection unit 220 projects and replays contents from any one of the sources "source #1" through "source #4" described below. Each time a source changeover actuation signal is inputted from an actuation member 103, the CPU 101 outputs image data that corresponds to an image to the projection unit 220, so as cyclically to change over the projected image of "source #1" through "source #3" in the order from "source #1" to "source #2" to "source #3" to "source #1". However, if no memory card 150 is installed in this electronic camera with incorporated projector 10, then "source #1" is skipped over. Furthermore, if no external device is connected to the external interface (I/F) 107, then "source #3" is skipped over.

Furthermore, when an actuation signal is inputted from an actuation member 103 to changeover to chart projection, then the CPU 101 outputs image data to the projection unit 220 corresponding to "source #4" described below.

Source #1: a replay image from data that has been read out from the memory card 150;

Source #2: a replay image from image data that is recorded upon an internal memory (a non-volatile memory within the CPU 101 or the like);

Source #3: a replay image from data that is inputted from the external interface (I/F) 107;

Source #4: an image that is a chart for focus adjustment, for example an image consisting of a banded pattern with black lines upon a white ground.

When an image that corresponds to the above described "source #1" or "source #2" is to be projected, the CPU 101 reads out image data in order from the memory card 150 (or the internal memory) first the image data whose recording date and time are the most recent (i.e. that image data, among the recorded image data, that was photographed last), and sends these image data that has thus been readout to the projection unit 220.

<The Projection Module>

Figure 4:
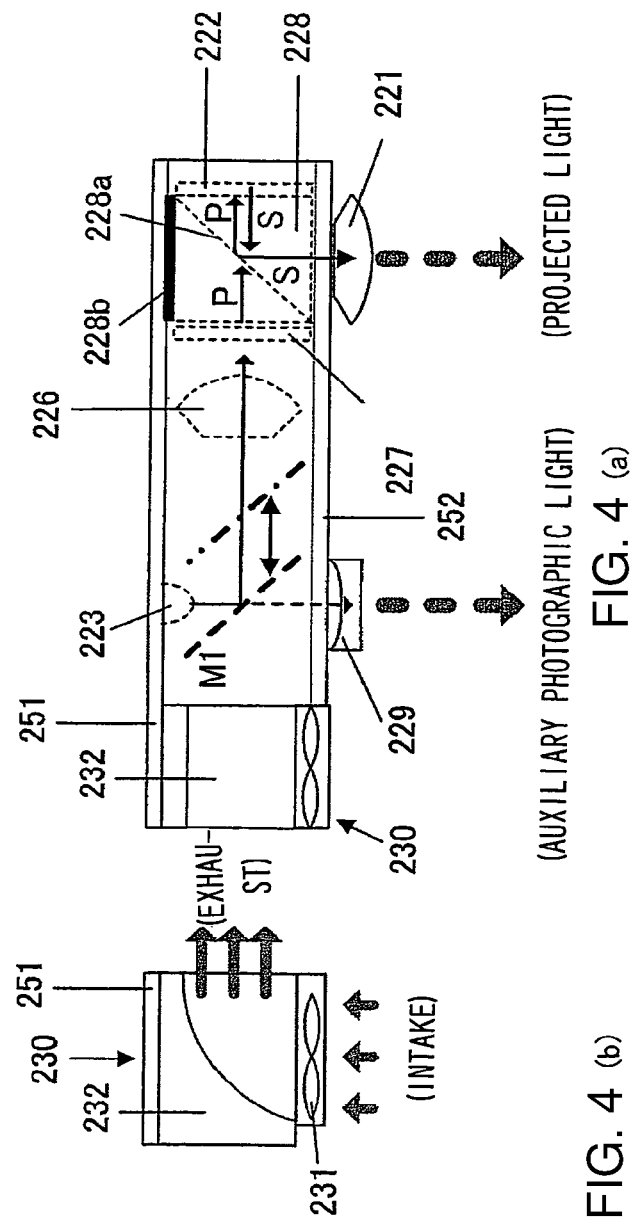
FIG. 4 (a) is a plan view as seen from above of an optical system of a projection unit, and FIG. 4 (b) is a left side view thereof.
Figure 5:
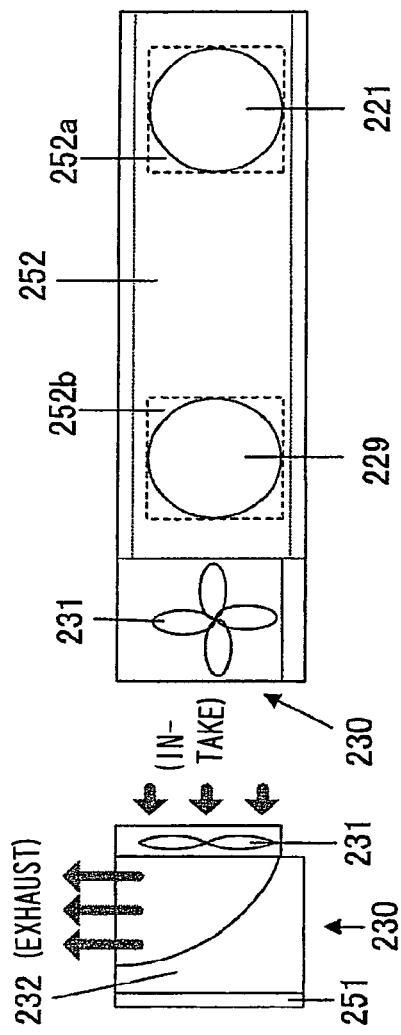
FIG. 5 (a) is an elevation view of this optical system of the projection unit as seen from the front, and FIG. 5 (b) is a left side view thereof.

The details of the optical system arrangement of the projection unit 220 will now be explained with reference to FIGS. 4 and 5. FIG. 4(*a*) is a plan view as seen from above of the optical system of the projection unit 220 that is incorporated in this electronic camera with incorporated projector 10, and FIG. 4(*b*) is a left side view thereof. Moreover, FIG. 5(*a*) is an elevation view of this optical system as seen from the front, and FIG. 5 (*b*) is a left side view thereof.

The optical system of the projection unit 220 consists of a quadrangular prism shaped module (hereinafter termed the projection module) whose bottom surface is approximately a square that is approximately 10 mm on a side. The projection module is disposed so that its longitudinal direction is horizontal, and to its left side surface there is joined a cooling block 230 that is made approximately as a cube approximately 10 mm on a side. It should be understood that, in order to make the internal structure easier to understand, in FIGS. 4(*a*) and 5(*a*), the size of the quadrangular prism in the longitudinal direction is shown as being longer than it actually is.

The projection module includes the LED 223, a mirror M1, a condensing optical system 226, a light polarizing plate 227, a PBS (polarized beam splitter) block 228, a liquid crystal panel 222, the projection optical system 221, and an illumination optical system 229.

Among the above described members, apart from the projection optical system 221 and the illumination optical system 229, all the other members constitute a unified structure upon a thin metallic plate. In concrete terms, the LED 223 is mounted upon a rectangular aluminum plate 251 (upon a pattern that is formed over an insulating layer) that is made in a quadrangular prism shape with one surface in the longitudinal direction, and the mirror M1 that bends the light from the LED 223 in the rightwards direction and a mirror support member (not shown in the figures) that supports the mirror M1 are provided upon this base plate 251. The mirror support member is adhered to the base plate 251, and the mirror M1 is shiftable between a position shown by the broken line and a position shown by the single dotted broken line. The driving of the mirror M1 is performed using an actuator (a piezoelectric element or the like) not shown in the figures.

Furthermore, on the right side of the mirror M1, the condensing optical system 226 and the PBS block 228 are adhered upon the base plate 251. The PBS block 228 is a polarized beam splitter in which a polarized light separator 228*a* that subtends an angle of 45° with respect to the incident optical axis is sandwiched between two triangular prisms. Non-reflection processing such as, for example, black coloring processing or the like is performed upon the surface 228*b* of the PBS block 228 that is adhered to the base plate 251.

Figure 39A:
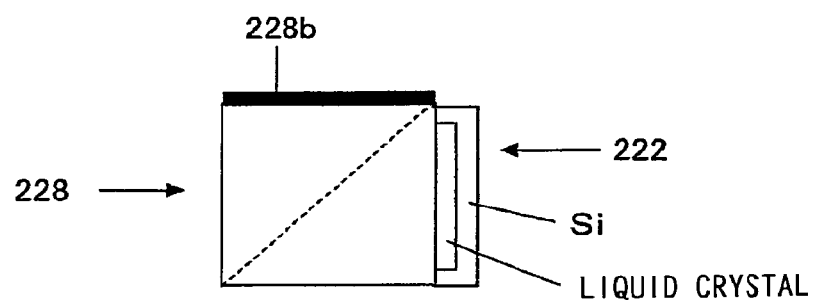
FIG. 39(a) and FIG. 39(b) are enlarged views of a PBS block and a liquid crystal panel.
Figure 39B:
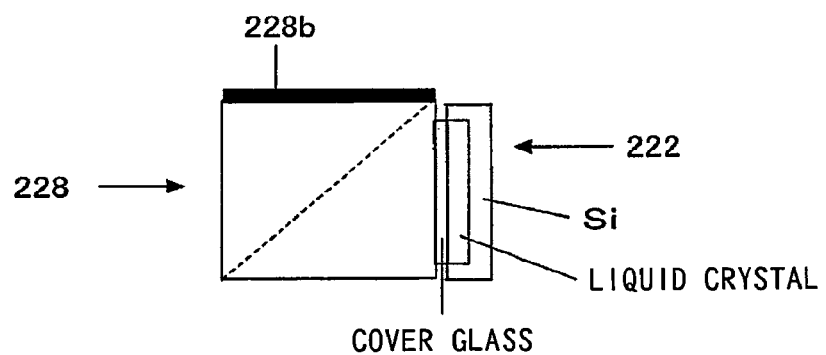

The light polarizing plate 227 is disposed upon the condensing optical system side surface of the PBS block 228 (i.e. upon its left side surface), and the liquid crystal panel 222, that is constituted by a reflective type liquid crystal element (LCOS) is disposed upon the right side surface of the PBS block 228. Here, no cover glass is provided to the liquid crystal panel 222 upon its PBS block side surface that emits light (i.e. upon its left side surface), so that the liquid crystal panel 222 is directly adhered to the right side surface of the PBS block 228 (refer to FIG. 39(*a*)). It should be understood that, if such a cover glass is not omitted, the surface of the cover glass and the right side surface of the PBS block 228 are fixed together so as to be closely adhered together, as shown in FIG. 39(*b*).

A lid member 252 made by processing an aluminum plate by sheet metal bending is disposed so as to cover over the various members upon the above described base plate 251. An aperture 252*a* and an aperture 252*b* are provided in this lid member 252, and the projection optical system 221 is disposed in the aperture 252*a*, while the illumination optical system 229 is disposed in the aperture 252*b*.

While the above described apertures are shown in the figure, by way of example, as being made in the shape of quadrilaterals, it would also be acceptable to make these apertures in circular shapes. If such a circular shaped aperture is provided, and if the cross sections of the aperture is made as a screw, with the lens barrel of the projection optical system 221 being screwingly engaged into this screw, then it would be possible to perform focus adjustment for the projection optical system 221 by rotating the lens barrel manually.

The cooling block 230 consists of a heat dissipation (radiation) member 232 that is made by forming a cube shaped aluminum block so that a portion thereof is approximately vane shaped in cross section, and a cooling fan 231. The heat dissipation member 232 is joined at its surface to the base plate 251, so that heat is well conducted from the base plate 251. In concrete terms, a filler material whose thermal conductivity is high is charged between the heat dissipation member 232 and the baseplate 251, or a sheet of high conductivity material is sandwiched between them.

The cooling fan 231 may be, for example, an intake fan that takes in air from a vent aperture 23 that is provided in the front surface of the electronic camera with incorporated projector 10. The intake air flow cools the heat dissipation member 232 while proceeding along the curved surface of the heat dissipation member 232, and changes its flow direction upwards so as to be exhausted from a vent aperture 24 that is provided upon the upper surface of the electronic camera with incorporated projector 10.

The base plate 251 is built, not only so as to dissipate heat to the above described cooling block 230, but also so as to dissipate heat to other members as well. For example, thermally conductive sheets or the like are provided between the base plate 251 (particularly in the neighborhood of the heat dissipation member 232 and the LED 223) and a metallic back panel member (not shown in the figures) of the liquid crystal display unit 104 (see FIG. 3), and between the base plate 251 and a block member of a DC motor for lens driving (not shown in the figures), so as to join them together and to conduct heat between them.

With the projection module of the structure described above, drive electrical current is supplied to the LED 223 upon the base plate 251 via a harness and a wiring pattern not shown in the figures. During the projection mode, the mirror M1 is shifted by the mirror support member to its position shown by the broken line (see FIG. 4(a)), while during the photographic mode it is shifted to its position shown by the single dotted broken line (see FIG. 4(a)). The shifting of the mirror M1 is performed according to a command from the projection control circuit 225.

The LED 223 emits light of a brightness corresponding to the drive electrical current in the downward direction in FIG. 4 (a). In the projection mode, this LED light is bent by the mirror M1 and is condensed by the condensing optical system 226. The condensing optical system 226 makes the LED light into approximately parallel light, that is incident upon the light polarizing plate 227. The light polarizing plate 227 converts the incident light into linearly polarized light, and emits the polarized light after conversion towards the PBS block 228.

The polarized light ray bundle that is incident upon the PBS block 228 (for example P polarized light) passes through the PBS block 228 and illuminates the liquid crystal panel 222. The liquid crystal panel 222 consists of a plurality of pixels upon which red, green, and blue filters are formed, and creates a color image. When the light that passes through the liquid crystal layer of the liquid crystal panel 222 is incident upon the liquid crystal panel 222, it progresses through that liquid crystal layer in the rightwards direction, and, after having been reflected by the reflective surface of the liquid crystal panel 222, progresses in the leftward direction through the liquid crystal layer and is emitted from the liquid crystal panel 222, to be incident upon the PBS block 228 for a second time. Since the liquid crystal layer to which voltage is applied functions as a phase plate, this light that is incident upon the PBS block 228 for a second time is a mixture, consisting of modulated light that is S polarized light and unmodulated light that is P polarized light. Of this ray bundle that is incident for a second time, the PBS block 228 reflects (bends), with the polarized light separator 228a, only the modulated light that is the S polarized light component, and emits it as projected light in the downwards direction towards the projection optical system 221. The position in which the projection optical system 221 is disposed corresponds to the projector projection window 13 (see FIG. 1).

On the other hand, in the photographic mode, the LED light is not reflected by the mirror M1 but progresses in the downward direction, and is incident upon the illumination optical system 229. And the illumination optical system 229 emits this LED light at the optimum angle of view for auxiliary photographic light. The position in which the illumination optical system 229 is disposed corresponds to the illumination light window 12 (see FIG. 1).

Since the present invention is specifically distinguished by the operation when the above described electronic camera with incorporated projector 10 is changed over to the projection mode, accordingly the explanation will focus upon the control that is performed by the CPU 101 when the projection mode is started.

Figure 6:
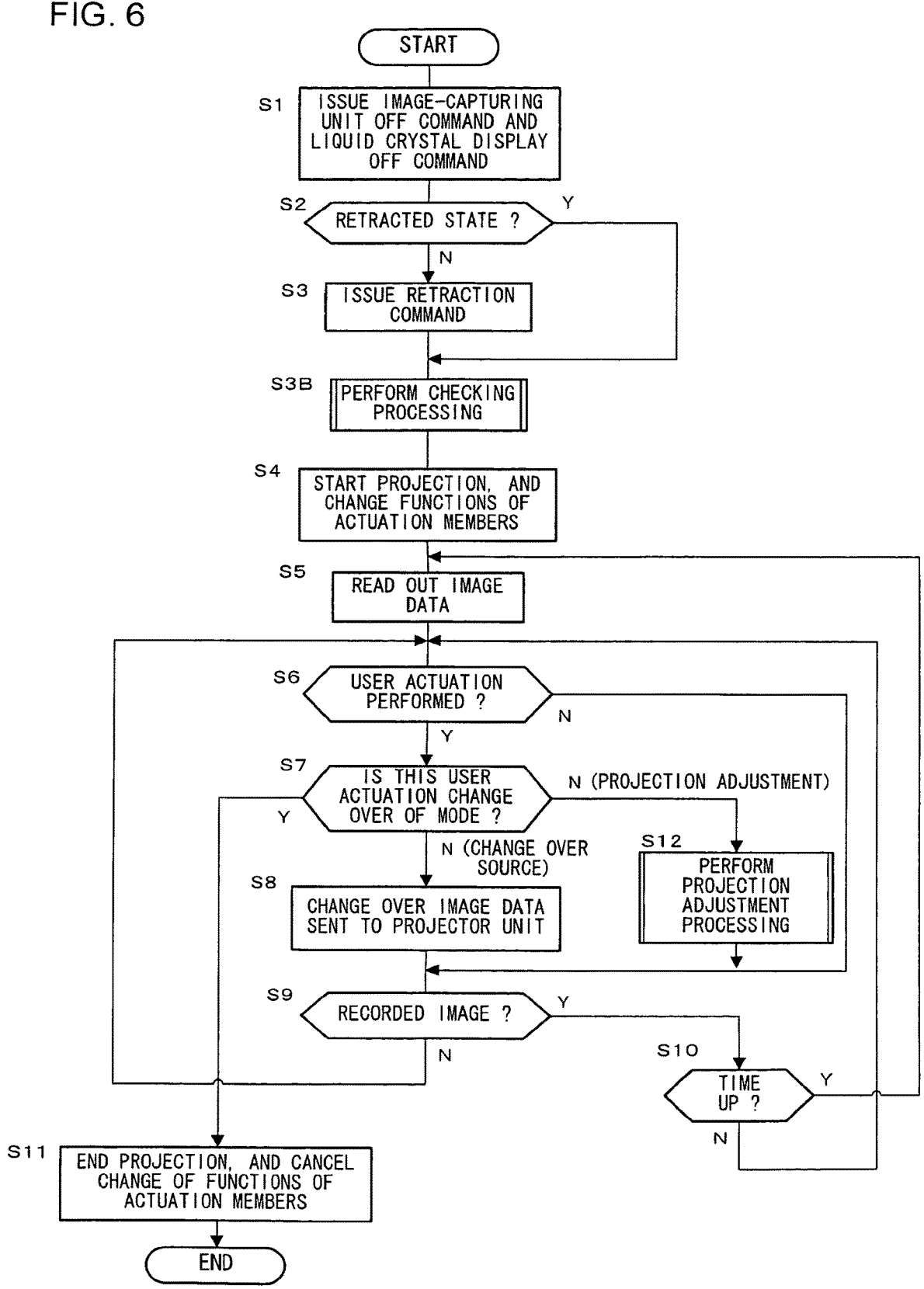
FIG. 6 is a flow chart for explanation of the flow of processing performed by a CPU in projection mode.

FIG. 6 is a flow chart for explanation of the flow of processing performed by a program that is executed in the projection mode by the CPU 101 of this electronic camera with incorporated projector 10. If the power supply is already ON, the processing in FIG. 6 starts when an actuation signal is inputted from the mode changeover dial 15 that commands the CPU 101 to change over to the projection mode; or, in the state in which the mode changeover dial 15 is actuated to the projection mode, when ON actuation of the main switch is performed.

In a step S1 of FIG. 6, the CPU 101, along with commanding the image-capturing unit to go to OFF, also commands the liquid crystal display unit 104 to turn its display OFF; and then the flow of control proceeds to a step S2. Due to this, the image capturing operation is stopped, and display by the liquid crystal unit 104 stops.

In the step S2, the CPU 101 makes a decision as to whether or not the lens barrel P is in the retracted state. If the CPU 101 receives a signal from the photography control circuit 124 that indicates the retracted state, then an affirmative decision is reached in this step S2 and the flow of control proceeds to a step S3B, while if the CPU receives a signal that indicates the non-retracted state, then a negative decision is reached in this step S2 and the flow of control proceeds to a step S3. In the step S3, the CPU 101 sends a retract command to the photography control circuit 124 and then the flow of control proceeds to the step S3B.

In the step S3B, the CPU 101 performs checking processing, and then the flow of control proceeds to a step S4. This checking processing is for deciding whether or not the brightness of the room and the attitude of the electronic camera with incorporated projector 10 and the like are suitable for projection, and the details thereof will be described hereinafter.

In the step S4 the CPU 101, along with commanding the projection control circuit 225 to start projection, also changes the functions of the release button 14 and the zoom switch 16 that are among the actuation members 103 that are provided upon the upper surface of the electronic camera with incorporated projector 10, and then the flow of control proceeds to a step S5. By the projection start command, the LED light source 223 in the projection unit 220 is lit up, the driving of the liquid crystal panel 222 is started, and the cooling fan 231 is started. It should be understood that it would also be acceptable to provide a structure in which the functions of the release button 14 and the zoom switch 16 are changed over first, and projection is started upon full press actuation of the release button 14.

After the step S4 described above, until the change of function of the actuation members 103 is cancelled in a step S11 that will be described hereinafter, the release button 14 and the zoom switch 16 are handled as actuation members that have different functions to those they had in the photographic mode. In the case of the release button 14, it is handled, not as an actuation member for issuing a photographic command, but as an actuation member for starting auto focus adjustment of the projected image, changing over to the projected chart for focus adjustment image of the "source #4" described above, rotating the projected image, and pausing the projection operation. And, in the case of the zoom switch 16, it is handled, not as an actuation member for performing zoom adjustment of the photographic optical system 121, but as an actuation member for performing zoom adjustment of the projection optical system 221 (i.e. of the projected image).

Moreover, after the step S4 in which projection by the projection unit 220 is started, it is arranged to perform similar checking processing to that performed in the step S3B as timer interrupt processing, each time a predetermined time period elapses (however, with the exception of during the processing of a step S12 that will be described hereinafter).

In this embodiment, the projection source "source #1" is set as the default setting during the projection mode. In the step S5, the CPU 101 reads out the most recent image data from the memory card 150 and sends this read out image data to the projection unit 220, and then the flow of control proceeds to a step S6. Due to this, a replay image is projected according to the image data that the CPU 101 sent to the projection unit 220. It should be understood that, if audio data is stored in correspondence to the data file for the image that is being projected, then the CPU 101 replays audio corresponding to this audio data from the speaker 105. The image data may be mixed, such as still image-moving image-still image-still image.

In the step S6, the CPU 101 makes a decision whether or not actuation by the user has been performed. If an actuation signal has been inputted from the actuation members 103 (see FIG. 3), then the CPU 101 reaches an affirmative decision in this step S6 and the flow of control proceeds to a step S7, whereas if no actuation signal has been inputted from the actuation members 103 then the CP 101 reaches a negative decision in this step S6 and the flow of control is transferred to a step S9.

In the step S9, the CPU makes a decision as to whether or not the image data sent to the projection unit 220 is an image that corresponds to the above described "source #1" or "source #2" (in other words as to whether it is an image that has been recorded by photography). If the image data sent to the projection unit 220 is a recorded image, then the CPU 101 reaches an affirmative decision in this step S9 and the flow of control proceeds to a step S10, whereas if the image data sent to the projection unit 220 is an image that corresponds to the above described "source #3" (in other words if it is a non-recorded image), then a negative decision is reached in this step S9 and the flow of control returns back to the step S6. It should be understood that a negative decision is reached in the step S9, also in the case of a chart for focus adjustment that corresponds to the above described "source #4".

In the step S10, the CPU 101 decides whether or not time up has occurred. If an internal timer has timed a predetermined display time period (for example 5 seconds), then the CPU 101 reaches an affirmative decision in this step S10 and the flow of control returns to the step S5, whereas if the predetermined time period has not been reached then a negative decision is reached in this step S10 and the flow of control returns to the step S6. It should be understood that the timer times the time period that has elapsed from when the data for the image being projected was read out.

If the flow of control returns from the step S10 to the step S5, then this is the case of performing so called slide show projection. In other words, an image is projected according to the image data that has been read out from the memory card 150 (or from the internal memory), and, when 5 seconds has been timed, the next image data is read out from the memory card 150 (or from the internal memory), and the image being projected is sequentially updated to a projected image according to the image data that was subsequently read out. It should be understood that the projection time period for each image during slide show projection is not limited to being an interval of 5 seconds as described above; it may be arranged to change this time period to any appropriate setting.

It should be understood that, separately from the above described timing, it would also be acceptable to arrange to read out the next image data from the memory card 150 (or from the internal memory) if an actuation signal is outputted from an actuation member (for example from the cruciform key type actuation member 19 shown in FIG. 2) that specifies actuation in the rightwards direction, and to read out the previous image data from the memory card 150 (or from the internal memory) if an actuation signal is outputted from an actuation member that specifies actuation in the leftwards direction.

In the step S7 that is reached in the case of an affirmative decision in the step S6 described above, the CPU 101 makes a decision as to whether or not the actuation by the user is actuation for mode changeover. If the actuation signal that has been inputted is an actuation signal from the mode changeover dial 15 for changeover to the photographic mode, then the CPU 101 reaches an affirmative decision in this step S7 and the flow of control is transferred to a step S11. Moreover, if the actuation signal that has been inputted is a source changeover actuation signal from the release button 14 and the zoom switch 16 (for example if an actuation signal from the zoom switch 16 and a half press actuation signal from the release button 14 are inputted at the same time), then the CPU 101 reaches a negative decision in this step S7 and the flow of control proceeds to a step S8. Even further, if the actuation signal that has been inputted is an actuation signal from the release button 14 or the zoom switch 16, then the CPU 101 reaches a negative decision in this step S7 and the flow of control is transferred to a step S12. If the flow of control has proceeded to the step S8 then this is considered as being a command for source changeover, whereas if the flow of control has proceeded to the step S12 then this is considered as being a command for projection adjustment.

In the step S11 the CPU 101, along with commanding the projection control circuit 225 to terminate projection, also cancels the changeover of the functions of the release button 14 and the zoom switch 16, and then the processing of FIG. 6 terminates. Due to this, the LED light source 223 in the projection unit 220 is turned OFF, the driving of the liquid crystal panel 222 stops, and the cooling fan 231 stops.

In the step S8, the CPU 101 changes over the image data sent to the projection unit 220 in the order described above from "source #1" to "source #2" to "source #3" to "source #1", once for each time that an actuation signal from the zoom switch 16 and a half press actuation signal from the release button 14 are inputted simultaneously, and then the flow of control is transferred to the step S9.

In the step S12 the CPU 101 performs projection adjustment processing, and then the flow of control is transferred to the step S9. The details of this projection adjustment processing will now be explained with reference to the flow chart shown in FIG. 7. In a step S51 of FIG. 7, the CPU 101 makes a decision as to whether or not the actuation member that has been actuated by the user is the zoom switch 16. If the inputted actuation signal is an actuation signal from the zoom switch 16, then the CPU 101 reaches an affirmative decision in this step S51 and the flow of control proceeds to a step S52, whereas if the inputted actuation signal is not an actuation signal from the zoom switch 16, then a negative decision is reached in this step S51, and the flow of control is transferred to a step S53.

In the step S52 the CPU 101 performs optical zooming processing, and then the flow of control returns to the step S51. As such optical zooming processing, for example, if the zoom switch 16 has been actuated by being turned to the right, then the CPU 101 may send a zoom adjustment signal to the projection control circuit 225 so as to zoom up the projected image, whereas, if the zoom switch 16 has been actuated by being turned to the left, then the CPU 101 may send a zoom adjustment signal to the projection control circuit 225 so as to zoom down the projected image.

In the step S53, the CPU makes a decision as to whether or not the release button 14 has been half press actuated by the user (in other words as to whether or not an actuation signal has been outputted from the half press switch). If the signal that has been inputted is a half press actuation signal, then the CPU 101 reaches an affirmative decision in this step S53 and the flow of control proceeds to a step S54, whereas if it is not a half press actuation signal then a negative decision is reached in this step S53 and the flow of control is transferred to a step S56.

In the step S54, the CPU 101 makes a decision as to whether or not a long press has been performed. If the half press actuation signal has been released within a predetermined time period (for example 3 seconds), then the CPU 101 reaches a negative decision in this step S54 and the flow of control proceeds to a step S55, whereas if the half press actuation signal has been maintained for the predetermined time period or longer then the CPU 101 reaches an affirmative decision in this step S54, and the flow of control is transferred to a step S59.

A half press actuation signal during that the release button 14 has been half press actuated but not pressed for a long time, corresponds to an auto focus (AF) command. Thus, in the step S55, the CPU 101 starts AF processing, and then the flow of control proceeds to a step S55B. In concrete terms, along with commanding the photography control circuit 124 to turn the image-capturing unit ON, the CPU 101 sends a focus adjustment signal to the projection control circuit 225 so as to make maximum the focus evaluated value, that is obtained from the image signal that is captured by the image-capturing unit 120. The photographic subject that is captured by the image-capturing unit 120 is the projected image upon the screen. It should be understood that the focusing lens of the photographic optical system 121 is shifted to a predetermined position during the AF processing of this step S55 (for example, to a position that corresponds to a photographic subject distance of 1 m from the electronic camera with incorporated projector 10). When the AF processing ends, the CPU 101 commands the photography control circuit 124 to turn the image-capturing unit OFF, and returns the focusing lens to its original position.

In the step S55B, the CPU 101 stores the contrast information that has been acquired by the AF processing in the memory 102, and then the flow of control returns to the step S51. The contrast information becomes distance information to the screen. Contrast information obtained when an image of the chart for focus adjustment of "source #4" that was projected from the electronic camera with incorporated projector 10 to a screen 1 m away was captured, is stored in advance in the CPU 101 as reference data. The CPU 101 stores the contrast information that has been acquired, so as to be able to compare it with the reference data in a step S65 that will be described hereinafter.

A half press actuation signal during that the release button 14 has been half press actuated for a long time, corresponds to a changeover command for turning chart projection between ON and OFF. Thus, in the step S59, the CPU 101 makes a decision as to whether or not the above described chart for focus adjustment of "source #4" is being projected. If such a chart image is being projected (i.e. if the image data for the chart for focus adjustment has been sent to the projection unit 220), then the CPU 101 reaches an affirmative decision in this step S59 and the flow of control proceeds to a step S60, whereas if a replay image from any one of "source #1" through "source #3" described above is being replayed, then the CPU 101 reaches a negative decision in this step S59, and the flow of control is transferred to a step S61.

In the step S60, the CPU 101 turns chart projection OFF. In concrete terms, instead of the chart image, the CPU 101 sends to the projection unit 220 the image data that was projected most recently, so as to project the replay image of that one of the above described "source #1" through "source #3" that was most recently projected before the projection of the chart; and then the flow of control returns to the step S51.

In the step S61, the CPU 101 turns chart projection ON. In concrete terms, instead of the replay image of one of the above described "source #1" through "source #3", the CPU 101 sends to the projection unit 220 the chart image data, so as to project the chart image of the above described "source #4"; and then the flow of control returns to the step S51.

In the step S56, the CPU 101 makes a decision as to whether or not the release button has been full press actuated by the user (in other words whether an actuation signal has been outputted from the full press switch). If the actuation signal that has been inputted is a full press actuation signal, then the CPU 101 reaches an affirmative decision in this step S56 and the flow of control proceeds to the step S57, whereas if it is nota full press actuation signal then a negative decision is reached in this step S56 and the flow of control is transferred to the step S65.

In the step S57, the CPU 101 makes a decision as to whether or not the full pressing has continued for a long time. If the full press actuation signal has been cancelled within a predetermined time period (for example, 3 seconds), then the CPU 101 reaches a negative decision in this step S57 and the flow of control proceeds to a step S58, whereas if the full press actuation signal has been continued for the predetermined time period or greater then the CPU 101 reaches an affirmative decision in this step S57 and the flow of control is transferred to a step S62.

A full press actuation signal due to full press actuation of the release button 14 that is not continued for a long time period corresponds to a command for rotation of the projected image. In the step S58, the CPU 101 rotates the projected image in the manner described below, and then the flow of control returns to the step S51.

<Rotating the Projected Image>

Having rotated the image data in the memory 102 clockwise through 90°, the CPU 101 sends the image data after this rotation processing to the projection unit 220. At this time, the CPU 101 also performs size matching conversion processing, according to the aspect ratio of the projected image, so as to keep the image after rotation processing within the projection range. For example, if the aspect ratio of the image data is 4 horizontally by 3 vertically, and the aspect ratio of the liquid crystal panel 222 is also expressed as 4 horizontally by 3 vertically, then, after the image has been processed by rotation, its data size is shrinkage processed so that it has ¾ of the number of pixels both in the vertical direction and in the horizontal direction. As a result, an image is projected upon which rotation processing and shrinkage processing have been performed, so that the long side of the image data and the short side of the liquid crystal panel 222 correspond.

The CPU 101 is built so as to repeat the above described size conversion processing and rotation processing each time a rotation command for the projected image is inputted. In this size conversion processing, according to the above described aspect ratios, shrinkage processing to shrink the number of pixels by ¾ both vertically and horizontally (i.e. so as to make the long side of the image data correspond to the short side of the liquid crystal panel 222) and enlargement processing to magnify the number of pixels by 4/3 both vertically and horizontally (i.e. so as to make the long side of the image data correspond to the long side of the liquid crystal panel 222) are performed alternatingly. By the above described rotation processing, for example, if the rotation command for the projected image is performed four times in succession, along with rotating the projected image clockwise through one turn, the size of the projected image is also returned to the same size as before the rotation command for the projected image was inputted. It should be understood that it could also be arranged for the rotation direction of the projected image to be anticlockwise.

A full press actuation signal in which the full pressing actuation of the release button 14 is continued for a long time period corresponds to a command to changeover the projection operation between paused and cancelled. Thus, in the step S62, the CPU 101 makes a decision as to whether or not the projection operation is being paused. If corresponding to the long time period pressing actuation the projection operation is being paused, then the CPU 101 reaches an affirmative decision in this step S62 and the flow of control proceeds to a step S63, whereas if projection is being performed then it reaches a negative decision in this step S62 and the flow of control is transferred to a step S64.

In the step S63, the CPU 101 cancels the pause. In concrete terms, the CPU 101 sends a command to the projection control circuit 225 to resume the supply of electrical current to the LED light source 223 and the liquid crystal panel 222, and then the flow of control returns to the step S51. Due to this, the projection of an optical image from the projection unit 220 is resumed.

During pausing, if the contents being projected is the above described "source #1", then the information on the memory card 150, and the data that has been read in from the memory card 150, are stored in the memory 102. In a similar manner, if the contents being projected is the above described "source #3", then communication is continued between the external interface 107 and the external device, and the data that is received by the external interface 107 is stored in the memory 102. By storing the data during pausing in the memory 102 in this manner, when the pausing is cancelled, it is possible immediately to resume projection using the data that is stored in the memory 102.

In the step S64, the CPU 101 pauses the projection operation. In concrete terms, the CPU 101 sends a command to the projection control circuit 225 to stop the supply of electrical current to the LED light source 223 and the liquid crystal panel 222, and then the flow of control returns to the step S51. Due to this, the projection of an optical image from the projection unit 220 is stopped.

In the step S65, the CPU 101 makes a decision as to whether or not the distance is OK. The CPU 101 compares together the contrast information that was stored in the step S55B and the reference data described above, and if the contrast difference between them is within a predetermined difference it decides that the distance is OK, and terminates the processing of FIG. 7 so that the flow of control is transferred to the step S9 of FIG. 6. If the contrast difference becomes a minimum, the distance from the screen is 1 m, and this is when the focus of the projection optical system 221 is appropriately adjusted. If the distance to the screen is not 1 m, then the contrast difference becomes greater. If the contrast difference is greater than the predetermined difference, then the CPU 101 reaches a negative decision in this step S65 and the flow of control proceeds to a step S66.

Figure 7:
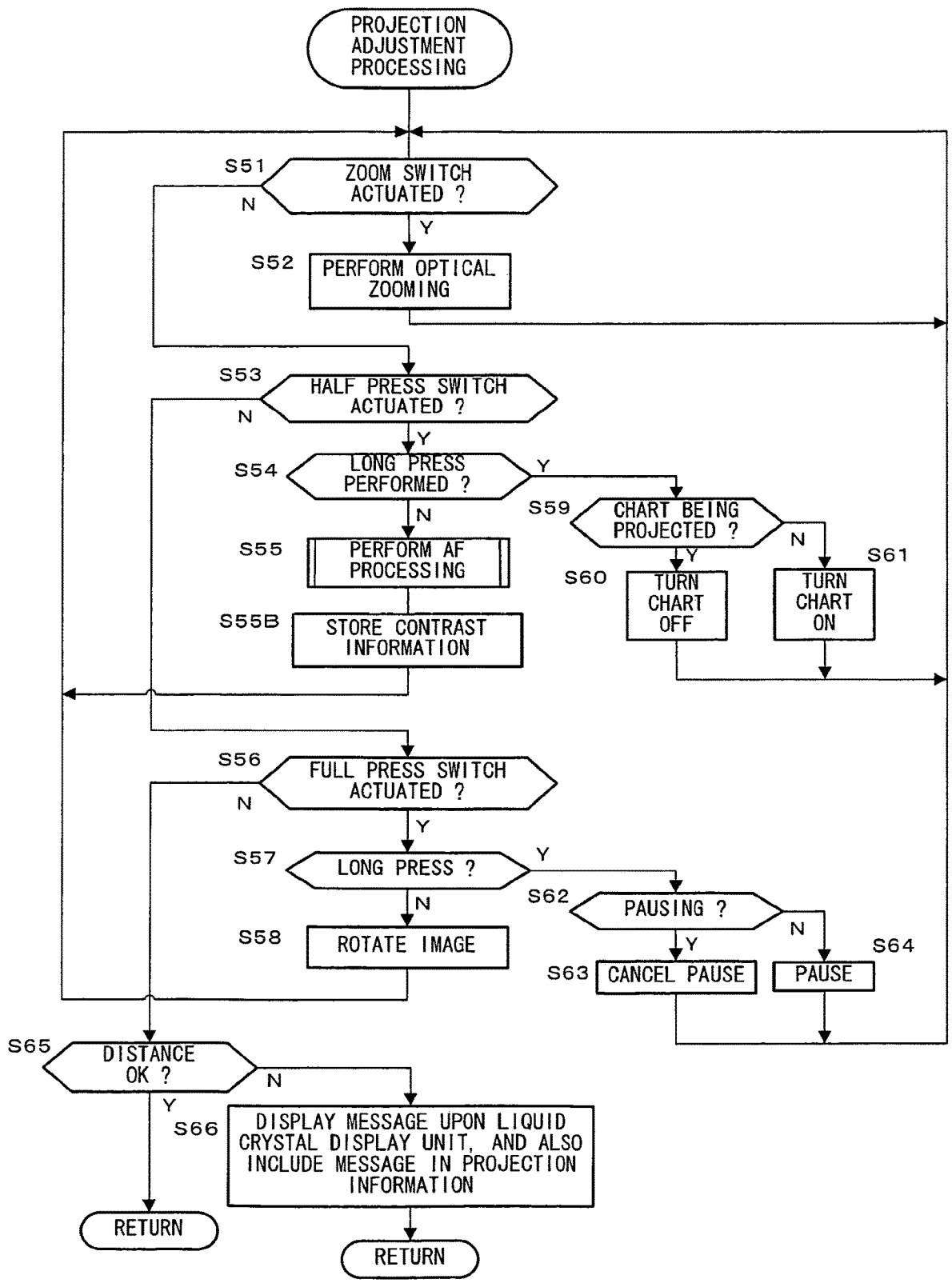
FIG. 7 is a flow chart for explanation of the details of projection adjustment processing.

In the step S66, the CPU 101 issues a command to the projection control circuit 225, and, along with superimposing a message upon the projected image, also displays a similar message upon the liquid crystal display unit 104, and then the processing of FIG. 7 terminates. The contents of this message may be, for example, "Please check the distance to the screen" or the like, in order to invite the user to check the installation of the screen.

The AF processing in the step S55 described above will now be further explained. In order to perform auto focus adjustment with the projection optical system 221 using the so-called hill climbing focus detection method, this electronic camera with incorporated projector 10 drives the focusing lens (of the projection optical system 221) forwards and backwards along the direction of the optical axis while performing projection from the projection unit 220 towards the screen, and repeatedly captures the image projected upon the screen with the image-capturing unit 120.

Accordingly, during the above described AF processing, the projection control circuit 225 performs both driving of the LED light source 223 and also driving of the focusing lens (of the projection optical system 2221). The driving of the focusing lens is performed by pulse driving a DC motor (not shown in the figures) within the lens drive unit 224. The electrical current that is supplied to the DC motor for this pulse driving may be supposed to be, for example, an electrical current in pulse form of frequency 60 Hz and duty ratio 50%.

On the other hand, during the driving of the DC motor, the electrical current that is supplied to the LED light source 223 is also supposed to be an electrical current in pulse form of frequency 60 Hz and duty ratio 50%. The projection control circuit 225 shifts the phase of these two currents apart by 180°, so that the peak value of the drive electrical current to the DC motor and the peak value of the drive electrical current to the LED light source 223 do not overlap. The reason for this is in order to suppress the peak consumption of electrical current by the projection unit 220 and thus to alleviate the load upon the power supply circuit 108 (to put it in another manner, upon the battery 109).

Although the projected image is caused to blink due to this pulse driving of the LED light source 223, since the blink frequency is 60 Hz, the user who is observing the projected image does not feel any sense of discomfort or the like due to the flickering. When not driving the focus motor (i.e. when not supplying pulse electrical current to the DC motor), the projection control circuit 225 returns the electrical current that is supplied to the LED light source 223 to DC electrical current.

It should be understood that the same type of operation is performed when driving both the LED light source 223 and the focusing lens of the image-capturing unit 120. In other words, when shifting the focusing lens of the photographic optical system 121 to its predetermined position during the AF processing of the step S55, the photography control circuit 124 supplies a pulse form electrical current of frequency 60 Hz and duty ratio 50% to the DC motor (not shown in the figures) within the lens drive unit 123 that drives the focusing lens (of the photographic optical system 121). And the CPU 101 controls the photography control circuit 124 and the projection control circuit 224 so that the peak value of the drive electrical current to the DC motor within the image-capturing unit 120, and the peak value of the drive electrical current to the LED light source 223, do not overlap one another.

The details of the checking processing will now be explained with reference to the flow chart shown in FIG. 8. In a step S81 of FIG. 8, the CPU 101 detects the brightness of the surroundings based upon the luminance information from the photometric device 112, and then the flow of control proceeds to a step S82.

In the step S82, the CPU 101 makes a decision as to whether or not the brightness is less than or equal to a predetermined value. If the brightness is less than or equal to the predetermined value (for example, this may correspond to ⅓ of the brightness due to the projection unit 220 at maximum projection luminance) then the CPU 101 reaches an affirmative decision in this step S82 and the flow of control proceeds to a step S83, whereas if the brightness is greater than the predetermined value, then a negative decision is reached in this step S83 and the flow of control is transferred to a step S87. When the flow of control is transferred to the step S87, then it is the case that projection is not appropriate because the surroundings are too bright.

In the step S83, the CPU 101 makes a decision as to whether or not the attitude is OK. If, based upon the detection signal from the attitude sensor 111, the setting attitude of this electronic camera with incorporated projector 10 is within a predetermined inclination range (for example, ±10° either forward, backward, leftward, or rightward with respect to the horizontal direction), or if the setting attitude is constantly changing (i.e. the camera is currently handheld), then the CPU 101 reaches an affirmative decision in this step S83 and the flow of control proceeds to a step S84, whereas if the detected attitude is greater than the predetermined inclination range, then a negative decision is reached in this step S83 and the flow of control is transferred to the step S87. When the flow of control is transferred to the step S87, then it is the case that there is a fear of imparting a feeling of discomfort to the observer of the projected image.

In the step S84, the CPU 101 makes a decision as to whether or not the temperature is OK. If, based upon the temperature detection signal from the temperature sensor 113, the temperature within the camera in the neighborhood of the projection unit 220 is less than or equal to a predetermined temperature (for example 60° C.), then the CPU 101 reaches an affirmative decision in this step S84 and the flow of control proceeds to a step S85, whereas if the temperature within the camera is greater than the predetermined temperature, then a negative decision is reached in this step S84 and the flow of control is transferred to a step S92. When the flow of control is transferred to the step S92, then it is the case that heat dissipation (radiation) from the projection unit 220 is not being appropriately performed.

In the step S85, the CPU 101 makes a decision as to whether or not projection is currently stopped. If the projection of an optical image is stopped by a step S88 that will be described hereinafter, then the CPU 101 reaches an affirmative decision in this step S84 and the flow of control proceeds to a step S86, whereas if an optical image is being projected then a negative decision is reached in this step S85 and the processing of FIG. 8 terminates (i.e. the flow of control returns to FIG. 6). It should be understood that this stoppage of projection is stoppage due to the step S88, and it will be supposed that it does not include pausing in response to pressing actuation of the full press switch for a long time period (see the step S64 of FIG. 7). Moreover, a negative decision is also reached in the step S85 if this is before projection has started.

In the step S86, the CPU 101 resumes the projection operation. In concrete terms, in a similar manner to the cancellation of pausing described above (the step S63 of FIG. 7), the supply of electrical current to the LED light source 223 and to the liquid crystal panel 222 is resumed, and then the processing of FIG. 8 terminates (i.e. the flow of control returns to FIG. 6). Due to this, the projection of an optical image from the projection unit 220 automatically resumes.

In the step S87 that is proceeded to in the case of a negative decision being reached in the step S82 or the step S83, the CPU 101 makes a decision as to whether or not projection is currently being performed. If an optical image is currently being projected from the projection unit 220, then the CPU 101 reaches an affirmative decision in this step S87 and the flow of control proceeds to a step S88, whereas if no optical image is currently being projected, then a negative decision is reached in this step S87 and the flow of control is transferred to a step S89.

In the step S88, the CPU 101 stops the projection operation. In concrete terms, in a similar manner to the pausing described above (the step S64 of FIG. 7), the supply of electrical current to the LED light source 223 and the liquid crystal panel 222 is stopped, and then the flow of control is transferred to a step S90. Due to this, the optical image ceases to be projected from the projection unit 220.

Figure 8:
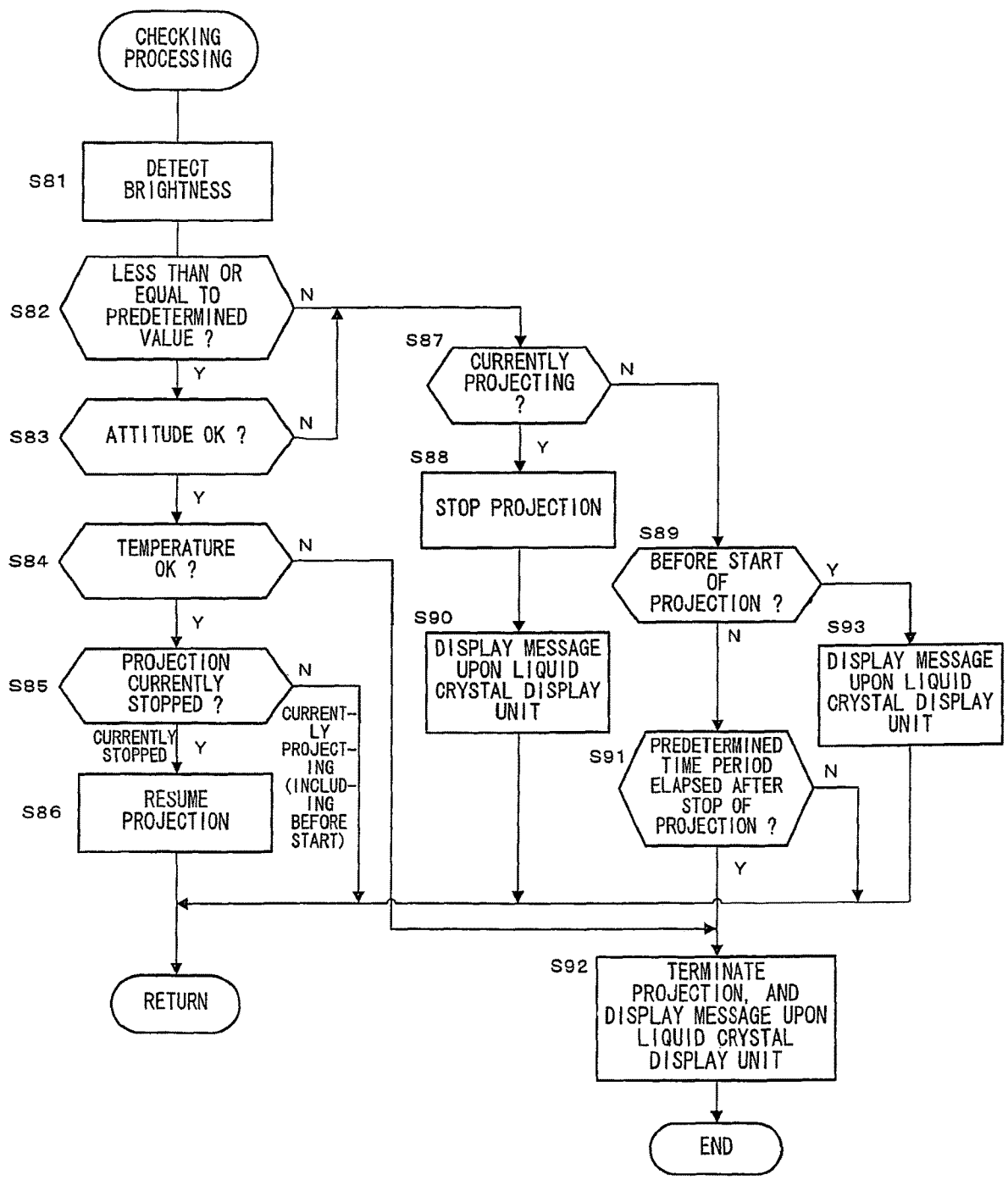
FIG. 8 is a flow chart for explanation of the details of checking processing.

In the step S90, the CPU 101 displays a message upon the liquid crystal display unit 104, and then the processing of FIG. 8 terminates (i.e. the flow of control returns to FIG. 6). The contents of the message may be, for example, "Projection paused". Moreover, it would also be acceptable to arrange to display a message "Too bright" if a negative decision has been reached in the step S82, and to display a message "Camera tilted" if a negative decision has been reached in the step S83, or the like, in order to invite the user to deal with these situations.

In the step S89 that is reached if a negative decision is made in the step S87, the CPU 101 makes a decision as to whether or not this is before the start of projection. If this is before the start of projection in the step S4, then the CPU 101 reaches an affirmative decision in this step S89 and the flow of control is transferred to a step S93, whereas if this is after the start of projection then a negative decision is reached in this step S89 and the flow of control is transferred to a step S91.

In the step S91, the CPU makes a decision as to whether or not a predetermined time period has elapsed after projection has stopped. If the predetermined time period (for example three minutes) has elapsed from when projection stopped due to the step S88, then the CPU 101 reaches an affirmative decision in this step S91 and the flow of control proceeds to a step S92, whereas if the predetermined time period has not elapsed, then a negative decision is reached in this step S91 and the processing of FIG. 8 terminates (i.e. the flow of control returns to FIG. 6).

And in the step S92 the CPU 101, along with displaying a message on the liquid crystal display unit 104, also terminates projection processing (see FIGS. 6 and 8). The contents of the message may be, for example, "Projection ended". Moreover it would also be acceptable, adding displaying the message "Too bright" if a negative decision is reached in the step S82, to displaying the message "Camera tilted" if a negative decision is reached in the step S83, and displaying a message "Please allow heat to dissipate" if a negative decision is reached in the step S84, also, in each case, to invite the user to deal with the corresponding situation. At the end of the step S92, the supply of electrical current to the various parts of the power supply circuit 108 is terminated and the power is turned OFF, while leaving the message displayed upon the liquid crystal display unit 104. After the power is thus turned OFF, the CPU 101 starts the processing of FIG. 6 for a second time when an actuation signal is inputted from the main switch 22.

In the step S93 that is reached upon an affirmative decision in the step S89, the CPU 101 displays a message upon the liquid crystal display unit 104, and then this processing terminates (i.e. the flow of control returns to FIG. 6). The contents of the message may be, for example, "Please prepare for projection".

According to the first embodiment explained above, the following beneficial operational effects are obtained.

(1) Since the members whose temperatures are elevated (i.e. the LED light source 223, the cooling block 230, and the vent aperture 24) are disposed upon the central upper portion of the body of the electronic camera with incorporated projector 10, accordingly it is possible to build a structure in which the user cannot easily touch the spots whose temperatures are elevated.

(2) Since the LED light source 223 is mounted upon the thin base plate 251 that is rectangular in shape, accordingly the workability is enhanced, as compared with the case when it is mounted upon a base plate that is made with bending processing.

(3) Since the cooling block 230 is disposed upon the end portion of the body of the camera, accordingly air intake and exhaust by the fan 231 are performed with good efficiency.

(4) Since it is arranged to provide a curved surface upon the heat dissipation member 232, so that the sucked in air flow changes its path upwards while it passes along this curved surface and cools the heat dissipation member 232, accordingly the air flow whose temperature has been elevated due to heat exchange does not stagnate, and it can be discharged from the vent aperture on the upper surface of the camera body.

(5) Since, in addition to providing conduction of the heat which is generated in the base plate 251 to the cooling block 230, it is also arranged to conduct this heat to the metallic back panel member of the liquid crystal display unit 104 (see FIG. 3) and to the block member of the DC motor for driving the lens, accordingly it is possible to perform heat dissipation with good efficiency.

(6) Since the LED light source 223 is made to serve as a structure for emitting both auxiliary photographic light and also projected light, accordingly it is possible to reduce the cost, as compared to the case when separate LED light sources are provided.

(7) Since it is arranged for the auxiliary photographic light to be emitted without passing through the PBS block 228, accordingly the loss is smaller as compared with the case of this light passing through the PBS block 228, and it is possible to make the guide number larger.

(8) Since the liquid crystal panel 222 is directly adhered to the PBS block, accordingly it is possible to omit any cover glass for the liquid crystal panel 222, so that the advantageous effect is obtained of making the structure more compact and simplifying the construction process. Moreover, by joining these directly together without any air layer being interposed between them, it is possible to suppress the reflection (normally around 4%) that occurs at an interface between an air layer and a glass material (i.e. the PBS) even though no anti-reflective coating for preventing reflection is provided. As a result, loss of the projected light is reduced, and a brighter projected image is obtained. Moreover, when a direct junction is provided, it is only necessary to press the mutually opposing surfaces together, and the job of adjusting the gap between the mutually opposing surfaces that is required when an air layer is interposed is unnecessary, so that it is possible to reduce the man-hours required for the task of assembly. In addition, due to the method of generating a color image with a single plate type structure in which a color filter is provided to the liquid crystal panel 222, no solid junction is required, so that, as compared to the case of a so called three plates type structure, the job of assembly is simpler.

(9) Since non-reflective processing is performed upon the surface 228b of the PBS block, accordingly stray light is suppressed, and a projected image of high quality is obtained.

(10) Since, if the brightness of the projection environment is brighter than a predetermined value (a negative decision in the step S82), it is arranged to stop the projection (in the step S88) if projection is taking place, accordingly it is possible to prevent useless projection being performed in a bright location that is not suitable for observation of the projected image.

(11) Since, if the setting attitude of the electronic camera with incorporated projector 10 exceeds the predetermined range of inclination (a negative decision in the step S83), then it is arranged to stop the projection (in the step S88) if projection is taking place, accordingly it is possible to prevent a feeling of discomfort being imparted to the user due to the projected image being inclined, and to prevent useless projection being performed when the projected light is interfered with by the setting or mounting surface such as a desk or the like.

(12) Since a message is displayed upon the liquid crystal display unit 104 after projection has stopped (in the step S88), accordingly the user is invited to deal with the situation.

(13) Since projection is resumed automatically (in the step S86) if a predetermined brightness and a predetermined setting attitude are established within a predetermined time period after the stoppage of projection, accordingly the convenience of use is better, as compared with what it would be if it was necessary to perform actuation again for starting projection.

(14) Since the processing ends (with power OFF) (in the step S92) after the predetermined time period has elapsed after the stoppage of projection (an affirmative decision in the step S91), accordingly, if projection has started against the intentions of the user due to mistaken actuation or the like, useless continuation of the supply of electrical power is prevented. Moreover, since a message is displayed upon the liquid crystal display unit 104, accordingly the user is notified of the fact that projection has ended (and the power has gone OFF).

(15) Since the projection processing is terminated (and the power is turned OFF) (in the step S92) if the temperature within the camera is higher than the predetermined temperature (a negative decision in the step S84), accordingly continuation of the supply of electrical current in a state in which heat dissipation is not being appropriately performed is prevented. Moreover, since a message is displayed upon the liquid crystal display unit 104, accordingly the user is notified of the fact that projection has ended (and the power has gone OFF).

(16) During auto focus (AF) processing, along with the DC motor within the lens drive unit 224 being pulse driven (at a frequency of 60 Hz and a duty ratio of 50%) and the LED light source 223 also being pulse driven at the same frequency and the same duty ratio, also the phases of the electrical currents that drive these two devices are displaced from one another by 180°, so that they are driven in a complementary manner. Due to this, it is possible to keep down the peak consumption of electrical current by the projection unit 220, and it is possible to make the life of the battery 109 longer.

Variant Embodiment #1

The frequencies of the pulse form electrical currents that are supplied to the LED light source 223 and to the DC motor, while they should be the same for both of them, may not be 60 Hz; they may be changed as appropriate within the range in which no feeling of flickering is imparted to an observer (for example, they may be 50 Hz). Moreover, it would also be acceptable for their duty ratios not to be 50%, but the phases of them should be controlled so that the peak value of the drive electrical current to the LED light source 223 and the peak value of the drive electrical current to the DC motor do not overlap one another. For example, if the duty ratio of the electrical current that is supplied to the LED light source 223 is 55%, then the duty ratio of the electrical current that is supplied to the DC motor should be made to be 45% or less, so that control may be performed so as to maintain the complementary relationship between these two pulse electrical currents.

Variant Embodiment #2

During the AF processing, it would be acceptable to synchronize the driving of the liquid crystal panel 222 to the drive timing of the LED light source 223. In other words, a supply of power in pulse form may also be performed to the liquid crystal panel 222 as well, at the same timing that the pulse form electrical current is supplied to the LED light source 223.

Variant Embodiment #3

Although an example has been explained in which, when the DC motor for lens drive is shifting the focusing lens forwards and backwards, a complementary relationship is maintained between the pulse form electrical current that is supplied to the LED light source 223 and the pulse form electrical current that is supplied to the DC motor for lens drive, it would also be acceptable to implement a similar procedure when the DC motor for lens drive is shifting the zoom lens forwards and backwards, as well.

Variant Embodiment #4

The driving with pulse supplies that have the above described complementary relationship, apart from being applied between the LED light source 223 and the DC motor for lens drive, may also be applied between the LED light source 223 and the liquid crystal display unit 104, between the LED light source 223 and the external interface (I/F) 107, between the LED light source 223 and a circuit that performs access to the recording medium, or the like, as appropriate. Moreover, in the case of a flash light emission device that uses an electrical discharge type light source such as a xenon lamp or the like being housed internally to the electronic camera with incorporated projector 10, driving with pulse supplies having a complementary relationship may also be performed between a charging circuit for a main capacitor for flash light emission and the LED light source 223.

Variant Embodiment #5

It would also be acceptable, before stopping the projection (in the step S88), to superimpose upon the projected image a message that gives advance notice of the stoppage of projection, and to perform stopping of the projection after a predetermined time period (for example 1 minute) has elapsed from the start of this superimposition.

Variant Embodiment #6

It would also be acceptable to arrange for the brightness detection (in the step S81) to be performed based upon the image capture signal from the image-capturing unit 120. In this case, along with the CPU 101 commanding the photography control circuit 124 to turn the image-capturing unit ON, it would also acquire brightness information from the image signal that is captured by the image-capturing unit 120 (i.e. from the signal that corresponds to the photographic subject other than the screen in the captured image).

Variant Embodiment #7

It would also be acceptable for the external interface (I/F) 107 to be cable communication via, for example, a USB cable, or to be wireless communication that is performed via a wireless transmission and reception device.

Variant Embodiment #8

Figure 9:
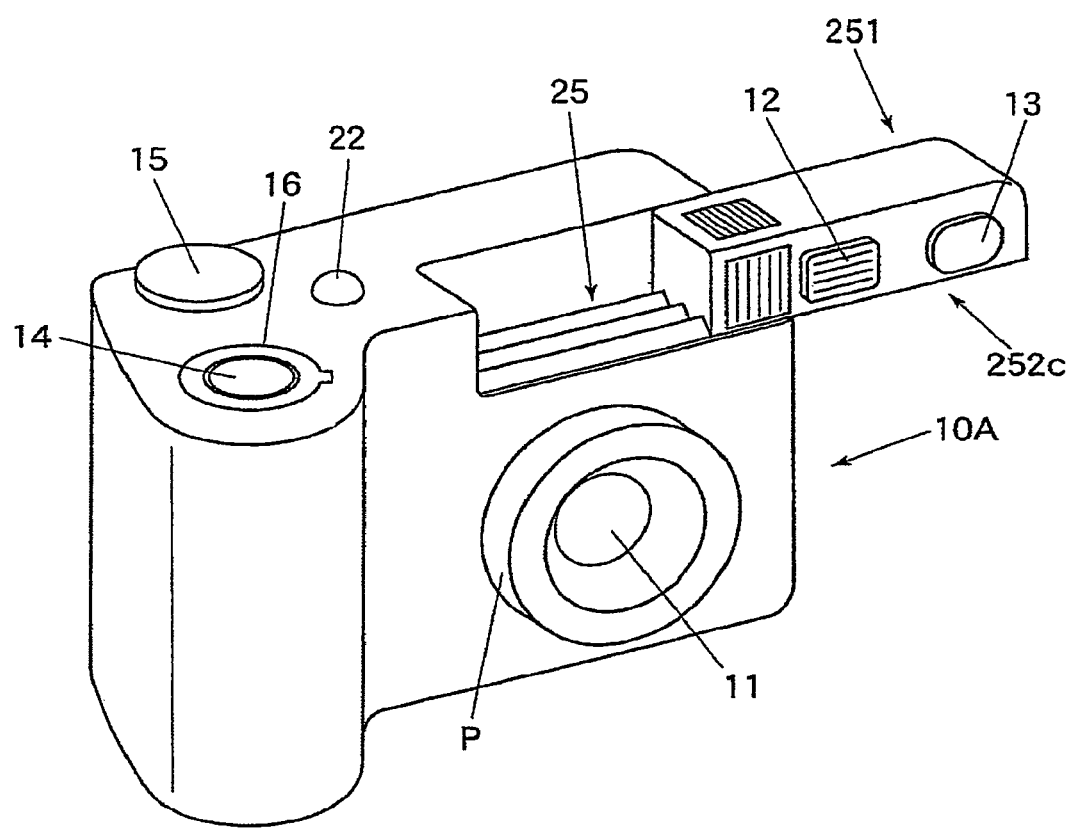
FIG. 9 is a figure showing an electronic camera with incorporated projector according to a variant embodiment #8 as seen from the front.

FIG. 9 is a figure showing an electronic camera with incorporated projector 10A according to a variant embodiment #8 as seen from the front. To structural elements that are common with FIG. 1 the same reference symbols are affixed, and explanation thereof will be curtailed. In this variant embodiment, the portion of the camera chassis that contains the projection module is made so as to be slidable in the horizontal direction, and, during the projection mode, it is slid and is shifted to the position shown in FIG. 9. Drive electrical current and so on is supplied to the LED 223 upon the base plate 251 via a harness, not shown in the figures, from the electronic camera with incorporated projector 10A to the projection module.

When the above described portion of the chassis is slid and shifted, a module guide surface 25 upon the main chassis is exposed, so that the heat dissipation area is enlarged. Moreover, rails are formed upon this module guide surface 25 that fit into the portion of the camera chassis that slides and shifts, so that its surface area is wider, as compared with the case in which it is formed as a plane surface. Due to these rails, this electronic camera with incorporated projector 10A becomes able easily to dissipate heat that is conducted from the projection module to the camera chassis.

On the other hand, on the projection module that has been slid and shifted, its base plate 251 is exposed at its rear surface side, so that it becomes easy for heat which is generated from the LED light source 223 to be dissipated. Moreover, it is made so as to fit into the rails upon the module guide surface 25, and a fitting member 252c that has good thermal conductivity is joined to the bottom of the lid member 252. Since the surface area of this fitting member 252c is also wider as compared to the case in which it is formed as planar, accordingly it also becomes easy to perform dissipation of heat on the projection module side as well.

Embodiment Two

Figure 10:
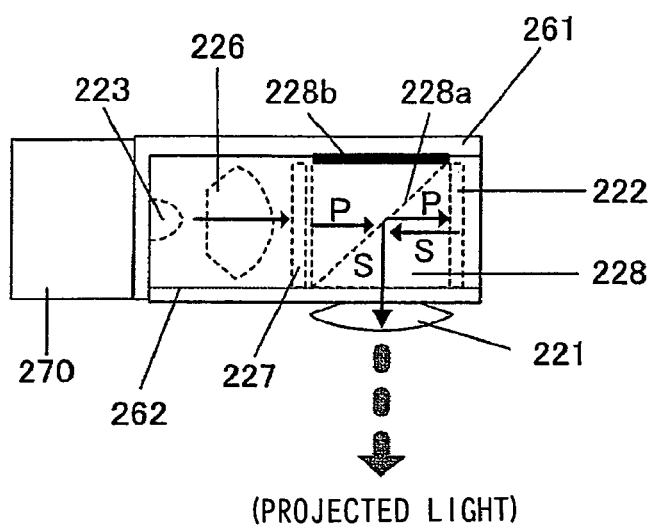
FIG. 10 is a plan view as seen from above of an optical system of a projection unit according to a second embodiment.
Figure 11:
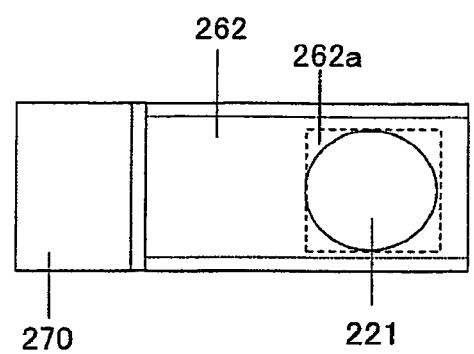
FIG. 11 is an elevation view of the optical system of FIG. 11 as seen from the front.

The details of the arrangement of the optical system of a projection unit 220 according to a second embodiment will now be explained with reference to FIGS. 10 and 11. FIG. 10 is a plan view as seen from above of this optical system of the projection unit 220, and FIG. 11 is an elevation view of the optical system of FIG. 10 as seen from the front. In this second embodiment, the projected light and the auxiliary photographic light are emitted from a common optical system. When emitting the projected light, the liquid crystal panel 222 is driven so as to create an optical image. However, when emitting the auxiliary photographic light, the transmittivity of the liquid crystal layer of the liquid crystal panel 222 is controlled according to the amount of illumination light that is required.

According to FIGS. 10 and 11, as compared with the first embodiment (of FIGS. 4 and 5), the outstanding differences are that the mirror M1 and the illumination optical system 229 are omitted, and that, instead of the cooling block 230, a heat dissipation (radiation) member 270 is provided. To structural elements that are common with the first embodiment, common reference symbols are appended, and explanation thereof is curtailed.

An LED 223 is mounted upon an aluminum base plate 261 that is made by processing a thin rectangular metallic plate by bending it into the form of a letter "L". The structure is such that the light from the LED 223 proceeds in the rightward direction without the use of any mirror. The features that a condensing optical system 226 and a PBS block 228 are adhered upon the base plate 261 are the same as in the first embodiment.

A lid member 262 that is made by subjecting an aluminum plate to sheet metal bending processing is disposed so as to cover over the various members upon the base plate 261 described above. An aperture 262a is provided in the lid member 262, and a projection optical system 221 (that also serves as the illumination optical system) is disposed in this aperture 262a.

The heat dissipation member 270 is surface joined with good thermal conductivity upon the surface of the aluminum base plate 261 opposite to its surface upon which the LED light source 223 is mounted. The heat dissipation member 270 may, for example, be made by forming fins upon one portion of a cube shaped aluminum block by a cutting process.

FIGS. 12 (a) and 12 (b) are side views of an electronic camera with incorporated projector 10B to which the projection module explained with FIGS. 10 and 11 is set. FIG. 12(a) is a figure showing the projection unit 220 in its state of being shifted to its housed position, while FIG. 12 (b) is a figure showing the projection unit 220 in its state of being shifted (i.e. popped up) to its usage position.

With this electronic camera with incorporated projector 10B, when the projection unit 220 is popped up to its usage position in the state with the photographic mode started (i.e. with the main switch ON), then emission of auxiliary photographic light becomes possible. Moreover, with this electronic camera with incorporated projector 10B, when the projection unit 220 is popped up to its usage position in the state with the main switch OFF, then the projection mode is started and emission of projected light becomes possible. In order to detect the storage state or the popped up state of the projection unit 220, a micro switch not shown in the figures that operates together with shifting of the projection unit 220 is housed internally in this electronic camera with incorporated projector 10B.

In FIG. 12 (b), the projection module that has been popped up into the usage position emits projected light from a higher position, as compared when it has not been popped up. A bellows 271 that is made from a material that has good thermal conductivity is provided to the heat dissipation member 270, and heat is transmitted to the chassis of the electronic camera with incorporated projector 10B via this bellows 271. Due to this, the heat which is generated by the projection module is dissipated, not only by the heat dissipation member 270, but also from the bellows 270 and the camera chassis.

According to the second embodiment explained above, the following beneficial operational effects are obtained.

(1) Since the members (the LED light source 223 and the heat dissipation member 270) whose temperatures are elevated are disposed upon the pop up unit at the central upper portion of the body of this electronic camera with incorporated projector 10B, accordingly it is possible to provide a structure in which the user cannot easily touch the spots whose temperature is elevated.

(2) Since the exposed area is wider when the projection module is popped up into its usage position as compared to when it is not popped up, accordingly it is possible to widen the heat dissipation area. Moreover, since the heat is conducted to the camera chassis via the bellows 271 that has good thermal conductivity, accordingly the heat is dissipated with good efficiency. Since the bellows 271 conducts heat when the projection unit 220 is in its usage position and also when it is in its housed position, accordingly it is possible to continue the dissipation of heat, even when directly after the termination of projection the projection unit is immediately shifted to its housed position.

(3) By popping up the projection module into its usage position, it is possible to enhance the height from the surface upon which this electronic camera with incorporated projector 10B is placed or set (such as a table not shown in the figures or the like) to the projection optical system. And, by making the position of the projection optical system 221 (the outlet through that the projected ray bundle is emitted) higher, the fear becomes less that a portion of the projected ray bundle will be interfered with by the placing surface.

(4) Since the projection optical system 221 also serves as the illumination optical system, accordingly it is possible to reduce the cost, as compared with the case in which these optical systems are provided separately.

Variant Embodiment #9

Figure 13A:
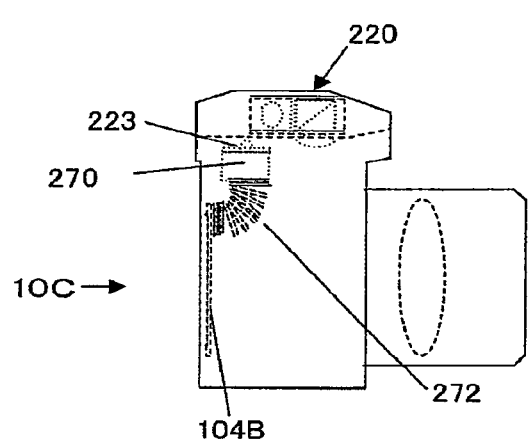
FIGS. 13(a) and 13(b) are side views of an electronic camera with incorporated projector according to a variant embodiment #9.

It would also be acceptable to provide a structure in which the heat dissipation member 270 and the LED light source 223 of the projection module are separated from the condensing optical system 226 and the PBS block 228. FIGS. 13 (a) and 13 (b) are side views of an electronic camera with incorporated projector 10C equipped with a projection module according to a variant embodiment #9: FIG. 13 (a) is a figure showing a state in which a projection unit 220 thereof is shifted to a housed position, while FIG. 13(b) is a figure showing a state in which the projection unit 220 is shifted (i.e. is popped up) to a usage position.

Figure 13B:
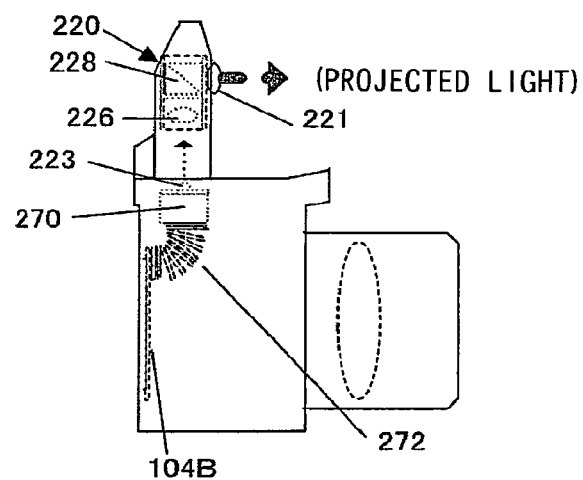

In FIG. 13(b), the condensing optical system 226 and the PBS block 228 and so on are included within the pop up unit. Those members whose temperatures are elevated (the LED light source 223 and the heat dissipation member 270) are not included within the pop up unit, but are kept to the central upper portion of the body of the electronic camera with incorporated projector 10C, so that they are disposed in locations at which the user cannot easily touch them.

Heat is conducted between the heat dissipation member 270 and the metallic back panel member 104B of the liquid crystal display unit 104 (see FIG. 3) via a heat conduction member 272. As a result it is possible to dissipate the heat with good efficiency, not only from the heat dissipation member 270, but also from the metallic back panel member 104B.

Variant Embodiment #10

It would also be acceptable to provide a structure in which the projection optical system of the projection module is separated from the other members. FIGS. 14(a) and 14(b) are side views of an electronic camera with incorporated projector 10D equipped with a projection module according to a variant embodiment #10: FIG. 14(a) is a figure showing a state in which a projection unit 220 thereof is shifted to a housed position, while FIG. 14 (b) is a figure showing a state in which the projection unit 220 is shifted to a usage position.

In FIG. 14 (b), a mirror M2 that also serves for the projection optical system is included in the pop up unit. By making the position of the mirror M2 (in other words, the emission aperture for the projected ray bundle) high in the popped up state, the fear becomes less than a portion of the projected ray bundle will be interfered with by the lens barrel or the mounting surface. Those members whose temperatures are elevated (the LED light source 223 and the cooling block 230 (the same as in the first embodiment) and so on) are not included within the pop up unit, but are kept to the central upper portion of the body of the electronic camera with incorporated projector 10C, so that they are disposed in locations at which the user cannot easily touch them.

In the popped up state, the cooling air flows more easily as compared to the non popped up state. The cooling block takes in air from a vent aperture (not shown in the figures) that is provided in the front surface of this electronic camera with incorporated projector 10D. The cooling air flow changes its path of progression in the upward direction while performing cooling, as shown by the arrow sign in the figure, and is exhausted from a vent aperture (not shown in the figures) that is provided in the upper surface of the electronic camera with incorporated projector 10D. This vent aperture is provided so as to be exposed by the popping up of the projection unit 220.

Embodiment Three

Figure 15:
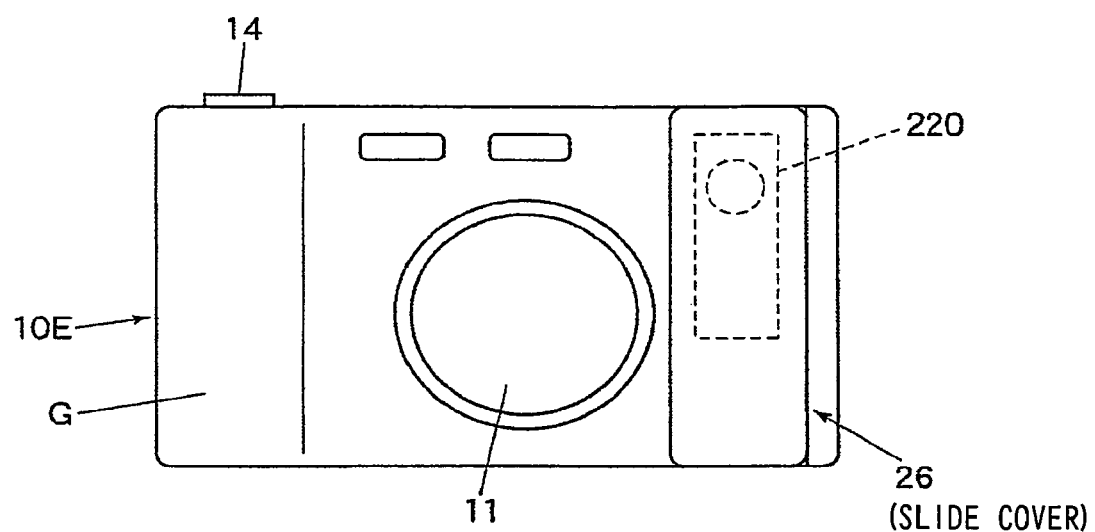
FIG. 15 is an elevation view of an electronic camera with incorporated projector according to a third embodiment.

FIG. 15 is an elevation view of an electronic camera with incorporated projector 10E equipped with the projection module explained in FIGS. 10 and 11. According to FIG. 15, the projection unit 220 (shown by the broken line) is contained in an end portion of the camera chassis that is positioned at the opposite side from the release button 14 (i.e. from the grip portion G), with the photographic lens 11 between them, and this chassis end portion (the portion that contains the projection unit 220) is covered over by a slide cover 26.

Figure 16:
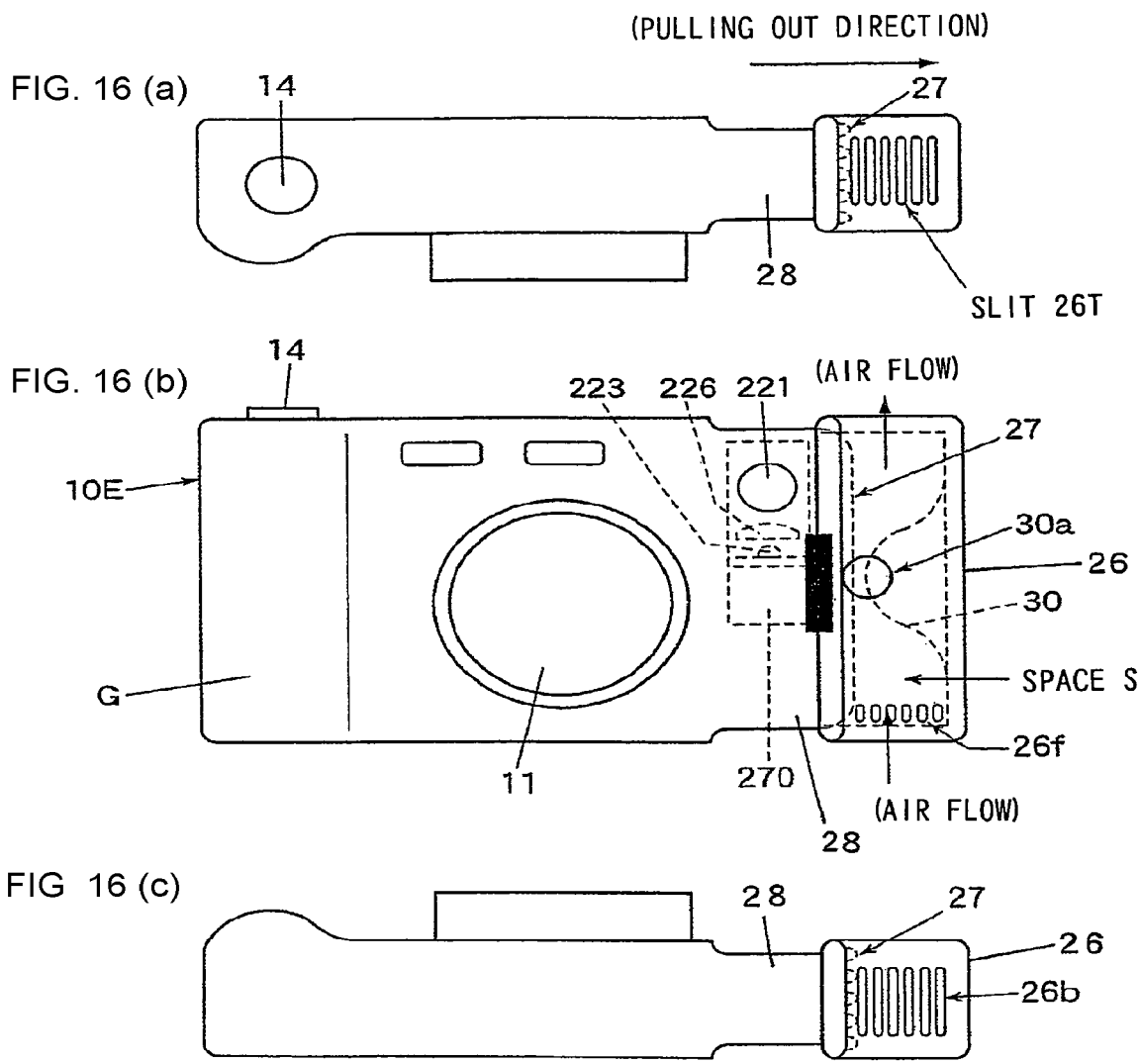
FIGS. 16(a)-16(c) show the electronic camera with incorporated projector of FIG. 15 in a state with its projection unit made ready for use.

FIGS. 16(a)-16(c) show the electronic camera with incorporated projector 10E of FIG. 15 in a state with its projection unit made ready for use: FIG. 16(a) is a plan view thereof, FIG. 16(b) is an elevation view thereof, and FIG. 16(c) is a bottom view thereof. By the slide cover 26 being pulled out in the rightward direction from its storage state shown in FIG. 15, the end portion of the camera chassis (body) that was covered over by the slide cover 26 is exposed, and the projection optical system 221 appears at the front of this exposed chassis end portion.

When, in the state of this electronic camera with incorporated projector 10E in which the photographic mode is started (i.e. with its main switch ON), the slide cover 26 is actuated to be pulled out, then emission of auxiliary light from the projection unit 220 is made possible. Furthermore when, in the state of this electronic camera with incorporated projector 10E in which the main switch is OFF, the slide cover 26 is actuated to be pulled out, then the projection mode is started and emission of projected light from the projection unit 220 is made possible. In order to detect whether the slide cover 26 is in its storage state or its pulled out state, a micro switch is internally provided in this electronic camera with incorporated projector 10E, and is operated to be turned ON and OFF together with shifting of the slide cover 26.

A space S within the slide cover 26 that has been pulled out is created and expands, and becomes a passage for the cooling air flow. In order to provide a flow conduit for the cooling air flow, vent apertures are provided on at least two opposing surfaces of the space S. According to FIGS. 16 (a)-16 (c), the cooling air flow enters into within the slide cover 26 from slits 26b that are provided in the bottom surface of the slide cover 26 and from slits 26f that are provided in the lower front portion of the slide cover 26, progresses upwards within the slide cover 26, and then is discharged from slits 26t that are provided upon the upper surface of the slide cover 26.

The site upon the side surface of the chassis of the electronic camera with incorporated projector 10E that is marked with black in FIG. 16(b) shows a location whose temperature is particularly elevated by the heat that is generated by the projection unit 220. The heat dissipation member 270 to which is conducted the heat generated by the LED light source 223 is joined to this side of the chassis from its interior. In order, with this electronic camera with incorporated projector 10E, to dissipate (radiate) heat to the exterior of the above described chassis side surface, fins 27 are provided on the exterior of this chassis side surface, so that the advantageous effect of cooling by the cooling air flow that progresses upwards within the slide cover 26 is enhanced.

Moreover, in order to increase the flow speed when the cooling air flow passes past the neighborhood of the above described site whose temperature is elevated, in the space S that is created by expansion, an elastic member 30 is provided within the slide cover 26 so as to squeeze down a space 30a in the neighborhood of this site whose temperature is elevated. This elastic member 30 is made from a plastic member or a thin metallic plate or the like, and is made so that, although when the slide cover 26 is in its storage state as shown in FIG. 15 the elastic member 30 is pressed and compressed, when the slide cover 26 is in its pulled out state as shown in FIG. 16(b), the elastic member expands to the shape shown by the broken line.

According to the third embodiment explained above, the following beneficial operational effects are obtained.

(1) It is arranged to provide the members whose temperatures are elevated (i.e. the LED light source 223 and the heat dissipation member 270) at the end body portion of the electronic camera with incorporated projector 10E that is positioned at the opposite side from the release button 14 (and the grip portion G) (i.e. on the right side as one faces the camera front surface), and so as to contact the side surface of the camera chassis from the interior of the chassis, and moreover to cover over the outside of this chassis side surface with the slide cover 26. Due to this, it is possible to provided a structure in which the user cannot easily touch the spots whose temperatures are elevated.

(2) Since it is arranged for the slide cover 26 to be capable of sliding between a storage state and a pulled out state, and since it is arranged for the slide cover 26, in its storage state, to cover over the projection optical system 221, accordingly it is possible to use the cover also as a protection member for the projection optical system 221.

(3) Along with making it possible for the projection unit 220 to emit light with the slide cover 26 in its pulled out state, also the space S is defined within the slide cover 26 that has been pulled out, thereby ensuring a flow conduit for the cooling air flow. Due to this, it is possible to provide a structure in which the user cannot easily touch the spots whose temperatures are elevated. Moreover since, in addition to the slits 26b in the bottom surface of the slide cover 26, the slits 26f are also provided in the front lower portion of the slide cover 26, accordingly it is still possible to guarantee a proper flow path for the cooling air flow, even when this electronic camera with incorporated projector 10E is set or mounted upon a flat surface.

(4) This electronic camera with incorporated projector 10E is provided with the fins 27 upon the outer side of the above described side surface of its chassis, in order to dissipate heat from the outer surface of this side of the chassis to the space S within the slide cover 26. Moreover, since the elastic member 30 is provided within the slide cover 26 so as to squeeze down the space 30a in the neighborhood of a spot whose temperature is elevated, in order to elevate the flow speed of the cooling air flow when it passes over the above described spot whose temperature is elevated, accordingly it is possible to enhance the advantageous effects for heat dissipation.

(5) If, with the exception of the slide cover 26, the camera chassis is made to be waterproof, then it is possible to maintain the waterproof state of the interior of the camera chassis, irrespective of the state of shifting of the slide cover 26.

Although in the above explanation an example was described in which the bottom surface slits 26b in the slide cover 26 and the slits 26f in the lower front portion of the slide cover 26 were provided separately, it would also be acceptable to provide a structure in which slits were provided in the lower portion of the side surface of the slide cover 26, or in the lower portion of its rear surface.

Variant Embodiment #11

Figure 17:
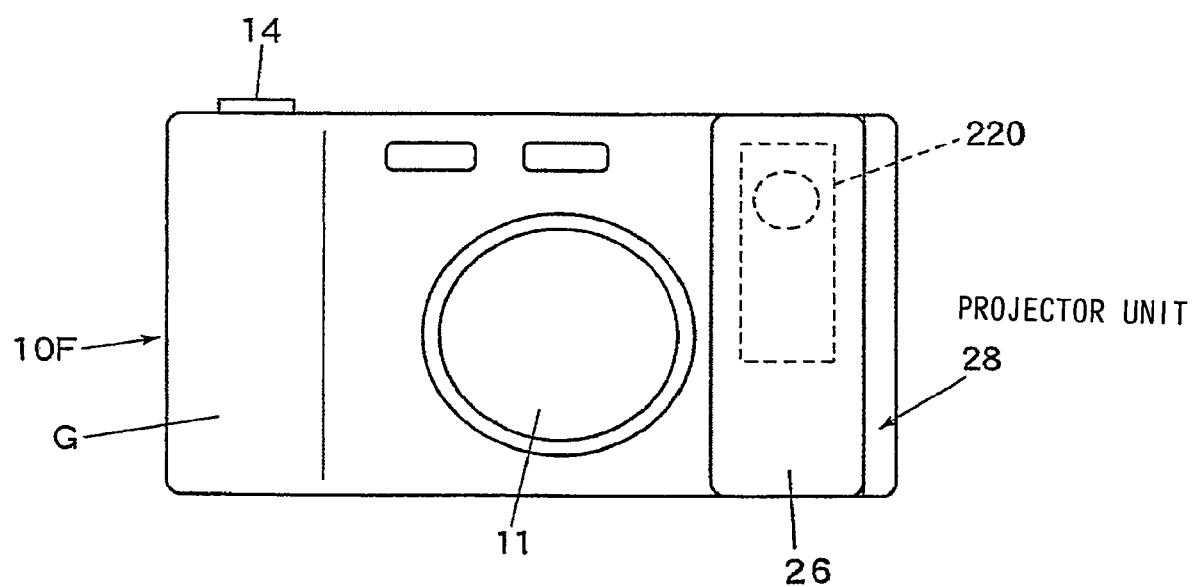
FIG. 17 is an elevation view of an electronic camera with incorporated projector according to a variant embodiment #11.

Instead of pulling out a cover, it would also be acceptable to provide a structure in which a portion that contains the projection unit inside a cover is pulled out. FIG. 17 is an elevation view of an electronic camera with incorporated projector 10F according to a variant embodiment #11. According to FIG. 17, a projector unit 28 that contains a projection unit 220 (shown by the broken line) is stored in the end portion of the body of this electronic camera (i.e. in its right side portion as one faces its front surface).

Figure 18:
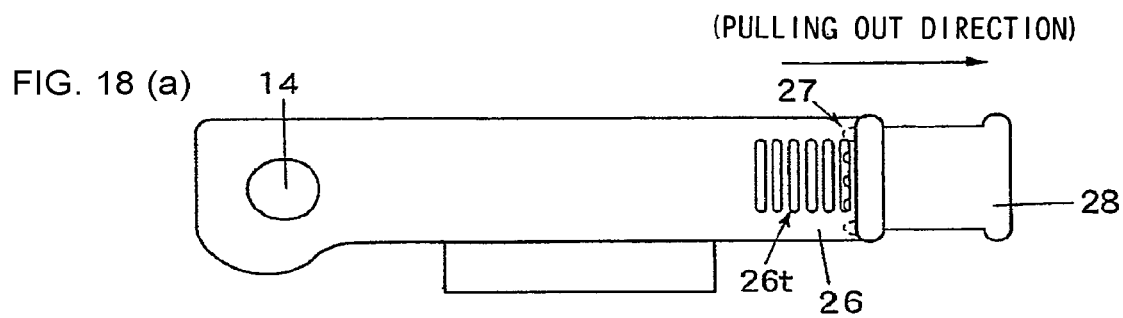
FIGS. 18(a)-18(c) show the electronic camera with incorporated projector of FIG. 17 in a state with its projection unit made ready for use.
Figure 18:
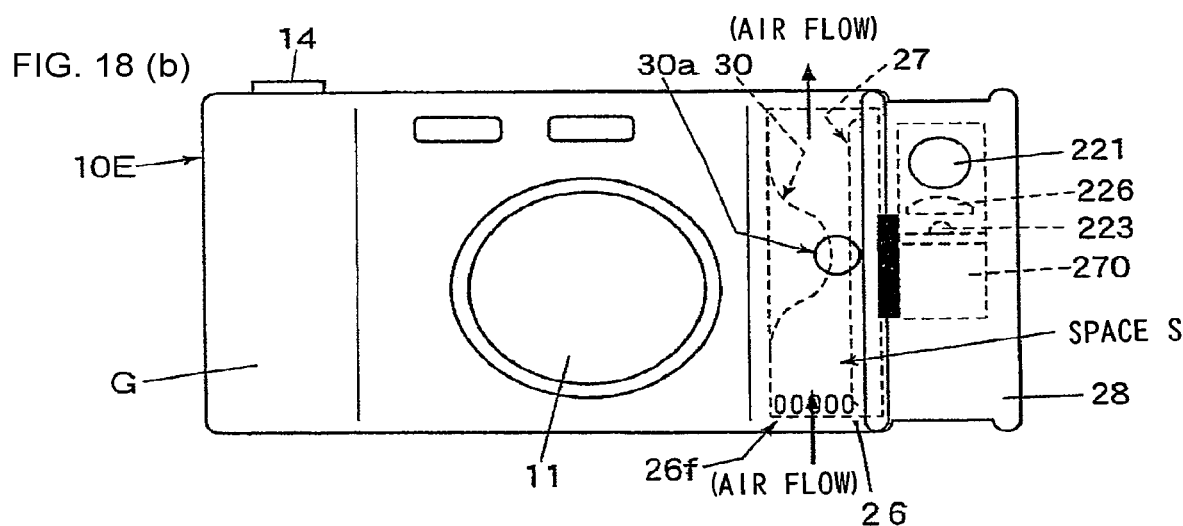
Figure 18:
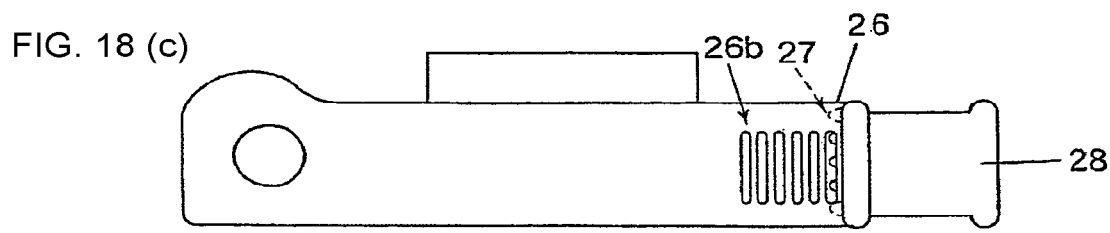

FIGS. 18 (a)-18 (c) show the electronic camera with incorporated projector 10F of FIG. 17 in a state with its projection unit 220 made ready for use: FIG. 18 (a) is a plan view thereof, FIG. 18(b) is an elevation view thereof, and FIG. 18 (c) is a bottom view thereof. By the projector unit 28 being pulled out in the rightwards direction from its storage state shown in FIG. 17, the projector unit 28 that was covered over by the camera body is exposed, and the projection optical system 221 appears at the front of the projector unit 28 that has been exposed.

With this electronic camera with incorporated projector 10F, when the projector unit 28 is actuated by being pulled out in the state with the main switch OFF, then the projection mode is started and emission of projected light from the projection unit 220 is made possible. Moreover, with this electronic camera with incorporated projector 10F, when the projector unit 28 is actuated by being pulled out in the state in which the photographic mode is started (i.e. when the main switch is ON), then emission of auxiliary photographic light from the projection unit 220 is made possible. In order to detect whether the projector unit 28 is in its storage state or its pulled out state, a micro switch is internally provided in this electronic camera with incorporated projector 10F, and is operated to be turned ON and OFF together with shifting of the projector unit 28.

When the projector unit 28 has been pulled out, a space S within the camera chassis is created and expands, and becomes a passage for the cooling air flow. In order to provide a flow conduit for the cooling air flow, vent apertures are provided on at least two opposing surfaces of the space S. According to FIGS. 18 (a)-(18c), the cooling air flow enters into within the camera chassis from slits 26b that are provided in the bottom surface of the chassis end portion and from slits 26f that are provided in the lower front portion of the chassis end portion, progresses upwards within the camera chassis, and then is discharged from slits 26t that are provided upon the upper surface of the chassis end portion.

The site upon the side surface of the projector unit 28 that is marked with black in FIG. 18(b) shows a location whose temperature is particularly elevated by the heat that is generated by the projection unit 220. The heat dissipation member 270 to which is conducted the heat generated by the LED light source 223 is joined to this side of the projector unit 28 from its interior. In order, with this electronic camera with incorporated projector 10F, to dissipate heat to the exterior of the above described side surface of the projector unit 28, fins 27 are provided on the exterior side surface of the projector unit, so that the advantageous effect of cooling by the cooling air flow that progresses upwards within the camera chassis is enhanced.

Moreover, in order to increase the flow speed when the cooling air flow passes past the neighborhood of the above described site whose temperature is elevated, in the space S that is created by expansion, an elastic member 30 is provided within the camera chassis so as to squeeze down a space 30a in the neighborhood of this site whose temperature is elevated. This elastic member 30 is made so that, although when the projector unit 28 is in its storage state as shown in FIG. 17 the elastic member 30 is pressed and compressed, when the projector unit 28 is in its pulled out state as shown in FIG. 18(b), the elastic member expands to the shape shown by the broken line.

Variant Embodiment #12

Although, with the third embodiment and the variant embodiment, it is arranged to create the space S that allows passage of the cooling air flow by pulling out, respectively, the slide cover 26 and the projector unit 28, it would also be acceptable to provide structures in which they were fixed always in the pulled out state, so as always to ensure the existence of such a heat dissipation space.

Variant Embodiment #13

With the electronic cameras 10 with incorporated projectors shown in FIGS. 15 through 18, the height of the space S that was the passage for the cooling air flow was the same as the height of the main body of the electronic camera with incorporated projector 10. In this case, when the electronic camera with incorporated projector 10 is put down in a standing state, it is difficult for the cooling air flow to be taken in from the bottom surface of the space S. Due to this, the slits 26f are provided in the lower front portion of the space S. However, in this variant embodiment, in order to take in the cooling air flow efficiently, a construction is employed in which the bottom surface of the space S comes to be raised up a little above the bottom surface of the main body of the electronic camera with incorporated projector 10. If this type of construction is employed, then, even if the camera is put down in a standing state, it is still easy to take in the cooling air flow from its bottom surface, since a space is present below the space S. It should be understood that, if the space S is made short, then the shape of the portion of the main body of the electronic camera with incorporated projector 10 in which the projection unit 220 is disposed may either be made shorter to match the space S, or may not be made shorter; either alternative is acceptable.

Embodiment Four

Figure 19:
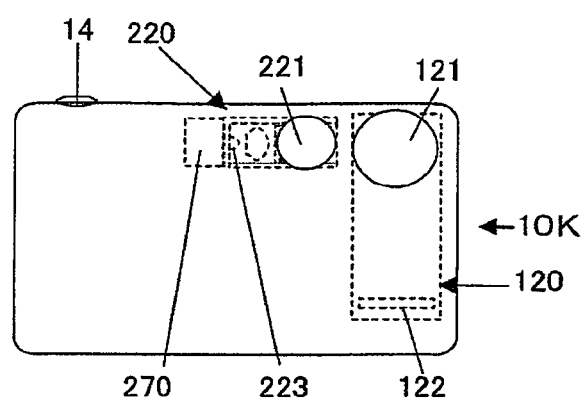
FIG. 19 is a figure showing an electronic camera with incorporated projector according to a fourth embodiment of the present invention, as seen from the front.

FIG. 19 is a figure showing an electronic camera with incorporated projector 10K to which a projection module as explained in FIGS. 10 and 11 is mounted, as seen from the front. The photographic optical system 121 of this electronic camera with incorporated projector 10K is a bending type optical system in which a photographic subject ray bundle that is incident from the front surface of the camera body is bent around within the camera and is conducted to an image sensor 122. By employing this type of bending type optical system, a structure is provided in which the distance between the front surface and the rear surface of this electronic camera with incorporated projector 10K is made thin.

According to FIG. 19, an image-capturing unit 120 (shown by the broken line) is arranged as vertically oriented on the right side of the camera as one faces it. In concrete terms, a photographic lens 11 (121) is disposed at the camera upper right front surface, and the image sensor 122 is disposed towards its right bottom surface. The projection unit 220 (shown by the broken line) is disposed side by side with the image-capturing unit 120, at the upper center edge portion of the center of the body of this electronic camera with incorporated projector 10K (i.e. at its center in its left to right direction). The optical system of the projection unit 220 is arranged horizontally in the longitudinal direction, and its members whose temperatures become elevated (i.e. the LED light source 223 and the heat dissipation member 270) are positioned at the upper edge body portion, more toward the center in the left and right direction than the projection optical system 221. The release button 14 is disposed at the upper left edge portion of the body of the electronic camera with incorporated projector 10K.

According to the fourth embodiment explained above, the following beneficial operational effects are obtained.

(1) Even in the case of this electronic camera with incorporated projector 10K that is equipped with the photographic optical system 121 of the bending type, since the members (i.e. the LED light source 223 and the heat dissipation member 270) whose temperatures are elevated are disposed at the upper center edge portion of the body of the camera, accordingly it is possible to provide a structure with which, if the user grasps the camera body and puts his finger upon the release button 14, it is difficult for him to touch the spots whose temperatures are elevated.

(2) Since the heat dissipation member 270 is disposed at the upper edge portion of the camera body, accordingly, by providing a heat dissipation aperture to the chassis, it is possible further to enhance the advantageous effect for heat dissipation.

Variant Embodiment #14

Figure 20:
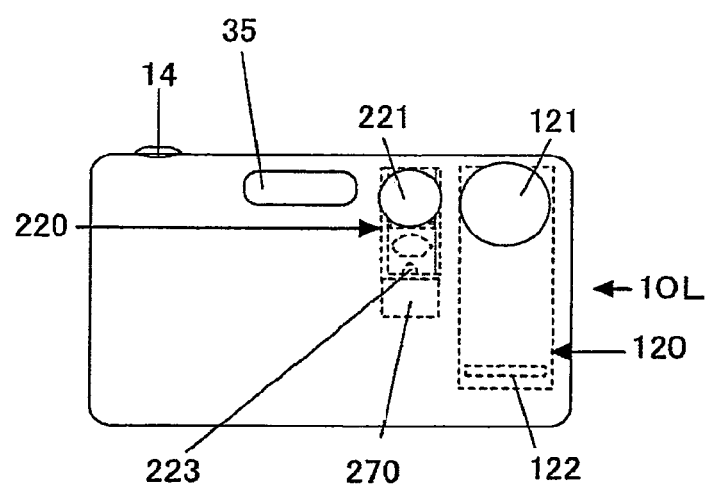
FIG. 20 is a figure for explanation of an electronic camera with incorporated projector according to a variant embodiment #14.

FIG. 20 is a figure for explanation of another electronic camera with incorporated projector 10L that has a photographic optical system 121 of the bending type. In FIG. 20, the feature that the image-capturing unit 120 (shown by the broken line) is arranged as vertically oriented at the right side of the camera as one faces it, is the same as in the case of FIG. 19. The projection unit 220 (shown by the broken line) is disposed side by side with the image-capturing unit 120 at the center portion of the body of the electronic camera with incorporated projector 10L (its center in the left and right direction). The optical system of the projection unit 220 is arranged with its longitudinal direction vertical, and its members whose temperatures become elevated (i.e. the LED light source 223 and the heat dissipation member 270) are positioned at the central portion of the camera body, more towards its center than the projection optical system 221.

It should be understood that, if a flashlight emission device that uses a light source of the electrical discharge type such as a xenon lamp or the like is housed internally to this electronic camera with incorporated projector 10L, then a light emission window 35 is disposed side by side with the projection optical system 221. The position of this light emission window 35 is separated from the photographic lens 11 (121), and it may be positioned where it is difficult for the user to put his finger upon it.

According to this variant embodiment #14, since the members whose temperatures become elevated (the LED light source 223 and the heat dissipation member 270) are disposed at the central portion of the body of this electronic camera with incorporated projector 10L that is equipped with a photographic optical system 121 of the bending type, accordingly it is possible to provide a structure with which, if the user grasps the camera body and applies his finger to the release button 14, it is difficult for him to touch any spot of which the temperature is elevated.

Variant Embodiment #15

Figure 21:
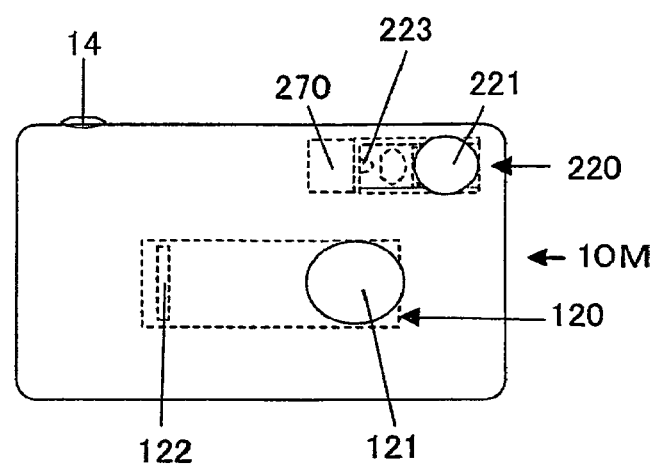
FIG. 21 is a figure for explanation of an electronic camera with incorporated projector according to a variant embodiment #15.

FIG. 21 is a figure for explanation of another electronic camera with incorporated projector 10M that is equipped with a photographic optical system 121 of the bending type. According to FIG. 21, the image-capturing unit 120 (shown by the broken line) is arranged with its long side horizontal in the central portion (the center in the left and right direction) of the body of this electronic camera with incorporated projector 10M. In concrete terms, the photographic lens 11 (121) is disposed in the center of the front surface, while the image sensor 122 is disposed towards the left of the front surface. The projection unit 220 (shown by the broken line) is disposed at the upper central edge portion of the body of this electronic camera with incorporated projector 10M. The optical system of the projection unit 220 is arranged horizontally in the longitudinal direction, and the members thereof whose temperatures are elevated (i.e. the LED light source 223 and the heat dissipation member 270) are positioned on the upper edge portion of the body, towards its center in the left and right direction.

According to this variant embodiment #15, since the members whose temperatures are elevated (i.e. the LED light source 223 and the heat dissipation member 270) are disposed at the center of the upper edge portion of the body of this electronic camera with incorporated projector 10M that is equipped with the photographic optical system 121 of the bending type, accordingly it is possible to provide a structure with which, if the user grasps the camera body and places his finger upon the release button 14, it is difficult for him to touch the spots whose temperature becomes elevated.

Variant Embodiment #16

Figure 22:
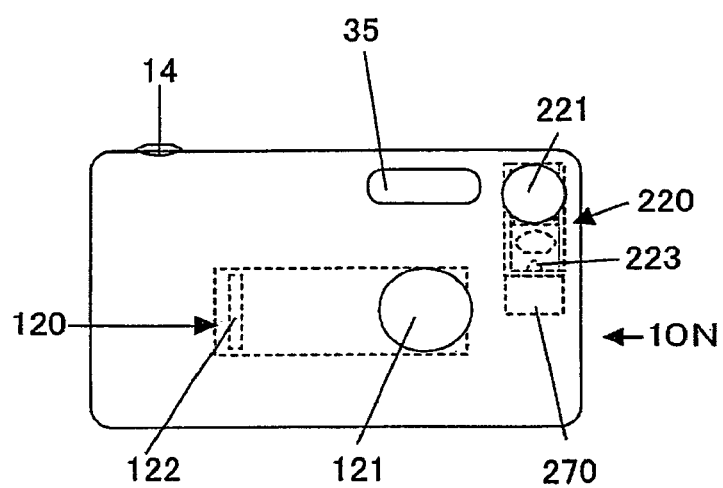
FIG. 22 is a figure for explanation of an electronic camera with incorporated projector according to a variant embodiment #16.

FIG. 22 is a figure for explanation of another electronic camera with incorporated projector 10N that is equipped with a photographic optical system 121 of the bending type. In FIG. 22, the feature that the image-capturing unit 120 (shown by the broken line) is arranged with its long side horizontal at the central portion of the body (i.e. at the central portion in the left and right direction) of this electronic camera with incorporated projector 10N, is the same as in FIG. 21. However, the projection unit 220 (shown by the broken line) is disposed in the side edge portion of the body of the electronic camera with incorporated projector 10N. The optical system of the projection unit 220 is arranged with its longitudinal direction vertical, and the members thereof whose temperatures are elevated (i.e. the LED light source 223 and the heat dissipation member 270) are on the body side edge portion (on the opposite side from the release button 14), and are positioned towards the center in the upwards and downwards direction from the projection optical system 221.

It should be understood that, if a flashlight emission device that uses a light source of the electrical discharge type such as a xenon lamp or the like is housed internally to this electronic camera with incorporated projector 10N, then a light emission window 35A is disposed side by side with the projection optical system 221. The position of this light emission window 35A is separated from the photographic lens 11 (121), and it may be positioned where it is difficult for the user to put his finger upon it.

According to this variant embodiment #16, since the members whose temperatures become elevated (the LED light source 223 and the heat dissipation member 270) are disposed at the body side edge portion of the body of this electronic camera with incorporated projector 10N that is equipped with a photographic optical system 121 of the bending type, accordingly it is possible to provide a structure with which, if the user grasps the camera body and applies his finger to the release button 14, it is difficult for him to touch any spot of which the temperature is elevated.

In the fourth embodiment and the variant embodiments 14 through 16 explained above, according to the position of disposition of the projection unit 220, it is desirable to dispose the circuits that process the projection image signal (for example, the path for the image data that is sent from the CPU 101 to the projection control circuit 225, and the signal processing circuit for that data) in the neighborhood of the projection unit 220. By making the projected image signal line short, it is possible to suppress interference between the image capture signal and so on and other signal lines, and it is possible to reduce noise superimposed upon the signal.

Embodiment Five

Figure 23:
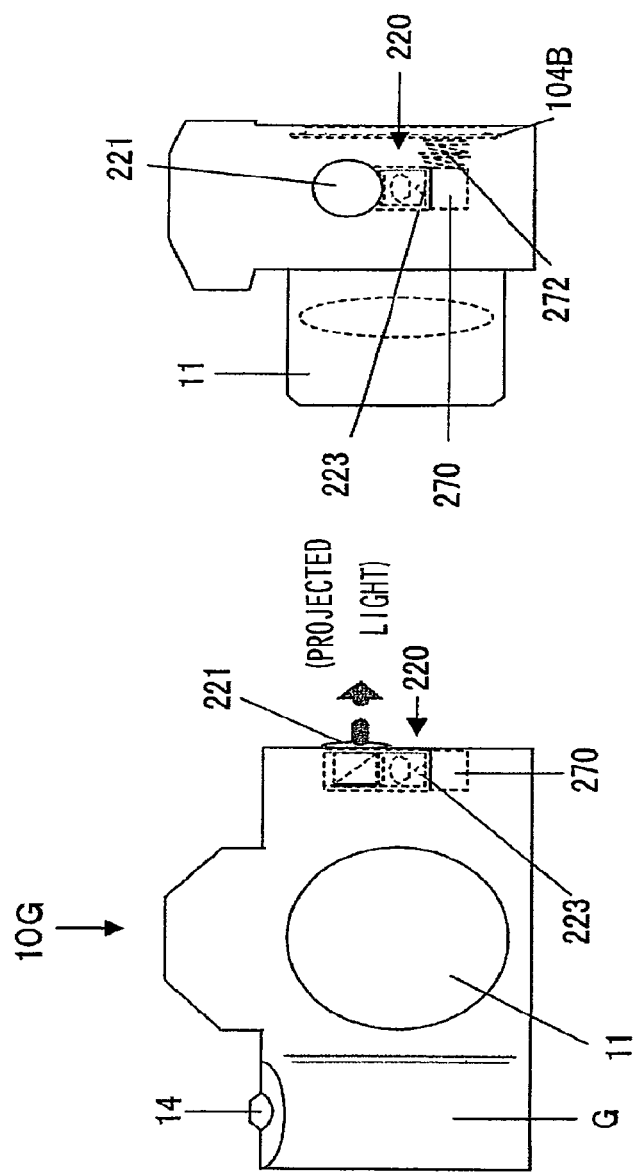

It would also be acceptable to make the direction of projection by the projection unit 220 and the direction of photography by the photographic lens 11 be different from one another. FIGS. 23(a) and 23 (b) show an example of an electronic camera with incorporated projector 10G to which the projection module explained in FIGS. 10 and 11 is mounted: FIG. 23(a) is an elevation view thereof, and FIG. 23(b) is a side view thereof. The electronic camera with incorporated projector 10G shown by way of example in FIGS. 23(a) and 23(b) is of a single lens reflex type, having a photographic lens 11 installed to a lens mount (not shown in the figures) on the front of the camera chassis (body). A projection unit 220 (shown by the broken lines) is contained within the camera chassis, and a projection optical system 221 is positioned on a side surface of the camera chassis that is on the opposite side to the surface where a grip portion G is, with the photographic lens 11 between them. It should be understood that this could also be a camera of a type in which the photographic lens 11 cannot be detached from the camera chassis.

With this electronic camera with incorporated projector 10G, emission of projected light is possible in the state in which the projection mode is started (when the main switch is ON), while, in the state in which the photographic mode is started (when the main switch is ON), emission of projected light is prohibited.

In FIG. 23(b), heat is conducted between a heat dissipation member 270 of the projection unit 220 whose temperature is elevated and a metallic back panel member 104B of the liquid crystal display unit 104 (see FIG. 3) via a heat conduction member 272.

This electronic camera with incorporated projector 10G is built so as to be able to perform projection even in its facing down attitude in which the photographic lens 11 is faced downwards. According to FIG. 24, the external diameter of a lens cap 11C is made to be quite a lot larger than the opening diameter of the photographic lens 11, so that the setting area in the facing down attitude is wider than the opening diameter area of the photographic lens 11. Due to this, the setting attitude of this electronic camera with incorporated projector 10G upon a planar surface is stable, even if an interchangeable photographic lens 11 whose focal length is long is installed thereto.

Figure 24:
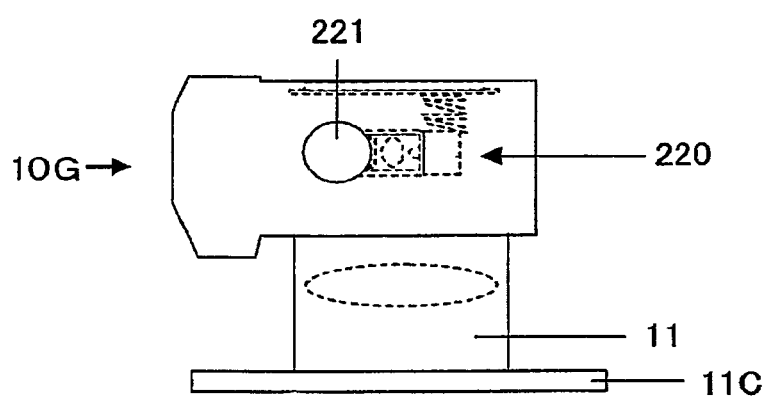
FIG. 24 is a figure for explanation of a facing down attitude in which a photographic lens is facing downwards.

A CPU 101 of this electronic camera with incorporated projector 10G decides, based upon an attitude detection signal from an attitude sensor 111, whether the camera is in the setting attitude of FIGS. 23 (a) and 23 (b) or is in the setting attitude of FIG. 24. Moreover, the CPU 101 perform rotation of the image data in the memory 102 according to the setting attitude that has been decided upon, and outputs the image data after this rotation processing to the projection unit 220.

According to the fifth embodiment explained above, the following beneficial operational effects are obtained.

(1) Since the direction of projection from the projection unit 220 is made to be the direction of the side surface of the body of the electronic camera with incorporated projector 10G, accordingly, even if a photographic lens 11 whose focal length is long is installed to the front of the camera body, there is no fear that a portion of the projected ray bundle will be interfered with by the lens barrel.

(2) Since the direction of projection from the projection unit 220 is made to be the direction of the side surface of the body, accordingly, if the user grasps the side surface of the body on the side of the projection unit 220, the projected light will be intercepted by the hand of the user. Due to this, during projection, the user is encouraged not to hold the side surface of the body on the side of the projection unit 220, and accordingly it is possible to provide a structure in which the user cannot easily touch the spots whose temperature is elevated.

(3) Since the above described side surface of the body is on the opposite side surface to the side where the grip portion G is located, accordingly it is possible to reduce the fear that, if the user grasps the side surface of the body, the projected light will be intercepted by the hand of the user. It should be understood that if it is supposed, as a premise, that projection is performed with the projection unit in the state in which this electronic camera with incorporated projector 10G is set or mounted upon a planar surface, then the projection unit 220 may be disposed upon any of the body side surfaces, and may project to any side.

(4) Since the members of this electronic camera with incorporated projector 10G whose temperature is elevated (i.e. the LED light source 223 and the heat dissipation member 270) are disposed so as to contact its chassis side surface from the interior, accordingly it is also possible to dissipate heat from the camera chassis to the exterior of the chassis as well.

(5) Since it is arranged to conduct heat from the heat dissipation member 270 to the metallic back panel member 104B via the member 272 that has good thermal conductivity, accordingly it is also possible to dissipate heat from this metallic back panel member 104B with good efficiency as well.

(6) Since the protection member (the lens cap 11C), that is built so that its external diameter area is substantially wider than the aperture diameter area of the photographic lens 11, is fitted to the photographic lens 11, accordingly it is possible to stabilize the setting attitude of this electronic camera with incorporated projector 10G in its facing down attitude in which the photographic lens 11 is faced downward. Due to this, it becomes possible also to set the camera upon a sloping surface in a stable manner.

(7) Since it is arranged to detect the camera attitude and to perform image rotation processing, and to perform projection from the projection unit 220 of the image after this rotation processing, accordingly it is possible automatically to project an erect image in the correct orientation, even from the above described facing down attitude.

Variant Embodiment #17

In the case of the setting attitude of FIGS. 23(*a*) and 23(*b*), when a photographic lens 11 is installed whose focal length is long, sometimes the front surface side (the photographic lens 11 side) of the electronic camera with incorporated projector 10G may tilt over. In this case, in order to correct for this inclination of the electronic camera with incorporated projector 10G, the setting attitude of the electronic camera with incorporated projector 10G is stabilized by using the protection member (a lens cap 11D). FIGS. 25(*a*) and (*b*) show an example of an electronic camera with incorporated projector 10G to which a lens cap 11D and a photographic lens 11 are installed: FIG. 25(*a*) is an elevation view, while FIG. 25(*b*) is a side view.

According to FIGS. 25(*a*) and 25(*b*), the center of the external diameter of the lens cap 11D is eccentric, so that it is different from the center of the aperture diameter of the photographic lens 11. By rotating the lens cap 11D that is installed upon the photographic lens around the center of the photographic lens, the space between the lens barrel of the photographic lens 11 and the planar surface upon which this electronic camera with incorporated projector 10G is set may be adjusted.

According to this variant embodiment #17, it is possible to stabilize the setting attitude of this electronic camera with incorporated projector 10G upon a planar surface, even if a photographic lens 11 whose focal length is long is fitted to the camera. Moreover, no portion of the projected ray bundle is interfered with by the lens cap 11D.

Variant Embodiment #18

Figure 26:
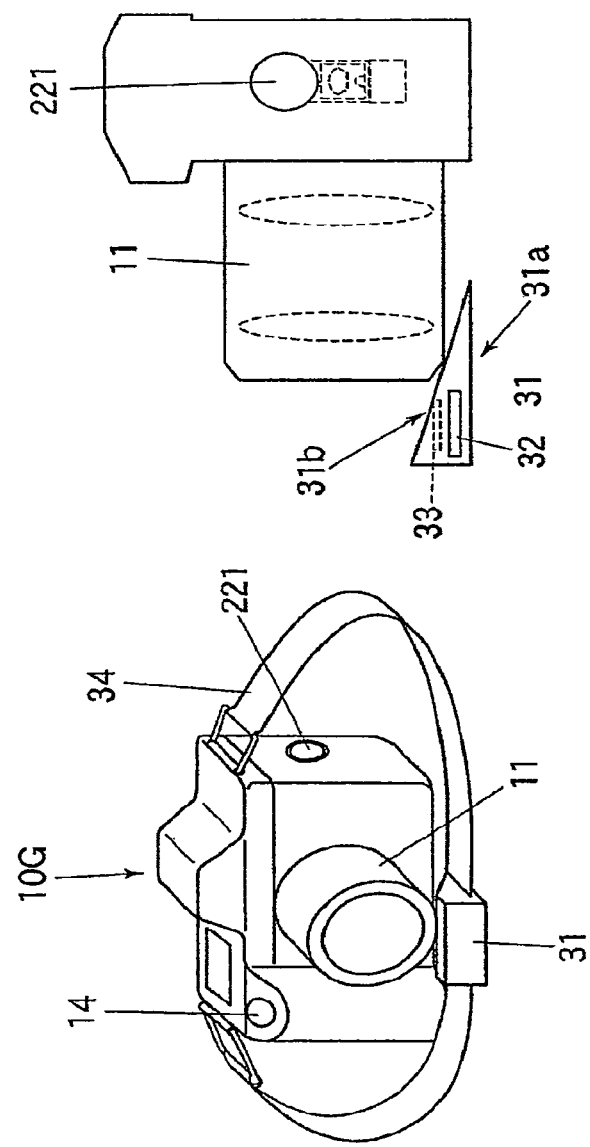
FIG. 26 (a) and FIG. 26 (b) show a variant embodiment of the electronic camera with incorporated projector, in which its inclination is corrected.

FIGS. 26 (*a*) and 26 (*b*) show an example of an electronic camera with incorporated projector 10G, whose inclination is corrected. FIG. 26 (*a*) is an overall view showing this example of the electronic camera with incorporated projector 10G that is supported by a memory holder 31, while FIG. 26 (*b*) is a side view thereof.

In FIG. 26(*a*), the memory holder 31 is installed upon a camera strap 34. In FIG. 26 (*b*), the memory holder 31 is shaped as a triangular prism, and a strap aperture 32 is provided as pierced through it in the direction perpendicular to the drawing paper. This memory holder 31 is inserted between the lens barrel of the photographic lens 11 and the planar surface upon which the electronic camera with incorporated projector 10G is set, with its triangular prism shape being laid down in a state so that, as seen from the side direction, the bottom surface of its wedge shape can be seen. It should be understood that, in FIG. 26 (*b*), the strap 34 is not shown in the figure. In the vicinity of the strap aperture 32, there is provided a holder portion 33 that stores a standby memory card 150. The surfaces 31*a* and 31*b* of the memory holder 31 are subjected to roughening processing, so that a non-slip effect is obtained.

According to this variant embodiment #18, it is possible to stabilize the setting attitude of this electronic camera with incorporated projector 10G upon a planar surface, even if a photographic lens 11 whose focal length is long is fitted to the camera. Moreover, by changing the depth to which the memory holder 31 is inserted under the photographic lens 11, it is possible to adjust the gap between the lens barrel 11 of the photographic lens 11 and the planar surface upon which the electronic camera with incorporated projector 10G is set. Furthermore, no portion of the projected ray bundle is interfered with by the memory holder 31.

Instead of the memory holder 31, it would also be acceptable to stabilize the setting attitude of the electronic camera with incorporated projector 10G by using a lens cap holder that stores a lens cap, or a remote control holder that stores a remote control transmitter (either of which should be formed in a wedge shape).

Moreover, it would also be acceptable to provide a structure in which the lens cap is made in a wedge shape, so that the wedge shaped portion of this lens cap could be inserted between the lens barrel of the photographic lens 11 and the planar surface upon which the electronic camera with incorporated projector 10G is set. Even further, it would also be acceptable to provide a dedicated wedge shaped member in order to stabilize the setting attitude of the electronic camera with incorporated projector 10G. In this case, it would be desirable for the wedge shaped member to be built so that it can be fitted to the camera strap 34.

Variant Embodiment #19

Figure 27:
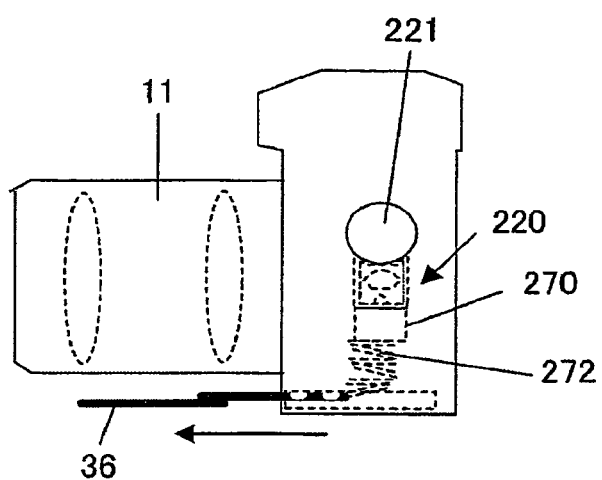
FIG. 27 is a side view showing an example of a horizontal stabilization plate of an electronic camera with incorporated projector.

In order to stabilize the setting attitude of the electronic camera with incorporated projector 10G, it would also be acceptable to provide a structure that includes a stabilization plate that can be freely pulled out at the bottom surface of the camera body. FIG. 27 is a side view showing an example of a horizontal stabilization plate 36 that is provided at the bottom surface portion of an electronic camera with incorporated projector 10G. In FIG. 27, the horizontal stabilization plate 36 consists of two thin plate members that are linked together, and is built so as to be capable of being pulled out in the direction of the arrow sign, in two stages. The user pulls the plate out (i.e. opens it up) by the necessary amount in order to stabilize the setting attitude of this electronic camera with incorporated projector 10G. By doing this, the area of the camera that is in contact with the setting surface is widened, so that its setting attitude is stabilized.

If the horizontal stabilization plate 36 is not in use, then this horizontal stabilization plate 36 is housed (i.e. is closed up) within a slot (shown by the broken line) that is provided along the bottom surface of the camera body. If it is arranged to transfer heat from the heat dissipation member 270 to this slot portion (i.e. the camera chassis) via a member 272 that has good thermal conductivity, then it is possible also to dissipate heat with good efficiency from the horizontal stabilization plate 36. It should be understood that the slot portion and the horizontal stabilization plate 36 are connected together with a heat conductive material.

According to the variant embodiment #19 explained above, it is possible to stabilize the setting attitude of this electronic camera with incorporated projector 10G upon a planar surface, even if a photographic lens 11 whose focal length is long is fitted to the camera. Moreover, it is also possible to dissipate heat from the horizontal stabilization plate 36, and no portion of the projected ray bundle is interfered with by the horizontal stabilization plate 36.

Variant Embodiment #20

Figure 28:
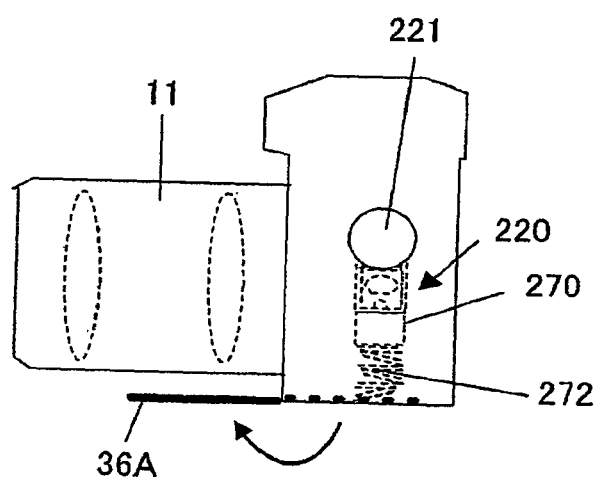
FIG. 28 is a side view showing an example of a horizontal stabilization plate of an electronic camera with incorporated projector.

It would also be acceptable to build the horizontal stabilization plate so that it can rotate freely. FIG. 28 is a side view showing an example of a horizontal stabilization plate 36A that is rotatably supported by a hinge member (not shown in the figures) so that a straight line within the bottom surface of the electronic camera with incorporated projector 10G (for example, one side of which bottom surface) constitutes its rotational axis. In FIG. 28, the horizontal stabilization plate 36A is rotated through 180° in the direction of the arrow sign from its folded away state (shown by the broken line). When stabilizing the setting attitude of the electronic camera with incorporated projector 10G, the user opens the horizontal stabilization plate 36A by rotating it. Due to this, the area of contact between the camera and the planar surface upon which it is set is widened, so that its setting attitude is stabilized.

When the horizontal stabilization plate 36A is not being used, this horizontal stabilization plate 36A is closed by being folded up so as to lie along the bottom surface of the camera body (as shown by the broken line). If it is arranged to transmit heat from the heat dissipation member 270 to the bottom surface portion of the camera body via a member 272 that has good thermal conductivity, then it is also possible to dissipate heat from the horizontal stabilization plate 36 with good efficiency. It should be understood that it is arranged to conduct heat from the camera bottom surface to the horizontal stabilization plate 36A via the hinge member that supports the horizontal stabilization plate 36A.

According to the variant embodiment #20 explained above, it is possible to stabilize the setting attitude of this electronic camera with incorporated projector 10G upon a planar surface, even if a photographic lens 11 whose focal length is long is fitted to the camera. Moreover, it is also possible to dissipate heat from the horizontal stabilization plate 36A, and no portion of the projected ray bundle is interfered with by the horizontal stabilization plate 36A.

Variant Embodiment #21

In order to stabilize the setting attitude of the electronic camera with incorporated projector 10G, it would also be acceptable to provide a structure incorporating a stabilization plate on the side surface of the camera body, that is pulled out freely. FIG. 29 consists of figures for explanation of an example of a vertical stabilization plate 39B that is provided upon a side surface portion of an electronic camera with incorporated projector 10G: FIG. 29(a) is a plan view thereof, while FIG. 29(b) is a side view thereof. In FIGS. 29(a) and 29 (b), the vertical stabilization plate 36B consists of two thin plate members that are linked together, and is built so as to be capable of being pulled out in the direction of the arrow sign, in two stages. The user pulls the plate out (i.e. opens it up) by the necessary amount in order to stabilize the setting attitude of this electronic camera with incorporated projector 10G. By doing this the setting attitude of the camera is stabilized.

If the vertical stabilization plate 36B is not in use, then this vertical stabilization plate 36B is housed (i.e. is closed up) within a slot (shown by the broken line in FIG. 29(a)) that is provided along the side surface of the camera body. If it is arranged to transfer heat from the heat dissipation member 270 to this slot portion (i.e. the camera chassis) via a member not shown in the figure that has good thermal conductivity, then it is possible also to dissipate heat with good efficiency from the vertical stabilization plate 36B. It should be understood that the slot portion and the vertical stabilization plate 36B are connected together with a heat conductive material.

According to the variant embodiment #21 explained above, it is possible to stabilize the setting attitude of this electronic camera with incorporated projector 10G upon a planar surface, even if a photographic lens 11 whose focal length is long is fitted to the camera. Moreover, it is also possible to dissipate heat from the vertical stabilization plate 36B, and no portion of the projected ray bundle is interfered with by the vertical stabilization plate 36B.

Variant Embodiment #22

With this electronic camera with incorporated projector 10G, it would also be acceptable to provide a structure in which, when the horizontal stabilization plate or the vertical stabilization plate is pulled out (or when it is rotated) while the camera is in an operational mode other than the projection mode, such as the photographic mode or the like, then the camera changes over to the projection mode and starts emitting projected light. It should be understood that, in order to detect the state in which the horizontal stabilization plate or the vertical stabilization plate is pulled out (or in which it is rotated), a micro switch not shown in the figures is internally incorporated, that is turned ON or OFF together with the above described pulling out (or rotational) actuation. In this case, when the horizontal stabilization plate or the vertical stabilization plate is stored away, the emission of projected light is terminated, and the camera changes over from the projection mode to the most recent operational mode other than the projection mode.

In variant embodiment #19 through variant embodiment #22, it would also be acceptable to arrange, with this electronic camera with incorporated projector 10G, to start operation in the projection mode and start the emission of projected light, when the horizontal stabilization plate or the vertical stabilization plate is pulled out in the state in which the main switch is OFF. In this case power supply OFF processing would be performed and projection would be terminated, when the horizontal stabilization plate or the vertical stabilization plate is stored away.

Variant Embodiment #23

Figure 30:
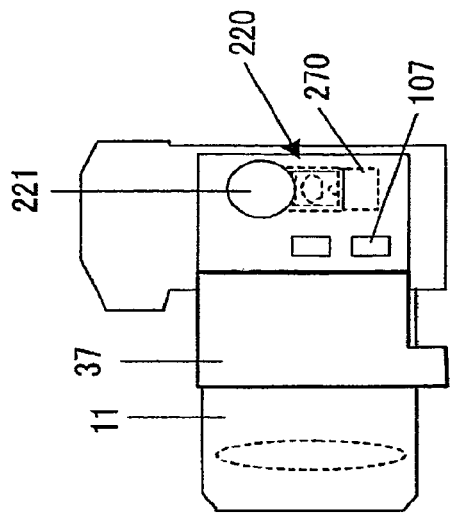
FIG. 30 (a) and FIG. 30 (b) show an example of a vertical stabilization plate of an electronic camera with incorporated projector.
Figure 30:
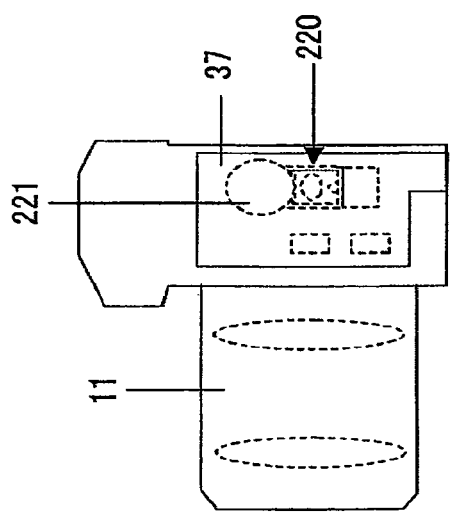

It would also be acceptable to provide a structure in which the vertical stabilization plate rotates freely. FIGS. 30 (a) and 30 (b) are side views showing an example of a vertical stabilization plate 37 that is rotatably supported by a hinge member (not shown in the figures) so that a straight line within the side surface of the electronic camera with incorporated projector 10G constitutes its rotational axis. FIG. 30(a) shows the folded away state of the vertical stabilization plate 37, while FIG. 30(b) shows the rotated out state of the vertical stabilization plate 37.

The vertical stabilization plate 37 of this variant embodiment #23 also serves as a lid member that closes up an opening portion of the chassis of the camera. A connector or the like that is included in the projection optical system 221 and the external interface (I/F) 107 is disposed in this opening portion, and, in the state in which the vertical stabilization plate 37 is folded away (see FIG. 30(a)), this projection optical system 221 and so on is protected by the vertical stabilization plate 37. However, when the vertical stabilization plate 37 is rotated through 180° from its folded away state, then, as shown in FIG. 30(b), the vertical stabilization plate 37 stabilizes the setting attitude of the electronic camera with incorporated projector 10G.

If it is arranged to transfer heat from the heat dissipation member 270 to the side surface portion of the camera body via a member that has good thermal conductivity, then it is possible also to dissipate heat with good efficiency from the vertical stabilization plate 37. It should be understood that it is arranged for heat to be conducted from the side surface of the camera body to the vertical stabilization plate 37 via the hinge member that supports the vertical stabilization plate 37.

According to the variant embodiment #23 explained above, it is possible to stabilize the setting attitude of this electronic camera with incorporated projector 10G upon a planar surface, even if a photographic lens 11 whose focal length is long is fitted to the camera. Moreover, it is also possible to dissipate heat from the vertical stabilization plate 37, and no portion of the projected ray bundle is interfered with by the vertical stabilization plate 37. Furthermore since it is also arranged for the vertical stabilization plate 37, in its folded away state, to serve as a lid member that protects the connectors and so on of the projection optical system 221 and the external interface (I/F) 107 and so on, accordingly it is possible to reduce the number of components, as compared to providing a lid member and the vertical stabilization plate separately. It should be understood that it would also be acceptable to provide a structure in which only the projection optical system 221 was disposed in the opening portion of the camera chassis, or only the external interface (I/F) 107 was disposed there. Moreover, it would also be acceptable to make it possible to start the projection mode of this electronic camera with incorporated projector 10G and the emission of projected light, by the vertical stabilization plate 37 being rotated through 180°; in other words, it would be acceptable to employ the vertical stabilization plate 37 as a switch for projection.

Embodiment Six

Figure 31:
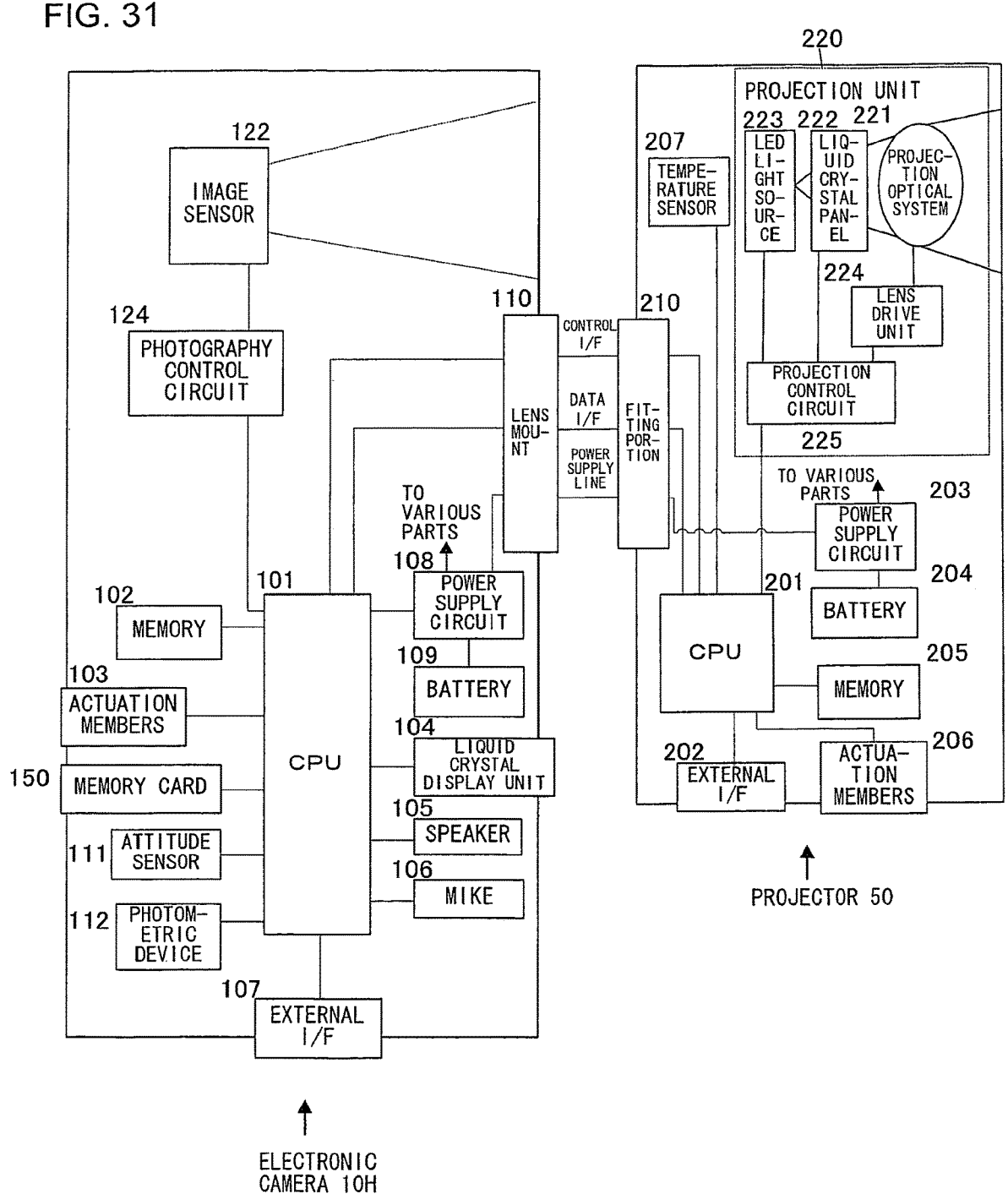
FIG. 31 is a block diagram for explanation of the circuit structure of a camera system according to a sixth embodiment.

A camera system is made up of a camera body with interchangeable photographic lens, and a projector that can be installed to the lens mount of the camera body. FIG. 31 is a block diagram for explanation of the circuit structure of such a camera system. In FIG. 31, to structural elements that are common with FIG. 3, common reference symbols are appended, and explanation thereof is curtailed.

This electronic camera 10H is, for example, a single lens reflex type electronic camera. As compared with the circuit structure explained with the aid of FIG. 3, the differences are the feature that the lens drive unit and the lens barrel retraction mechanism are omitted, and the feature that a lens mount 110 is added. When a conventional photographic lens (not shown in the figures) is mounted to the lens mount 110, a CPU 101 performs communication with a CPU on the photographic lens side via a communication terminal that is provided to the lens mount 110. And the photographic camera 10H captures an image of the photographic subject upon an image sensor 112 with the photographic lens.

When a projector 50 is installed upon the lens mount 110, the CPU 101 performs communication with a CPU 201 on the side of the projector 50 via the communication terminal that is provided to the lens mount 110. In this case the electronic camera 10H does not perform photography, but causes the projector 50 to perform projection.

In FIG. 31, the communication lines between the control terminals are shown as a control line (Control I/F) and a data line (Data I/F). The contents that the CPU 101 transmits to the photographic lens are, for example, a shift amount for the focus optical system, a shift direction, and a shift start command. The contents that the CPU 101 transmits to the projector 50 are, for example, commands to start projection and to stop projection, and contents data to be projected and the like. It should be understood that it would also be possible for power to be supplied from the electronic camera 10H to the photographic lens via a power supply terminal provided to the lens mount 110.

In addition to a fitting portion 210 that fits into the lens mount 110, the projector 50 includes a projection unit 220, a CPU 201, an external interface (I/F) 202, a power supply circuit 203, a memory 205, actuation members 206, and a temperature sensor 207. Moreover, a battery 204 is loaded into a battery holder not shown in the figure.

Based upon a control program, the CPU 201 performs control of projection operation by performing predetermined calculations and the like using signals that are inputted from various parts that make up the projector 50, and by sending control signals to various parts of the projector 50. It should be understood that the control program is stored in a non-volatile memory not shown in the figures, provided within the CPU 201.

The memory 205 is used as a working memory for the CPU 201. The actuation members 206 send actuation signals to the CPU 201 according to the details of actuation of the various members. The power supply circuit 203 is turned ON and OFF by commands from the CPU 201, and, when it is ON, converts the voltage from the battery 204 to the voltages required by the various circuits, thereby supplying electrical power to various parts of the projector 50.

In order for a replay image to be projected with the projection unit 220 according to a signal that is transmitted from an external device, the external interface (I/F) 202 converts the received signal into image data, and sends the image data after conversion to the CPU 201. The temperature sensor 207 is disposed in the neighborhood of the projection unit 220, and sends a temperature detection signal to the CPU 201. Based upon this temperature detection signal, the CPU 201 calculates the internal temperature in the neighborhood of the projection unit 220.

Figure 32A:
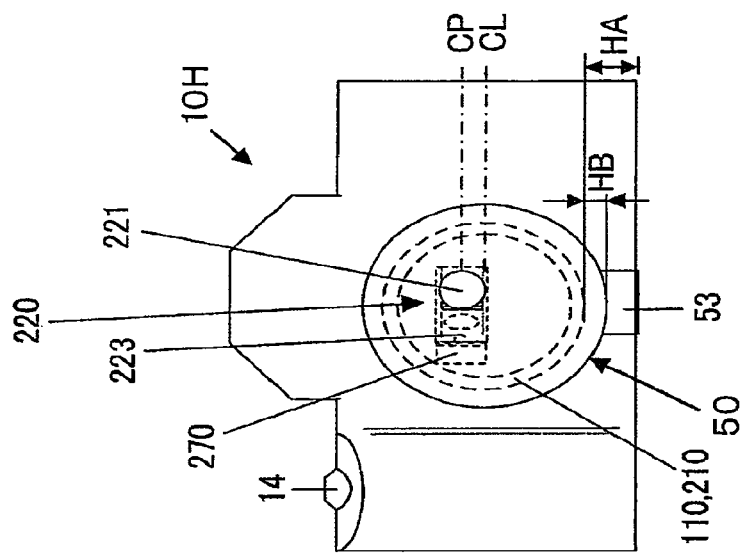
FIG. 32(a) and FIG. 32(b) show an example of a camera system.
Figure 32B:
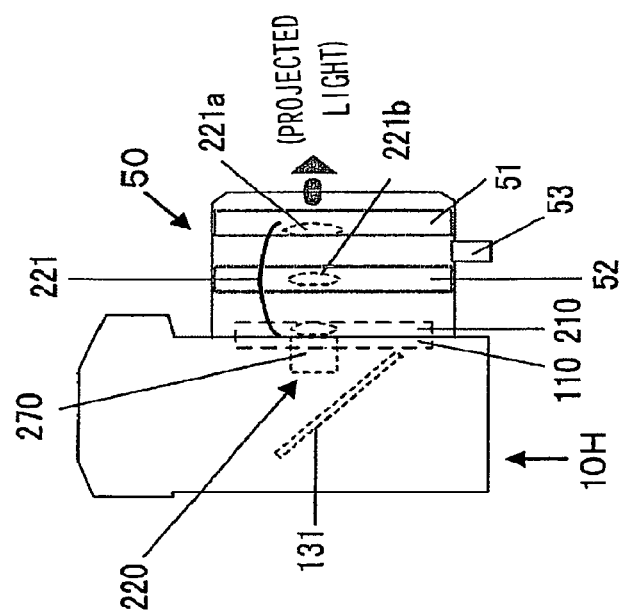

FIGS. 32(*a*) and 32(*b*) show the state in which the projector 50, to which the projection module explained in FIGS. 10 and 11 is mounted, is installed to the electronic camera 10H: FIG. 32(*a*) is an elevation view, while FIG. 32(*b*) is a side view. According to FIGS. 32(*a*) and 32(*b*), the projection module is arranged with its longitudinal direction horizontal, and with the line CP that passes through the center of the projection optical system being offset above the line CL that passes through the center of the lens barrel of the projector 50. Although the projection unit 220 projects to the interior of the electronic camera 10H, it is disposed in a position in which it does not interfere with the mirror 131. It should be understood that since, if the mirror 131 moves in this state, there is a danger of damaging the mirror 131, accordingly movement of the mirror 131 is prohibited in the state in which the projector 50 is installed to the electronic camera 10H.

A focus ring 51 and a zoom ring 52 are provided to the lens barrel of the projector 50. The structure is such that, when the zoom ring 52 is actuated by being rotated, then a zoom lens 221*b* that is incorporated in the projection optical system 221 is shifted forwards or backwards along the direction of the optical axis, according to the amount of this actuation. Moreover, the structure is such that, when the focus ring 51 is actuated by being rotated, then a focus lens 221*a* that is incorporated in the projection optical system 221 is shifted forwards or backwards along the direction of the optical axis, according to the amount of this actuation. The projector 50 may also be capable of auto focusing, and, in this case, auto focus may be performed by disposing a photographic unit for auto-focusing or a range-finding sensor within the projector 50, or within the electronic camera 10H. It should be understood that, although these may be driven electrically, they may also be directly driven mechanically by actuation of the zoom ring or the focus ring.

The length HB from the fitting portion 210 of the projector 50 to the external edge (the external circumference) of the lens barrel is shorter than the length HA from the lens mount 110 of the electronic camera 10H to the bottom surface of the chassis of the camera. Thus, a support member 53 is provided at the lower portion of the lens barrel. The position of this support member 53 does not change, even when the focus ring 51 and the zoom ring 52 are actuated. In the state in which the projector 50 is installed to the lens mount 110 of the electronic camera 10H, the setting attitude upon a planar surface is stabilized by the bottom surface of the electronic camera 10H and by the support member 53. Although, in this embodiment, the length from the fitting portion 210 to the outer edge of the lens barrel, and the length to the bottom surface of the camera chassis, have been discussed, in the case of, not the length from the fitting portion 210, but the length from the center of the fitting portion 210, a similar relationship holds as well.

<Projection Source: The Source>

According to a command from the CPU 201, the projection unit 220 of the projector 50 projects contents from any one of the sources "source #1" through "source #3" described below.

Each time a source changeover actuation signal is inputted from an actuation member 206 (or from the electronic camera 10H), the CPU 201 outputs image data that corresponds to an image to the projection unit 220, so as alternatingly to change over the projected image between "source #1" and "source #2". However, if the projector 50 is not installed to the lens mount 110 of the electronic camera 10H, or if even though the projector 50 is installed to the lens mount 110 of the electronic camera 10H the power supply of the electronic camera 10H is OFF, then "source #1" is not selected; and, if no external device is connected to the external interface (I/F) 202, then "source #2" is not selected.

Furthermore, when an actuation signal is inputted from the electronic camera 10H to which the projector 50 is installed in order to changeover to chart projection, then the CPU 201 outputs image data to the projection unit 220 corresponding to "source #3" described below.

Source #1: a replay image from data that has been transmitted from the electronic camera 10H;

Source #2: a replay image from data that is inputted from the external interface (I/F) 202;

Source #3: an image that is a chart for focus adjustment, for example an image consisting of a banded pattern with black lines upon a white ground.

With the camera system according to this embodiment, the projector 50 that is installed to the electronic camera 10H performs projection operation while communicating with the electronic camera 10H.

<Processing on the Projector Side>

Figure 33:
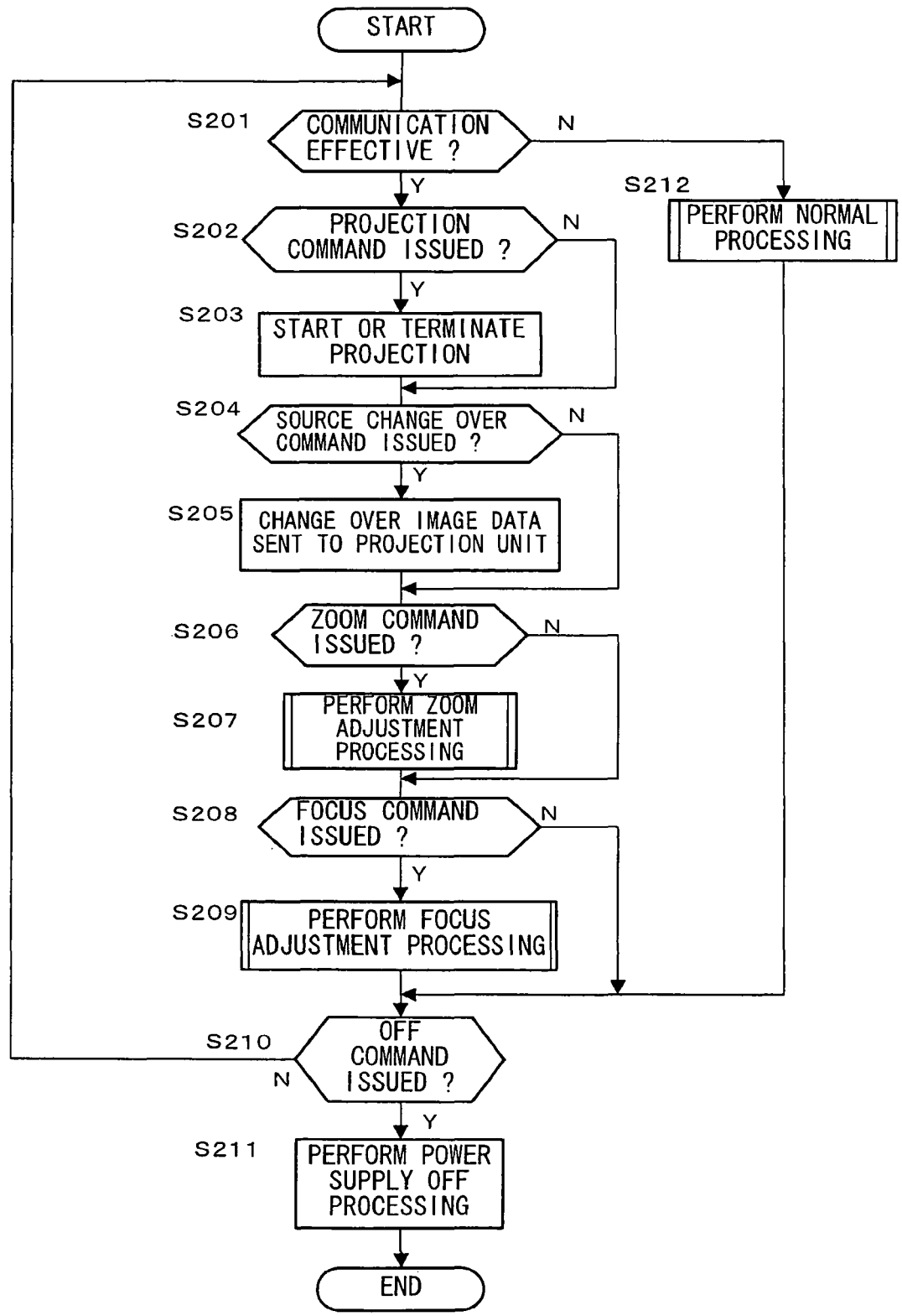
FIG. 33 is a flow chart for explanation of the flow of processing performed by a CPU of a projector.

FIG. 33 is a flow chart for explanation of the flow of processing performed by the CPU 201 of the projector 50. The processing of FIG. 33 is started when the main switch (not shown in the figures) of the projector 50 is actuated to ON.

In a step S201 of FIG. 33, the CPU 201 decides whether or not communication is effective. If communication can be performed with the CPU 101 on the side of the electronic camera 10H by using a predetermined communication protocol so that communication is effective, then the CPU 201 reaches an affirmative decision in this step S201 and the flow of control proceeds to a step S202. On the other hand if communication is not effective, then in this step S201 the CPU 201 reaches a negative decision and the flow of control is transferred to a step S212.

If the flow of control is transferred to the step S212, the CPU 201 performs normal processing. Normal processing is processing when the projector 50 is not installed to the electronic camera 10H but is being used independently, processing when the main switch of the electronic camera 10 to which the projector 50 is installed is OFF, or processing when the projector 50 is installed to a camera that is not endowed with any function of communication with the projector 50.

When performing normal processing, according to an actuation signal that is inputted from the actuation members 206, the CPU 201 commands the projection control circuit 225 to turn projection ON and OFF, to change over the projection source, to perform focus adjustment, or to perform zoom adjustment processing. In concrete terms, if an actuation signal from a light source ON/OFF switch (not shown in the figures) has been inputted, then, depending upon this actuation signal, the CPU 201 commands lighting up or turning off of the LED light source 223. If a source changeover actuation signal has been inputted, then, as explained above, the image data that is sent to the projection unit 220 is changed over. If communication with the electronic camera 10H has become ineffective, then the initial image that is projected by the projector 50 is made to be a replay image that corresponds to the above described "source #2".

Furthermore, if an actuation signal for focus adjustment (i.e. an actuation signal due to the focus ring 51) has been inputted, then the CPU 201 sends a focus adjustment signal that corresponds to this actuation signal to the projection control circuit 225. And, if an actuation signal for zoom adjustment (i.e. an actuation signal due to the zoom ring 52) has been inputted, then the CPU 201 sends a focus adjustment signal that corresponds to this actuation signal to the projection control circuit 225. After the CPU 201 has performed normal processing in this manner, the flow of control is transferred to a step S211.

However, if the flow of control has proceeded to the step S202, then the CPU 201 makes a decision as to whether or not projection has been commanded. If a signal that issues a command related to projection is inputted, then the CPU 201 reaches an affirmative decision in the step S202 and the flow of control is transferred to a step S203, whereas if no signal that issues a command related to projection is inputted then a negative decision is reached in this step S202 and the flow of control is transferred to a step S204. A signal that issues a command related to projection, may be a control signal transmitted from the electronic camera 10H, or may be an actuation signal from an actuation member 206.

In the step S203, the CPU 201 commands the projection control circuit 225 to start projection or to terminate projection, and then the flow of control proceeds to the step S204. It should be understood that, if communication with the electronic camera 10H becomes effective, then the initial image that is projected towards the screen (not shown in the figures) by the projector 50 is made to be a replay image according to the data that is transmitted from the electronic camera 10H, that is the above described "source #1".

In the step S204, the CPU makes a decision as to whether or not a command has been issued for changing over the source. If indeed a signal has been inputted that issues a command for changing over the projection source, then the CPU 201 reaches an affirmative decision in this step S204 and the flow of control proceeds to a step S205, whereas if no signal is inputted for issuing a command to change over the projection source then a negative decision is reached in this step S204 and the flow of control is transferred to a step S206. Such a signal that issues a command for changing over the source may be a control signal that is transmitted from the electronic camera 10H, or may be an actuation signal from an actuation member 206.

In the step S205, the CPU changes over the image data that is sent to the projection unit 220 according to the signal that has been inputted, and then the flow of control proceeds to the step S206. This image data that is sent is data corresponding to either "source #1" or "source #2".

In the step S206, the CPU 201 makes a decision as to whether or not a command has been issued for zoom adjustment. If a signal is inputted that issues a command for zoom adjustment, then the CPU 201 reaches an affirmative decision in this step S206 and the flow of control proceeds to a step S207, whereas if no signal has been inputted that issues a command for zoom adjustment, then a negative decision is reached in this step S206 and the flow of control is transferred to a step S208. Such a signal that issues a command for zoom adjustment may be a control signal transmitted from the electronic camera 10H, or may be an actuation signal from the zoom ring 52.

In the step S207, the CPU 201 performs zoom adjustment processing. The CPU 201 sends to the projection control circuit 225 a zoom adjustment signal corresponding to the signal that has been inputted, and then the flow of control proceeds to the step S208.

In the step S208, the CPU 201 makes a decision as to whether or not a command has been issued for focus adjustment. If a signal is inputted that issues a command for focus adjustment, then the CPU 201 reaches an affirmative decision in this step S208 and the flow of control proceeds to a step S209, whereas if no signal has been inputted that issues a command for focus adjustment, then a negative decision is reached in this step S208 and the flow of control is transferred to a step S210. Such a signal that issues a command for focus adjustment may be a control signal transmitted from the electronic camera 10H, or may be an actuation signal from the focus ring 51.

In the step S209, the CPU 201 performs zoom adjustment processing. Instead of sending to the projection control circuit 225 a replay image of the above described "source #1" or "source #2", the CPU 201 sends the chart image data of the above described "source #3", and projects this chart image. And the CPU 201 sends to the projection control circuit 225 a zoom adjustment signal corresponding to the signal that has been inputted. When a predetermined time period (for example 5 seconds) elapses without any signal that commands focus adjustment being inputted, the CPU 201 projects the original replay image instead of the chart image of "source #3", and then the flow of control proceeds to the step S210.

In the step S210, the CPU 201 makes a decision as to whether or not an OFF command has been issued. If an OFF actuation signal is inputted from the main switch, or an OFF control signal transmitted from the electronic camera 10H is inputted, then the CPU 201 reaches an affirmative decision in this step S210 and the flow of control proceeds to a step S211, whereas if no signal that issues a power supply OFF command is inputted then a negative decision is reached in this step S210 and the flow of control returns to the step S201.

In the step S211 the CPU 201, along with issuing a command to the projection control circuit 225 to terminate projection, also performs predetermined power supply OFF processing, and then the processing of FIG. 33 terminates.

<Processing on the Electronic Camera Side>

Figure 34:
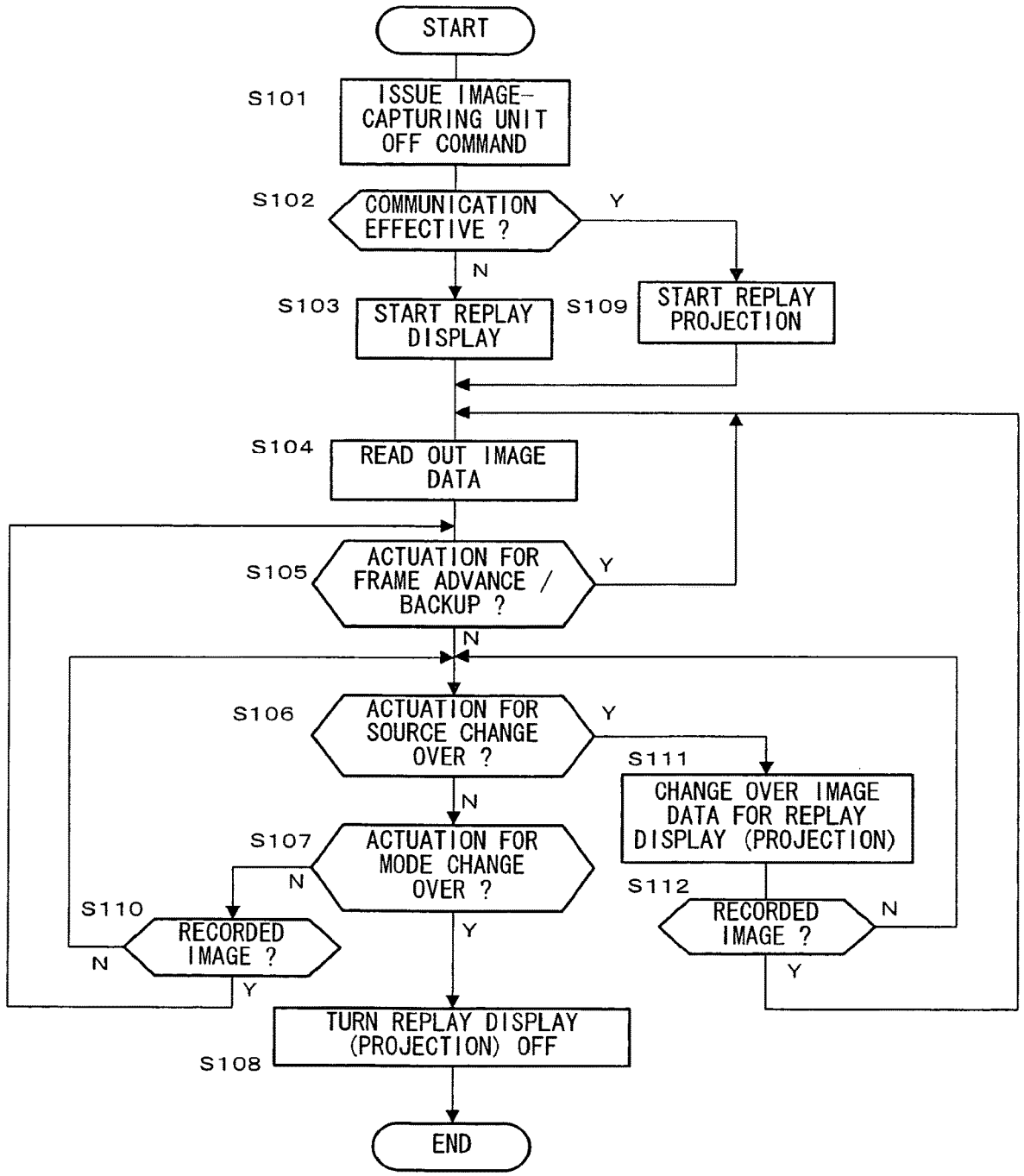
FIG. 34 is a flow chart for explanation of the flow of processing performed by a CPU of an electronic camera.

FIG. 34 is a flow chart for explanation of the flow of processing performed by program that is executed by the CPU 101 of the electronic camera 10H. The processing of FIG. 34 is started when the electronic camera 10H is actuated to change over from the photographic mode to the replay mode. The replay mode is an operational mode in which image data that has already been photographed is read out from the memory card 150 or the like, and a replay image based upon this image data is displayed upon the liquid crystal display unit 104. In a step S101 of FIG. 34, the CPU 101 issues a command to the photography control circuit 124 to turn the image-capturing unit OFF, and then the flow of control proceeds to a step S102. Due to this, the image capturing operation by the image sensor 122 terminates.

In the step S102, the CPU 101 makes a decision as to whether or not communication has become effective. The CPU 101 performs communication using a predetermined communication protocol with the CPU 201 on the side of the projector 50 that is installed to the lens mount 110 and, if communication has become effective (i.e. if the opposite partner to communication is recognized as being a projector 50) an affirmative decision is reached in this step S102 and the flow of control is transferred to a step S109. However, if communication does not become effective, then the CPU 101 reaches a negative decision in this step S102 and the flow of control proceeds to a step S103.

If the flow of control reaches the step S103, then the CPU 101 displays a replay image upon the liquid crystal display unit 104. Thus in this step S103 the CPU 101 starts this replay display upon the liquid crystal display unit 104, and then the flow of control proceeds to a step S104. In this case the CPU 101 does not transmit any control signal or data or the like to any projector 50.

If the flow of control is transferred to the step S109, then the CPU 101 projects a replay image with the projector 50. In this step S109 the CPU 101, along with transmitting a command (a control signal) for starting projection, also turns the display upon the liquid crystal display unit 104 OFF, and then the flow of control is transferred to the step S104.

In the step S104, the CPU 101 reads out from the memory card 150 the image data whose recording date and time is the newest, and takes this image data that has been read out as the image data for replay. And, if the replay image is to be displayed upon the liquid crystal display unit 104, then the CPU 101 transmits the image data for replay to the liquid crystal unit 104, while, if the replay image is to be projected with the projector 50, then the CPU 101 transmits the image data for replay to the projector 50. By doing this, a replay image based upon the image data sent by the CPU 101 is replay displayed (or projected) upon the liquid crystal display unit 104 or via the projector 50.

In the next step S105, the CPU 101 makes a decision as to whether or not actuation has been performed for frame advance or backup. If an actuation signal has been inputted from an actuation member 103 that commands frame advance or backup, then the CPU 101 reaches an affirmative decision in this step S105 and the flow of control returns to the step S104, and image data corresponding to the actuation signal is read out from the memory card 150, and this image data that has been read out is taken as being the image data for replay. On the other hand, if no actuation signal that commands either frame advance or frame backup has been inputted from an actuation member 103, then a negative decision is reached in this step S105 and the flow of control proceeds to a step S106.

In the step S106, the CPU makes a decision as to whether or source changeover actuation has been performed. If an actuation signal has been inputted from an actuation member 103 that commands changing over of the source, then the CPU 101 reaches an affirmative decision in this step S106 and the flow of control is transferred to a step S111, whereas if no actuation signal has been inputted that commands changing over of the source, then a negative decision is reached in this step S106 and the flow of control proceeds to a step S107.

In the step S107, the CPU 101 makes a decision as to whether or not mode changeover actuation has been performed. If an actuation signal has been inputted from an actuation member 103 to change over to the photographic mode, then the CPU 101 reaches an affirmative decision in this step S107 and the flow of control proceeds to a step S108. Furthermore, if no actuation signal to change over to the photographic mode has been inputted, then the CPU 110 reaches a negative decision in this step S107 and the flow of control is transferred to a step S110.

In the step S108, if the replay image is being displayed upon the liquid crystal display unit 104, then the CPU 101 turns the display by the liquid crystal display unit 104 OFF, while, if the replay image is being projected with the projector 50, then the CPU 101 turns the projection by the projector 50 OFF; and then the processing of FIG. 34 terminates. If the image projected by the projector 50 is to be turned OFF, then a projection end command (a control signal) is transmitted to the projector 50. It should be understood that, along with this projection end command, it would also be acceptable to arrange to transmit an OFF control signal that causes power supply OFF processing.

In the step S110, the CPU 101 makes a decision as to whether or not the image data for replay is a recorded image. If the image data for replay is a recorded image that is recorded upon the memory card 150, then the CPU 101 reaches an affirmative decision in this step S110 and the flow of control returns to the step S105, whereas if the image data for replay is an image inputted from the external interface (I/F) 107, then a negative decision is reached in this step S110 and the flow of control returns to the step S106.

In the step S111, the CPU 101 changes over the image data for replay, and then the flow of control proceeds to the step S112. In concrete terms, each time actuation to perform changing over of the source is performed, the CPU 101 changes over between the image data readout from the memory card 150, and image data inputted from the external interface (I/F) 107; and then the flow of control proceeds to the step S112.

In the step S112, the CPU 101 makes a decision as to whether or not the image data to be replayed is a recorded image. If the image data for replay has been changed over to a recorded image that is recorded upon the memory card 150, then the CPU 101 reaches an affirmative decision in this step S112 and the flow of control returns to the step S104 and the image data is readout from the memory card 150, and this image data that has been read out is taken as being the image data for replay. On the other hand, if the image data for replay has been changed over to image data inputted from the external interface (I/F) 107, then the CPU 101 reaches a negative decision in this step S112 and the flow of control returns to the step S106. In this case, the decision as to actuation for frame advance or backup is unnecessary.

After taking an affirmative decision in the step S102 of the flow chart described above, and until taking an affirmative decision as to mode changeover actuation in the step S107, the CPU 101 treats a portion of the actuation members 103 as actuation members that function differently from when a conventional photographic lens is installed. For example, when the release button is actuated by itself, it is treated, not as an actuation member for commanding photography, but as an actuation member for commanding the projector 50 to change over to projecting an image of the chart for focus adjustment of the above described "source #3". Furthermore, if the release button is actuated along with an actuation member of the cruciform key type, then this is treated as an actuation member for commanding the projector 50 to adjust its zoom level. If it is combined with an actuation signal that specifies the rightwards direction, then this is treated as a zoom up command, whereas if it is combined with an actuation signal that specifies the leftwards direction, then this is treated as a zoom down command.

Even further, if the AF operation button is actuated along with the actuation member of the cruciform key type, then this is treated as an actuation member for commanding the projector 50 to adjust its focus. If it is combined with an actuation signal that specifies the rightwards direction, then this is treated as a command to focus more closely, whereas if it is combined with an actuation signal that specifies the leftwards direction, then this is treated as a command to focus more towards infinity.

According to the sixth embodiment explained above, the following beneficial operational effects are obtained.

(1) Since it is arranged for the projector 50 to be installed to the lens mount 110 of the electronic camera 10H, that is for an interchangeable lens, and it has a similar cylindrical shape to which of the lens barrel of an interchangeable lens, accordingly it is possible to install the projector 50 to the electronic camera 10H directly, without using any cable or adapter.

(2) Since, when it is installed to the lens mount, the projector 50 is arranged with its long side horizontal, so that the longitudinal direction of the projection module extends horizontally, accordingly, as compared with what would be the case if it was arranged in a vertically oriented configuration, it is difficult for the projector 50 to interfere with the quick return mirror 131 within the electronic camera 10H, and it is possible to insert at least a part of the projection module into the space within the electronic camera 10H. Due to this, it is possible to reduce the size of the projector 50 (in the left and right direction in FIG. 32(*a*)).

(3) Since, in addition to (2) above, the line CP that passes through the center of the projection optical system is offset upwards above the line CL that passes through the center of the lens barrel of the projector 50, accordingly it is possible to insert the projection module even more deeply into the space within the electronic camera 10H. Due to this, it is possible further to reduce the size of the projector 50 (in the left and right direction in FIG. 32(*a*)). Moreover, by raising the position of the projection optical system, it is possible to reduce the fear that the lower edge of the projected ray bundle will be interfered with by the setting surface, such as a desk or the like.

(4) Since it is arranged to provide the focus ring 51 and the zoom ring 52 to the projector 50, and to perform focus adjustment and zoom adjustment for the projection optical system 221 according to the amounts of actuation of these actuation rings, accordingly it is possible to perform focusing and zooming of the projected image by similar rotational actuations as in the case of a normal photographic lens. Due to this, it is possible to provide a camera system whose convenience of use is good.

(5) Since it is arranged to make the length HB from the fitting portion 210 of the projector 50 to the outer edge of the lens barrel to be less than or equal to the length HA from the lens mount 110 of the electronic camera 10H to the bottom surface of the chassis of the camera, accordingly it is possible, in the state in which the projector 50 is installed to the electronic camera 10H, to contact the bottom surface of the electronic camera 10H closely against a planar setting surface. Moreover, if the length HB<the length HA, then, by providing the support member 53 to the lower portion of the lens barrel of the projector 50, it is possible to prevent the setting attitude tilting towards the side of the projector 50. As a result it is possible to maintain a stable setting attitude, even if the electronic camera 10H with the projector 50 installed thereto is set upon a sloping surface.

(6) It is arranged for communication to be possible between the electronic camera 10H and the projector 50, and, if communication with the electronic camera 10H that is set to the replay mode has become effective, to transmit a command (i.e. a control signal) for starting projection and data to be replayed from the electronic camera 10H to the projector 50, and for the projector 50 automatically to project a replay image corresponding to which data to be replayed. Due to this, it is possible to omit actuation to turn the liquid crystal display unit 104 of the electronic camera 10H to OFF, actuation to turn the LED light source 223 of the projector 50 to ON, and actuation to select the projected image, so that the convenience of use of this camera system becomes excellent.

(7) From after an affirmative decision has been reached in the step S102, until an affirmative decision for mode change-over actuation is reached in the step S107, it is arranged to treat a portion of the actuation members 103 as actuation members that have different functions from when a conventional photographic lens is installed. Due to this, it is possible to avoid adding new actuation members related to projection to the electronic camera 10H.

Variant Embodiment #24

It would also be acceptable to provide a structure in which, if no battery 204 is loaded into the projector 50, the projector 50 is operated with a power supply that is supplied from the electronic camera 10H to the projector 50 via the lens mount 110.

Variant Embodiment #25

It would also be acceptable to provide a speaker to the projector 50. In this case, if audio data is present that corresponds to the data file for an image to be projected, audio corresponding to this audio data is replayed from the speaker.

Variant Embodiment #26

It would also be acceptable to provide the projector 50 with a slot for a memory card. In this case, the projector 50 reads out image data from a memory card that is loaded into this slot, and projects a replay image according to this image data that has been read out. Moreover, it would also be acceptable to provide a structure in which, when the projector 50 is projecting a replay image according to data that has been transmitted from the electronic camera 10H, this image data is also stored upon the memory card. By providing this type of structure the merit is obtained that, when the same data is to be projected twice or more, the response time until projection is quicker, since it becomes unnecessary to transmit the image data. Furthermore there is the advantageous aspect that, even when the projector 50 is removed from the electronic camera 10H and is being operated as a stand-alone projector, it is still possible to perform projection using that image data.

Variant Embodiment #27

It would also be acceptable to provide a structure with which, according to the contents set in advance by a menu setting or the like, during power supply OFF processing of the electronic camera 10H (including when a timer is OFF), the electronic camera 10H transmits a power supply OFF command (i.e. a control signal) to the projector 50. In this case, when an actuation signal is inputted from an actuation member 103 to issue a command to turn the power supply OFF, the CPU 101 of the electronic camera 10H, along with transmitting a power supply OFF control signal to the projector 50, also performs predetermined power supply OFF processing for the electronic camera 10H. Upon receipt of this power supply OFF command, the CPU 201 of the projector 50 performs termination of projection from the projection unit 220, and predetermined power supply OFF processing for the projector 50.

Variant Embodiment #28

Moreover, according to the contents set in advance by a menu setting or the like, it would also be acceptable to make it possible for the electronic camera 10H to change over whether power supply is provided, or is not provided, to the projector 50 from the power supply circuit 108 of the electronic camera 10H. The projector 50 is built so that, if the voltage of the battery 204 has become less than or equal to a predetermined value, the voltage that is supplied from the electronic camera 10H is used instead of the battery 204. It would also be acceptable to control the projection unit 220 so that, if power is being supplied from the electronic camera 10H to the projector 50, then the value of the electrical current that is supplied to the LED light source 223 is increased above normal, in order for the projected image to become brighter.

Variant Embodiment #29

It would also be possible to arrange, when a command for starting projection (i.e. a control signal) and data for replay have been transmitted from the electronic camera 10H to the projector 50, and when a replay image according to this data is being projected by the projector 50, to terminate projection by the projector 50, if a state in which no data is being received by the projector 50 from the electronic camera 10H has continued for a predetermined time period.

Variant Embodiment #30

Although it was arranged for the electronic camera 10H and the projector 50 to perform mutual communication and mutual power supply via terminals within the lens mount 110 and the fitting portion 210, it would also be acceptable to provide a structure in which the electronic camera 10H and the projector 50 were connected together via an external connection cable between their respective external interfaces (I/Fs) 107 and 202, and mutual communication is performed, and power supply is performed, via this connection cable.

Variant Embodiment #31

Figure 35:
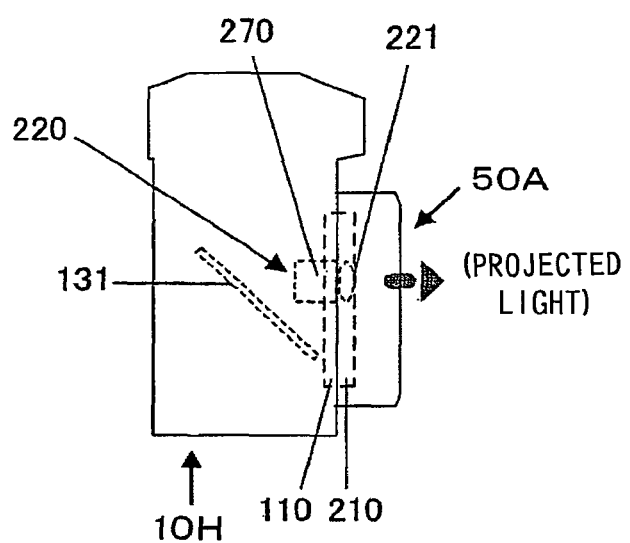
FIG. 35 is a figure showing an example of a projector in which a focus ring and a zoom ring are omitted.

It would also be acceptable to provide a more compact structure in which the focus ring 51 and the zoom ring 52 are omitted from the projector 50. FIG. 35 is a figure showing an example of a projector 50A in this case. This projector 50A performs zoom adjustment and focus adjustment when it receives a control signal that is transmitted from the electronic camera 10H. Since, by omitting the actuation rings (51 and 52), the camera becomes more compact and lighter in weight, accordingly, in the state in which the projector 50A is installed to the electronic camera 10H, the center of gravity is positioned towards the side of the electronic camera 10H. As a result, it is possible to stabilize the setting attitude upon a plane surface, even without providing the support member 53 shown by way of example in FIGS. 32(a) and 32(b).

Variant Embodiment #1 of the Projection Module

Figure 36:
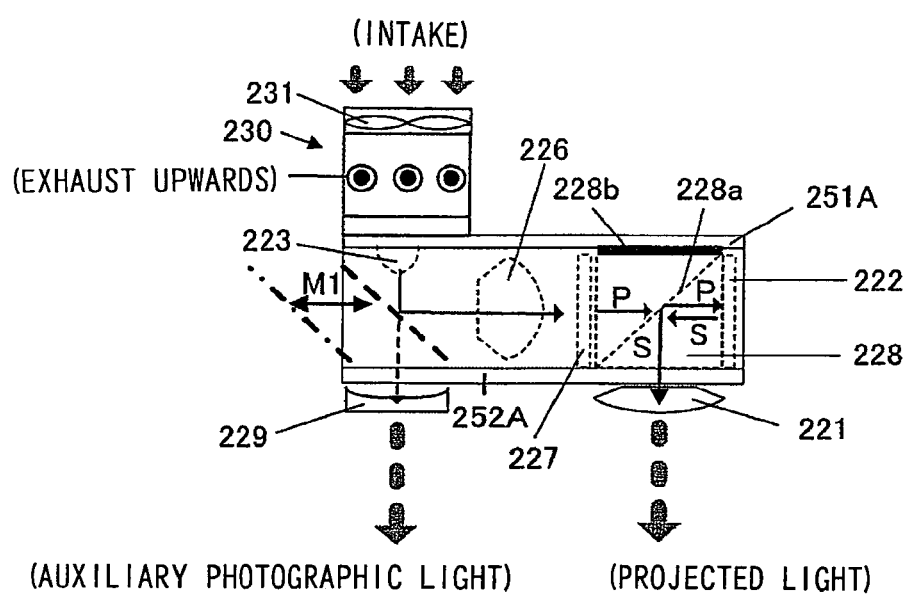
FIG. 36 is a figure for explanation of a variant embodiment for arranging the optical system of the projection unit.

A variant embodiment for arrangement of the optical system of the projection unit 220 will now be explained with reference to FIG. 36. FIG. 36 is a variant embodiment for the arrangement of the optical system shown byway of example in FIG. 4 (a), and shows the optical system of the projection unit 220 as seen from above. As compared with the first embodiment (FIG. 4(a)), the principal difference is that the shifting range of the mirror M1 and the position in which the cooling block 230 is disposed are different. To structural elements that are common with FIG. 4 (a), common reference symbols are appended, and explanation thereof is curtailed.

In FIG. 36, the LED 223 is implemented upon a rectangular aluminum base plate 251A (i.e. is mounted upon a pattern that is formed upon an insulating layer thereupon), that constitutes one plane surface in the longitudinal direction of a quadrangular prism shape, and the condensing optical system 226 and the PBS block 228 are adhered to the right of the LED light source 223. A mirror M1 that bends the light from the LED 223 towards the direction of the condensing optical system 226, and a mirror support member (not shown in the figures) that shiftably supports this mirror M1, are arranged on the outside of the module. By the support member being driven by an actuator, the mirror M1 is shifted between its position shown by the broken line and its position shown by the single dotted broken line; this feature is the same as in the case of FIG. 4(a).

It should be understood that it would also be acceptable for the shift direction of the mirror M1 not to be in the direction of the above described optical path (the left and right direction in FIG. 36), provided that at least the mirror M1 is shifted between a state in which it is shifted upon the optical path from the LED light source 223, and a state in which it is retracted from upon this optical path. Moreover, it would also be acceptable to provide a structure in which the mirror M1 is rotationally shifted, instead of being parallel shifted as shown in the figure.

The cooling block 230 is arranged so as to cool the base plate 251A from the rear of its surface on which the LED light source 223 is implemented. The orientation of its intake and exhaust may be, as for example in FIG. 36, with its intake from above, and its exhaust directed toward the direction perpendicular to the drawing paper (upwards).

Since, according to the structure of FIG. 36, the gap between the LED light source 223 and the condensing optical system. 226 is narrower as compared with the case of FIG. 4(a), accordingly it is possible to restrict the size of the optical system in the horizontal direction.

Variant Embodiment #2 of the Projection Module

Figure 37:
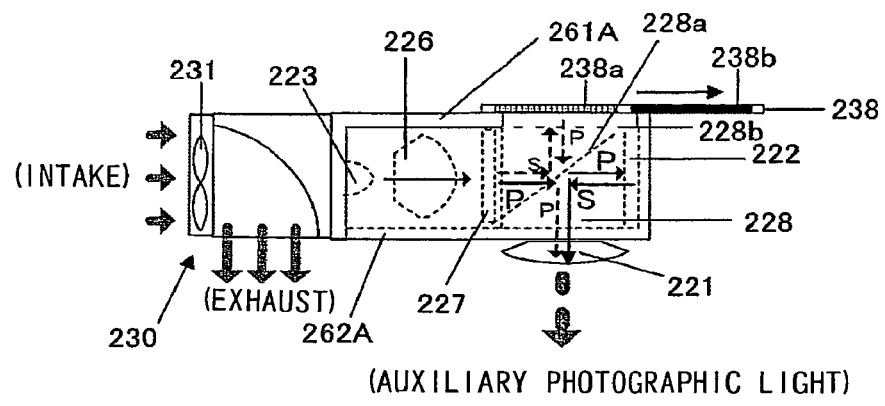
FIG. 37 (a) and FIG. 37 (b) show a variant embodiment for the arrangement of the optical system of the projection unit.
Figure 37:
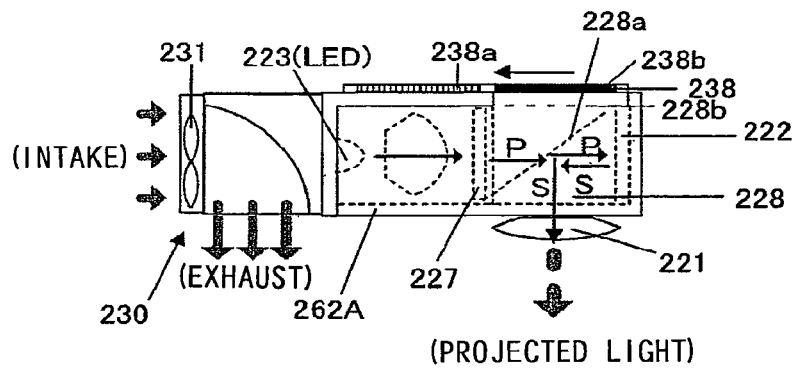

FIGS. 37 (a) and 37 (b) are figures showing, as seen from above, an optical system of a projection unit 220 that is a variant embodiment for the arrangement of the optical system shown byway of example in FIG. 10. FIG. 37(a) shows the case of emitting auxiliary light for photography, while FIG. 37 (b) shows the case of emitting projected light. As compared with the second embodiment (of FIG. 10), the features of difference are: that the optical member 238 is disposed upon the side of the surface 228b of the PBS block 228; that, instead of the heat dissipation member 270, the cooling block 230 is provided; and that, on the aluminum base plate 261A that is processed by bending, an aperture is provided in a position that is opposed to the surface 228b of the PBS block 228. To structural elements that are common with FIG. 10, common reference symbols are appended, and explanation thereof is curtailed.

In FIGS. 37(a) and 37(b), the optical member 238 is supported by a support member not shown in the figures so as to be shiftable along the surface 228b of the PBS block 228. By this support member being driven by an actuator (not shown in the figures), the optical member 238 is parallel shifted in the left and right directions in FIGS. 37(a) and 37(b).

On the optical member 238, there are formed a region 238b that is treated by non-reflective processing such as black coloring processing or the like, and a region 238a in which a ¼ wavelength plate and a reflective mirror are joined together (the ¼ wavelength plate is disposed on the side of the PBS block 228). When auxiliary photographic light is to be emitted (the photographic mode), the optical member 238 is shifted to the position shown in FIG. 37 (a). In this state, when a polarized light ray bundle is incident upon the PBS block 228, its P polarized light component passes through the PBS block 228 and is converted by the liquid crystal panel 222 into an S polarized light component. It should be understood that, in this case, the liquid crystal panel 222 is put into the state of being illuminated over its entire surface, so as to make the auxiliary light be as bright as possible. In other words, the light that is incident upon the liquid crystal panel 222 is converted by all of its pixels from P polarized light into S polarized light. The S polarized light component bundle produced after conversion is incident for a second time upon the PBS block 228, and is reflected by the polarized light separator 228a within the PBS block 228 and is emitted towards the projection optical system 221. A light polarizing plate 227 is disposed before incidence upon the PBS block 228. This light polarizing plate 227 is rotated about the optical axis as a center, and the light that is incident upon the PBS block 228 is adjusted to 50% P polarized light and 50% S polarized light with respect to the polarization separation surface of the PBS block 228.

The S polarized light component of the polarized light ray bundle that is incident upon the PBS block 228 is reflected by the polarized light separator 228a within the PBS block 228, and is incident upon the region 238a of the optical member 238. The S polarized light component is reflected by the mirror within the region 238a and is incident for a second time upon the PBS block 228, but, since it passes through the ¼ wavelength plate within the region 238a that is arranged in a predetermined direction for a second time, it is converted into a P polarized light component. This P polarized light component passes through the PBS block 228, and is emitted towards the projection optical system 221. Since, in this manner, it is arranged also to emit the polarized light component, that was unused (it was conducted to the non-reflective-processed surface 228b and was discarded) with the structure of FIG. 10 (the same is also true for FIG. 4 (a) and FIG. 36), accordingly it is possible to enhance the amount of auxiliary photographic light over the case of FIG. 10. The proportions of the light incident upon the liquid crystal panel 222 and the region 238a may be changed by rotating the light polarizing plate 227. It should be understood that, since the light that is emitted from the LED light source 223 is non-polarized light, accordingly it is possible to make the proportions of the light incident upon the liquid crystal panel 222 and upon the region 238a be the same, even without providing the light polarizing plate 227.

When projected light is to be emitted (in the projection mode), the optical member 238 is shifted to the position shown in FIG. 37 (b). In this case a projected image of high product quality is obtained, in which stray light is suppressed, since only the P polarized light component in the polarized light ray bundle that is incident upon the PBS block 228 is used as in FIG. 10 (the S polarized light component is conducted to the non-reflective-processed surface of the region 238b and is discarded) (the same is the case with FIGS. 4 and 36 as well).

It would also be acceptable for the direction of shifting of the above described optical member 238 not to be the left and right direction as shown in the example of FIGS. 37(a) and 37 (b), provided that it can be shifted so as to be positioned with the region 238a or the region 238b upon the optical path from the PBS block 228 upwards in FIGS. 37 (a) and 37 (b). Moreover, a structure would also be acceptable in which, by making the optical member 238 that includes the region 238a and the region 238b in the shape of a disk, the region 238a or the region 238b may be shifted onto the optical path from the PBS block 228 upwards in FIGS. 37(a) and 37(b) by rotating this disk shaped optical member 238.

It would also be acceptable to endow the mirror within the region 238a described above with a curvature. By imparting a magnification to the mirror, during emission of auxiliary photographic light (in the photographic mode), the range of the ray bundle that is emitted from the projection optical system 221 as the P polarized light component is made to be broader than the range of the ray bundle that is emitted from the projection optical system 221 as the S polarized light component, so that it is possible to illuminate a broader range.

Figure 38:
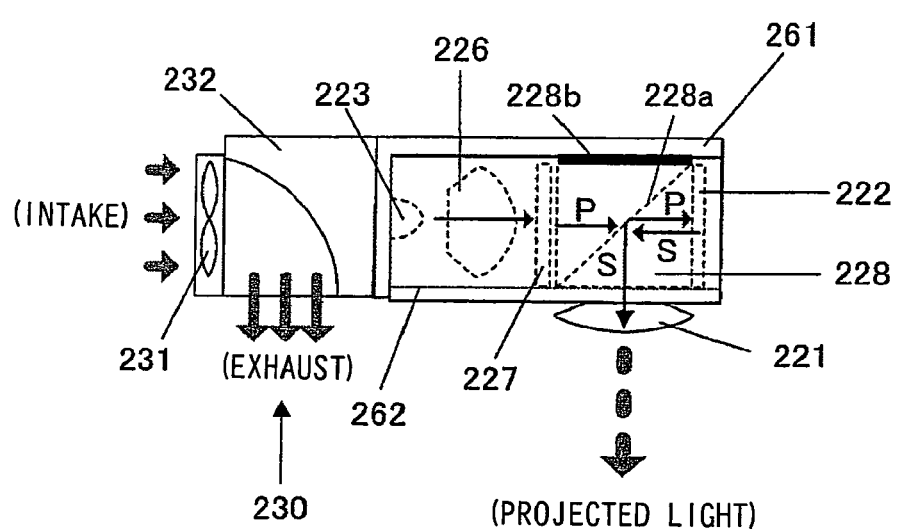
FIG. 38 is a plan view as seen from above of an optical system of a projection unit of a variant embodiment.

It would also be acceptable to arrange to substitute the heat dissipation member of the projection module with a cooling block. FIG. 38 is a figure for explanation of an example in which a cooling block 230 is provided, instead of the heat dissipation member 270 of the projection module shown by way of example in FIG. 10. A structure may also be utilized in which these cooling methods for the projection module are combined, with the heat dissipation member 270 and the cooling block 230 provided with a cooling fan being appropriately combined together.

The embodiments explained above are only examples; the present invention is not limited in any way to the structure of the embodiments that have been described. Moreover, the first through the sixth embodiment, and the variant embodiments #1 through #31 and the variant embodiments #1 and #2 of the projection module, may be combined in any desired manner, as appropriate.

While the present invention has been explained, byway of example, in terms of an electronic camera with incorporated projector, it could also be applied to a projection device, a portable telephone device with incorporated projector, a PDA (personal digital assistant) with incorporated projector, a sound recording and replay device with incorporated projector, or to a similar type of electronic device, provided that it is a device to which a projection unit 220 is mounted.

Although various embodiments and variant embodiments have been explained in the above description, the present invention is not to be considered to be limited to the details thereof. Other possibilities that may be considered to fall within the range of the technical concept of the present invention are also included within the scope of the present invention.

The contents of the disclosure of the following application, upon which priority is claimed, are herein incorporated by reference:

Japanese Patent Application 2006-097340 (filed on Mar. 31, 2006).

The invention claimed is:

1. An electronic device, comprising:
a projector that is configured to project an image; and
a control unit that is configured to control an orientation of the image to be projected to a first orientation and onto a first surface when the electronic device is in a first attitude, and to control the orientation of the image to be projected to a second orientation different from the first orientation and onto a second surface different from the first surface when the electronic device is in a second attitude different from the first attitude.

2. The electronic device according to claim 1, wherein:
the control unit determines an attitude based upon an output of a sensor, and controls the orientation of the image to be projected based upon the attitude.

3. The electronic device according to claim 1, wherein:
the control unit determines whether the first attitude is achieved or the second attitude is achieved based upon the output of the sensor, and controls the orientation of the image to be projected to be different between the first attitude and the second attitude.

4. The electronic device according to claim 1, wherein:
the control unit controls the orientation of the image to be projected to be different between the first attitude and the second attitude, the first attitude and the second attitude being based upon the output of the sensor.

5. The electronic device according to claim 1, wherein:
the second surface is different from a surface on which the electronic device is mounted.

\* \* \* \* \*